(12) United States Patent
Vito

(10) Patent No.: US 6,543,263 B1
(45) Date of Patent: Apr. 8, 2003

(54) COLUMN LOCK DEVICE

(76) Inventor: Robert A. Vito, 1434 Sugartown Rd., Berwyn, PA (US) 19312

( * ) Notice: Subject to any disclaimer, the term of this patent is extended or adjusted under 35 U.S.C. 154(b) by 0 days.

(21) Appl. No.: 10/228,687

(22) Filed: Aug. 27, 2002

Related U.S. Application Data

(62) Division of application No. 10/007,090, filed on Dec. 7, 2001, now Pat. No. 6,460,385.

(51) Int. Cl.$^7$ ............................................... B60R 25/02
(52) U.S. Cl. ........................... 70/209; 70/211; 70/212; 70/225; 70/226; 70/237; 70/238; 70/256; D8/330; D8/331; D8/339
(58) Field of Search ........................... 70/209, 211, 212, 70/225, 226, 237, 238, 256; D8/330, 331, 339

(56) References Cited

U.S. PATENT DOCUMENTS

| | | |
|---|---|---|
| 1,364,068 A | 1/1921 | Bader |
| 1,400,415 A | 12/1921 | Callahan |
| 1,428,649 A | 9/1922 | Miller |
| 2,716,336 A | 8/1955 | Ross |
| 3,190,090 A | 6/1965 | Zaidener |
| 3,401,543 A | 9/1968 | Lewis |
| 3,690,131 A | 9/1972 | Davis |
| 3,898,823 A | 8/1975 | Ludeman |
| 4,008,590 A | 2/1977 | Berkowitz et al. |
| 4,696,172 A | 9/1987 | Farrow |
| 4,699,238 A | 10/1987 | Tamir |
| 4,779,435 A | 10/1988 | Farrow |
| 5,113,674 A | 5/1992 | LiCausi |
| 5,119,651 A | 6/1992 | Yang |
| D330,844 S | 11/1992 | Chang |
| 5,259,222 A | 11/1993 | Jang |
| 5,267,458 A | 12/1993 | Heh |
| 5,275,030 A | 1/1994 | Cole |
| 5,299,438 A | 4/1994 | Chen |
| 5,329,793 A | 7/1994 | Chen |
| 5,461,891 A | 10/1995 | Noel |
| 5,488,844 A | 2/1996 | Winner |
| D369,738 S | 5/1996 | Hull et al. |
| 5,513,506 A | 5/1996 | Ricalde |
| D372,418 S | 8/1996 | Winner |
| 5,566,560 A | 10/1996 | LiCausi |
| 5,598,142 A | 1/1997 | Winner, Jr. |
| 5,600,979 A | 2/1997 | Winner et al. |
| 5,604,384 A | 2/1997 | Carlo et al. |
| 5,613,383 A | 3/1997 | Banez |
| 5,635,899 A | 6/1997 | Carlo et al. |
| 5,653,133 A | 8/1997 | Passantino |
| D383,372 S | 9/1997 | Winner |
| 5,671,620 A | 9/1997 | Carvey et al. |
| 5,673,575 A | 10/1997 | Carlo et al. |
| 5,677,668 A | 10/1997 | Winner, Jr. |
| 5,704,233 A | 1/1998 | Farshad |
| 5,709,113 A | 1/1998 | Godfrey |
| D391,142 S | 2/1998 | Winner |
| 5,724,838 A * | 3/1998 | Alicea ............................ 70/18 |
| 5,730,008 A | 3/1998 | Case et al. |
| 5,735,149 A | 4/1998 | Winner, Jr. |
| 5,755,123 A | 5/1998 | Winner, Jr. |
| 5,765,415 A | 6/1998 | Savinsky |
| 5,778,709 A | 7/1998 | Hsu |
| D398,830 S | 9/1998 | Winner |
| 5,816,082 A * | 10/1998 | Gabrielyan .................. 70/209 |
| 5,826,448 A | 10/1998 | Graham |
| 5,836,186 A | 11/1998 | Winner, Jr. |
| 5,842,361 A | 12/1998 | Banez |
| 5,855,128 A | 1/1999 | Voiculescu |
| 5,865,044 A | 2/1999 | Wu |
| 5,870,912 A | 2/1999 | Vito |

(List continued on next page.)

*Primary Examiner*—James R. Brittain
*Assistant Examiner*—Carlos Lugo
(74) *Attorney, Agent, or Firm*—Volpe and Koenig, P.C.

(57) ABSTRACT

A heavy duty steering wheel securing anti-theft device. Embodiments are described herein that also protect any air bag contained in the steering wheel.

14 Claims, 38 Drawing Sheets

U.S. PATENT DOCUMENTS

| | | |
|---|---|---|
| 5,881,587 A | 3/1999 | Vito |
| 5,887,464 A | 3/1999 | Perez |
| 5,901,586 A | 5/1999 | Hale |
| 5,906,121 A | 5/1999 | Mankarious |
| 5,921,115 A | 7/1999 | Winner |
| D412,826 S | 8/1999 | Calpito |
| 5,996,721 A | 12/1999 | Winner |
| 6,029,483 A | 2/2000 | Daniels |
| 6,089,055 A | 7/2000 | Vito |
| 6,116,065 A | 9/2000 | Hale |
| D432,390 S | 10/2000 | Geringer et al. |
| 6,131,426 A | 10/2000 | Tarnofsky |
| 6,192,724 B1 | 2/2001 | Vito |
| 6,202,456 B1 | 3/2001 | Vickers |
| 6,212,920 B1 | 4/2001 | Winner |
| 6,223,568 B1 | 5/2001 | Wu |
| 6,223,569 B1 | 5/2001 | Wu |
| 6,230,527 B1 | 5/2001 | Wu |
| 6,240,753 B1 | 6/2001 | Wu |

\* cited by examiner

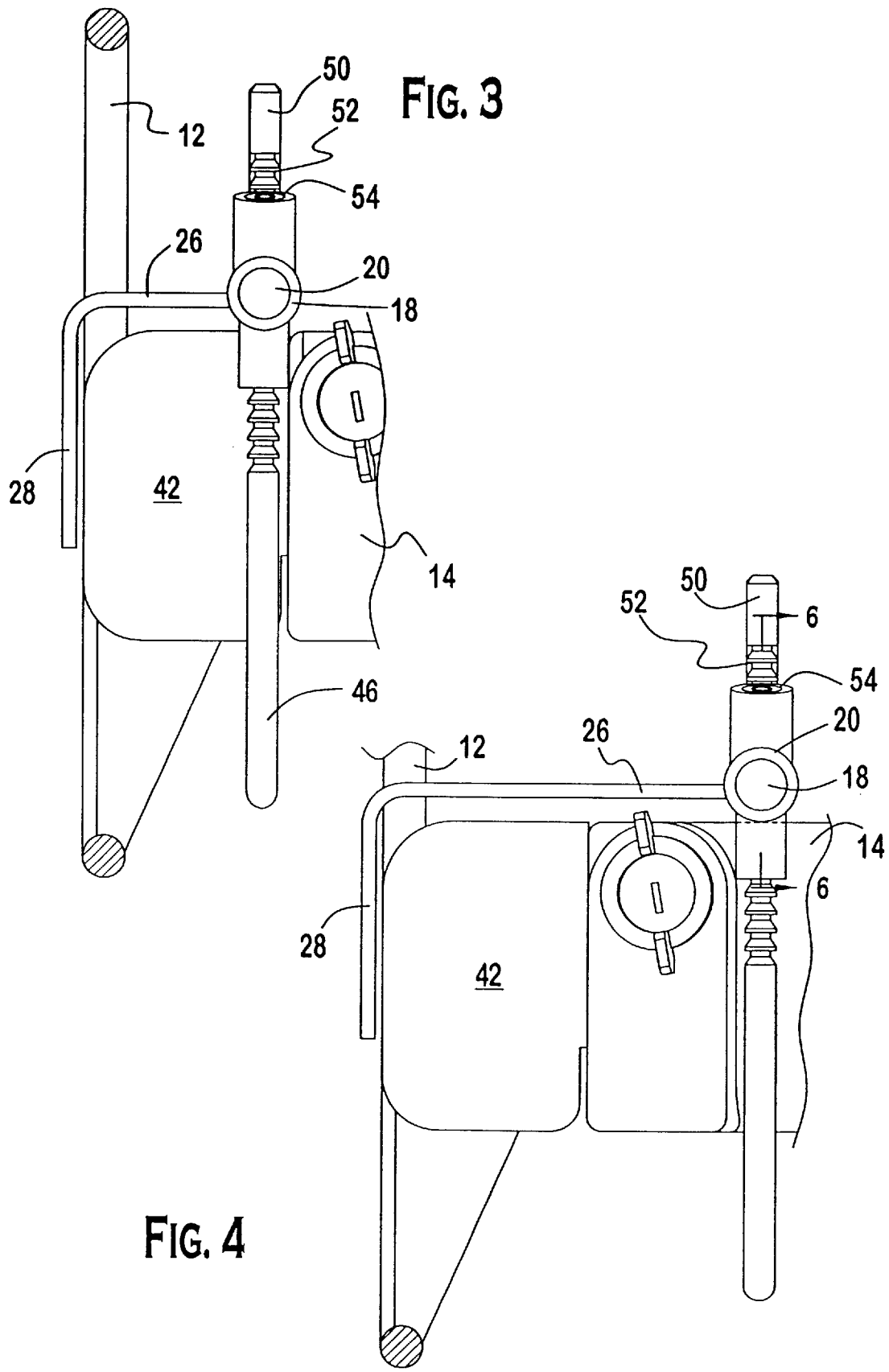

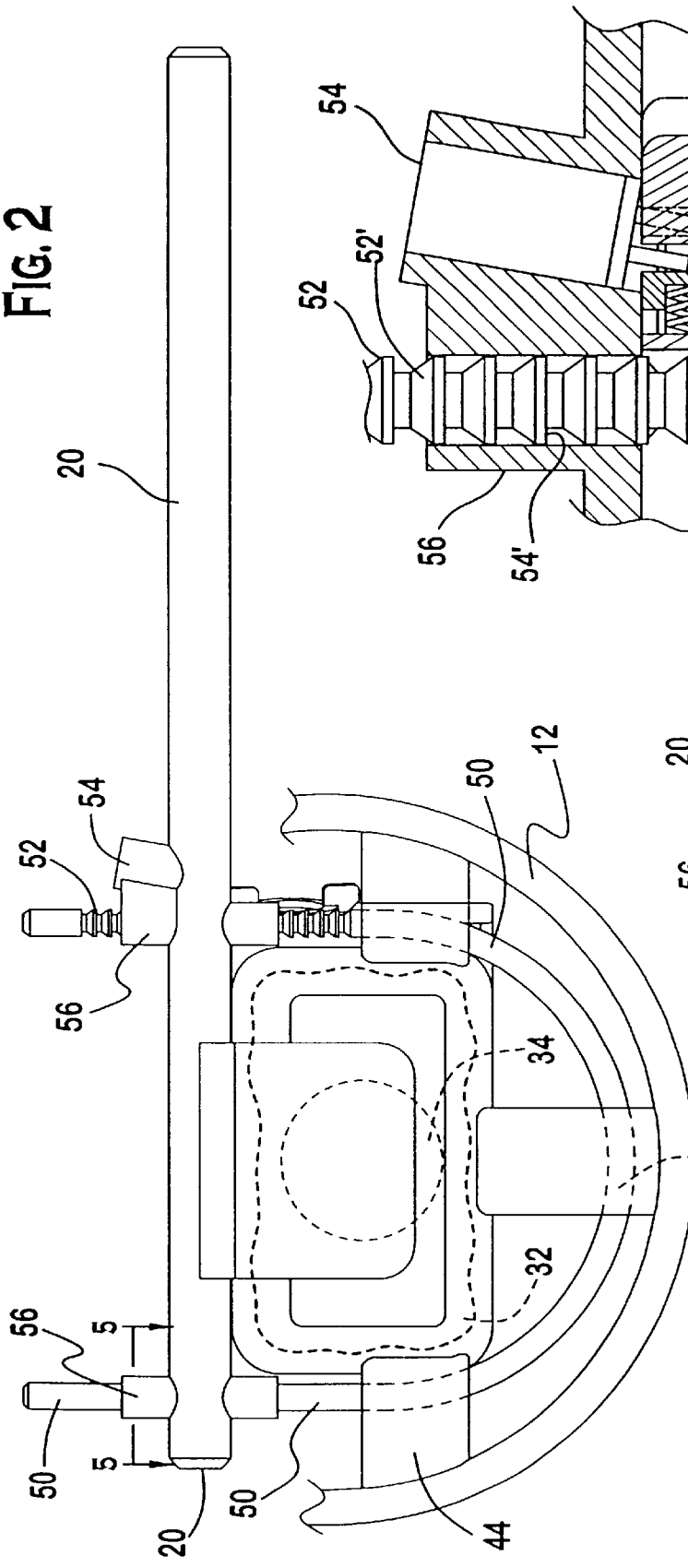
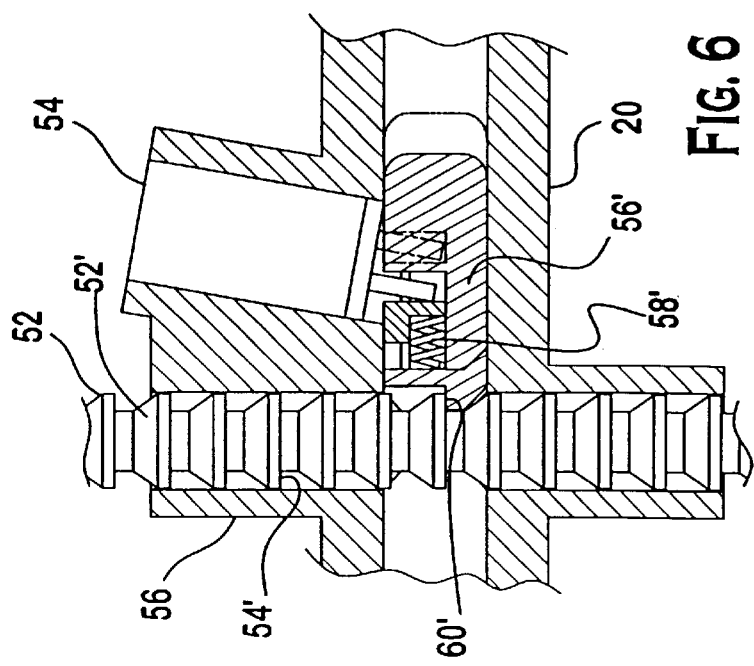
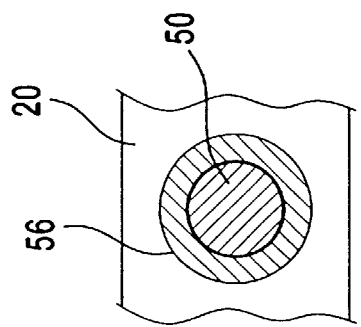
FIG. 2
FIG. 6
FIG. 5

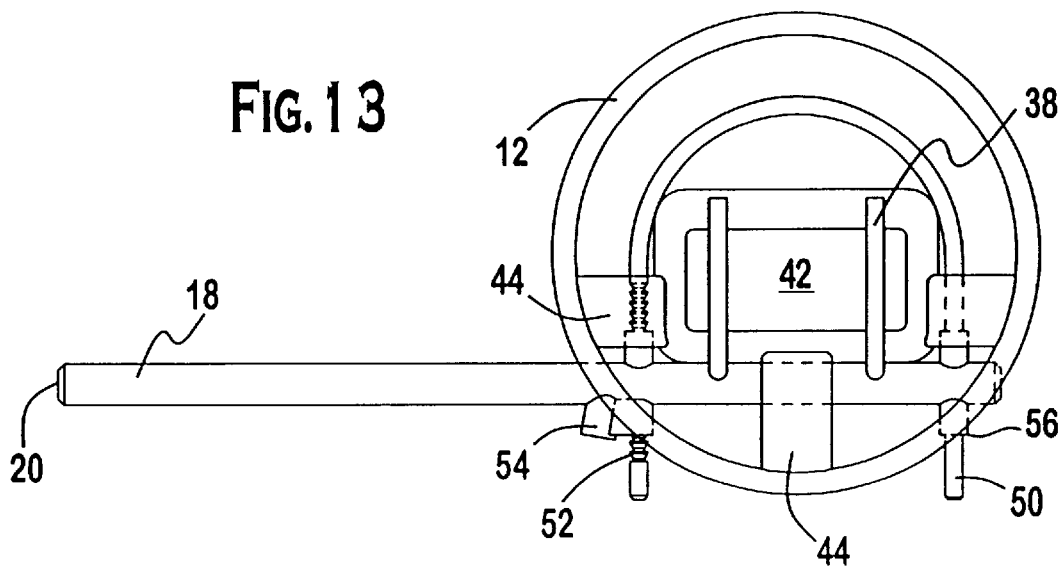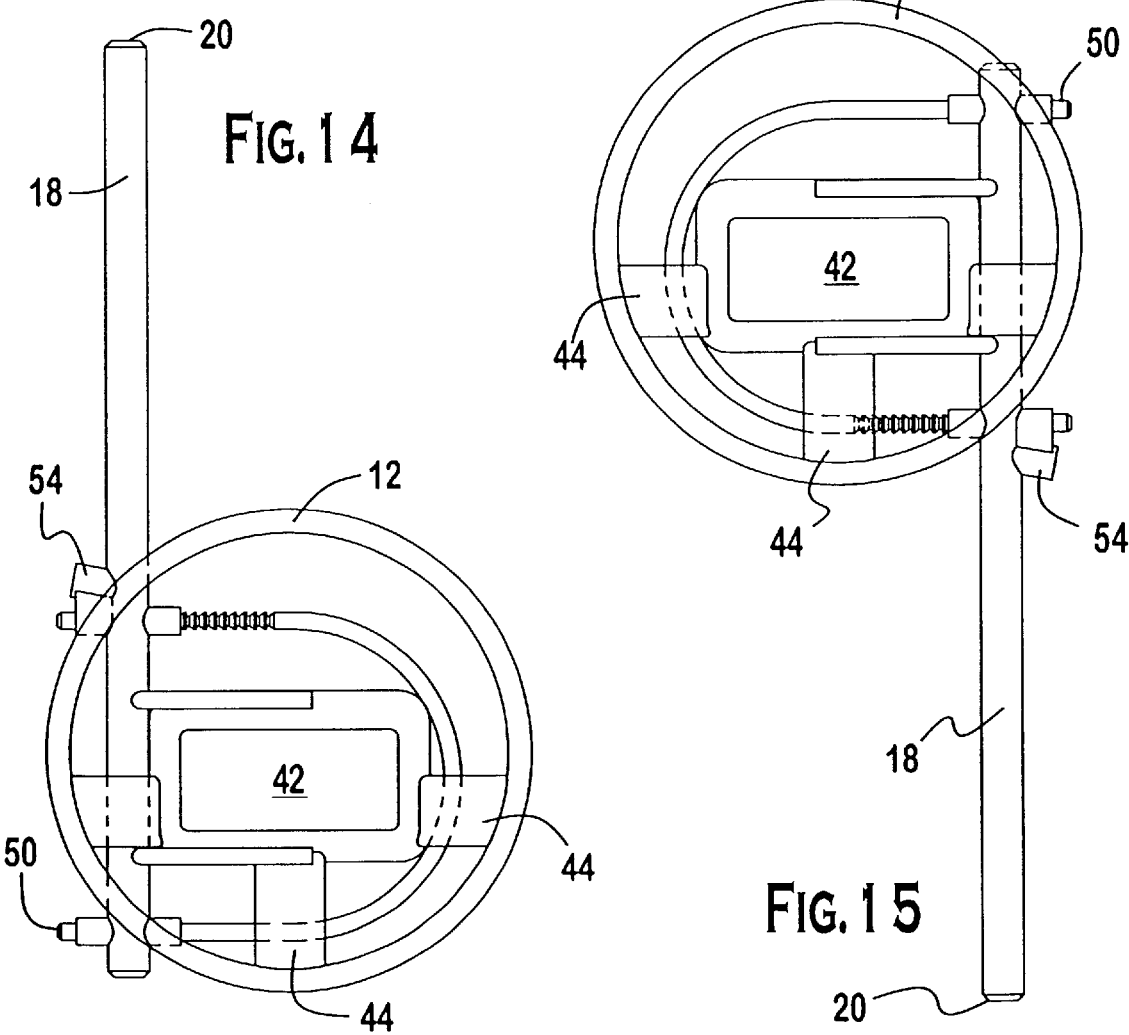

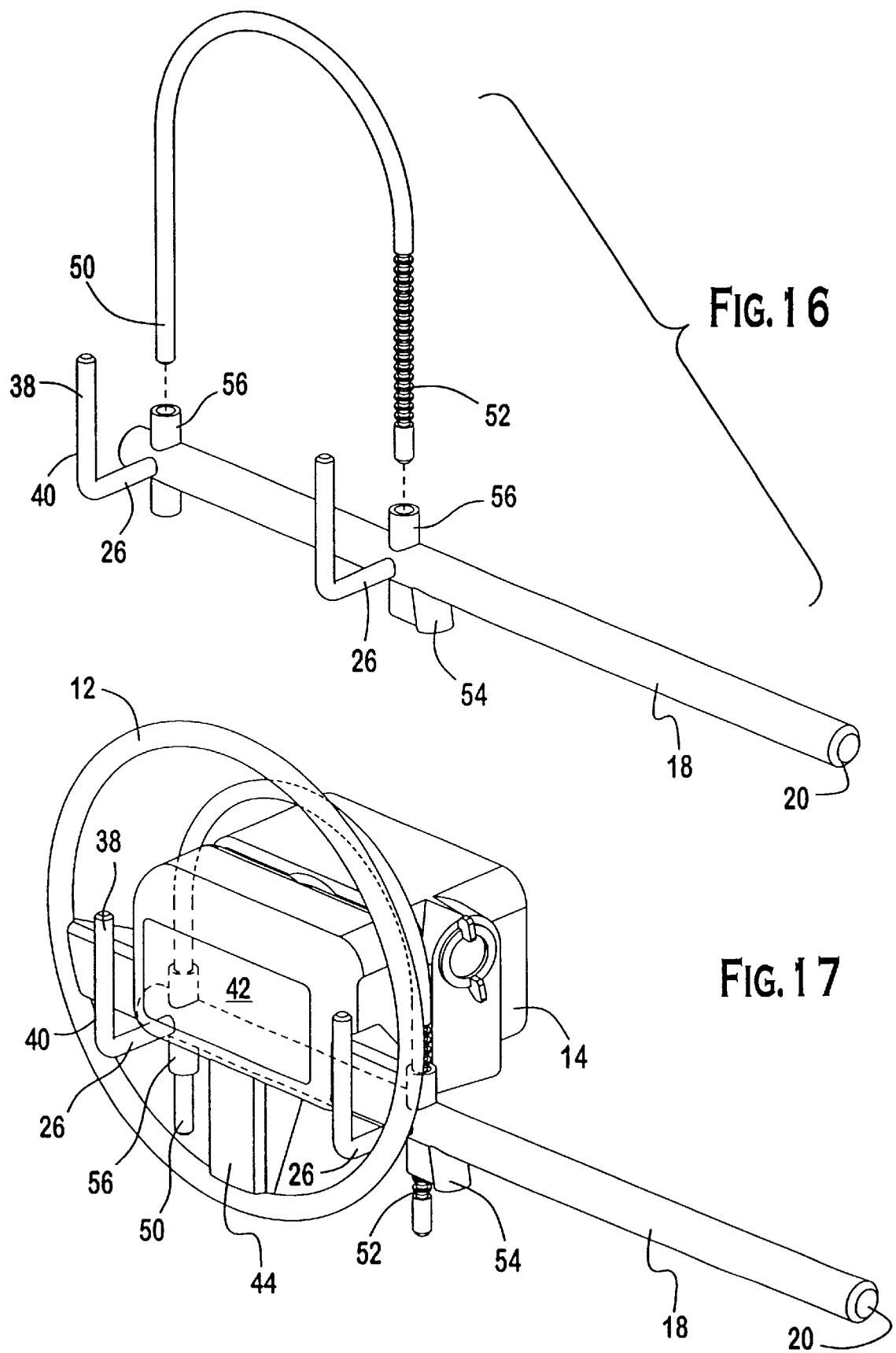

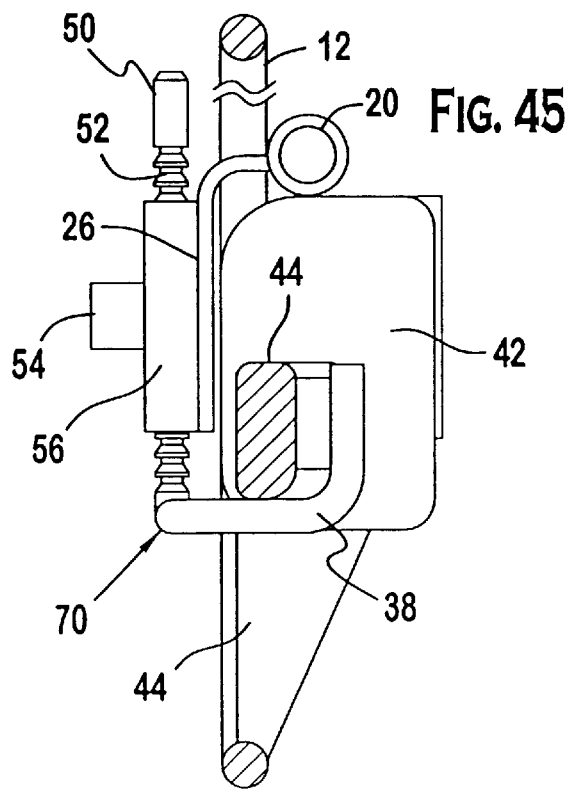
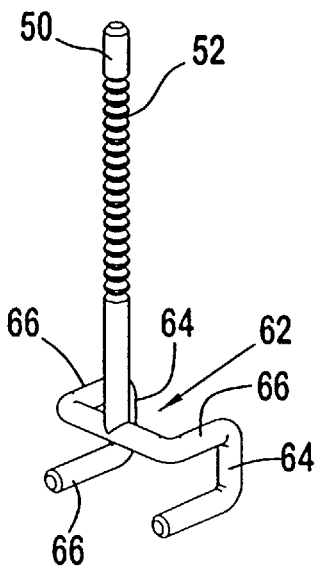
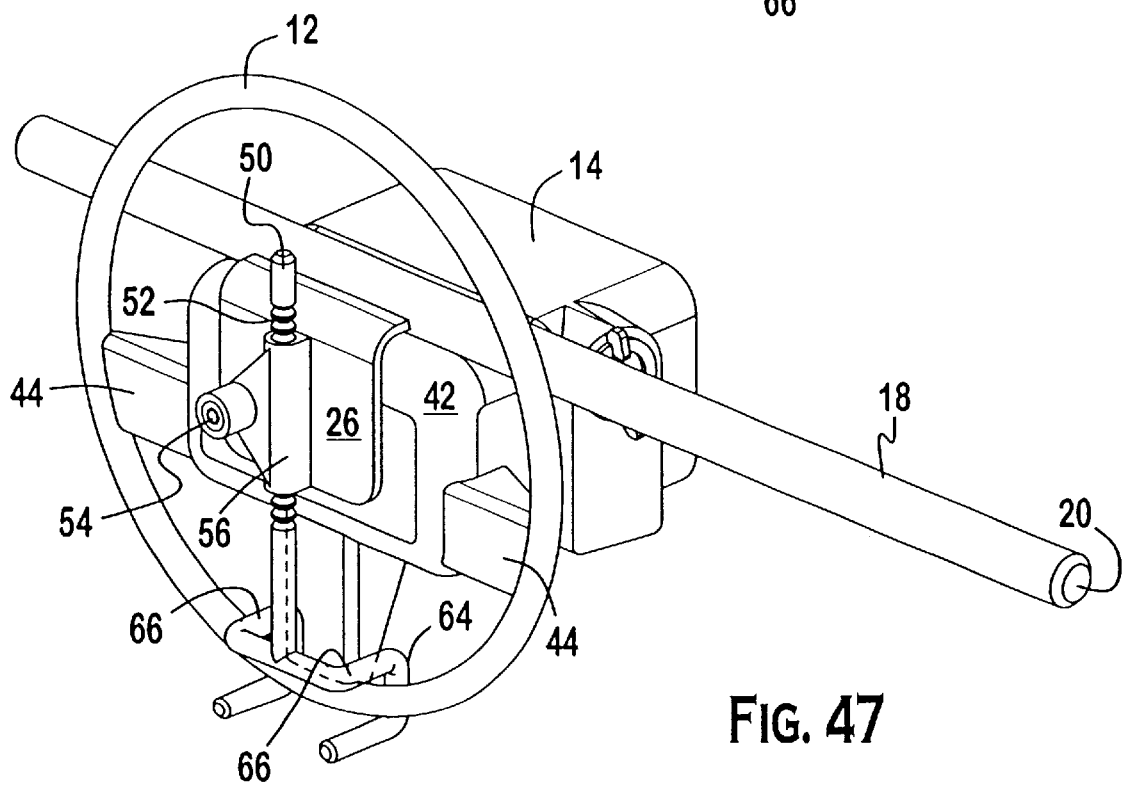

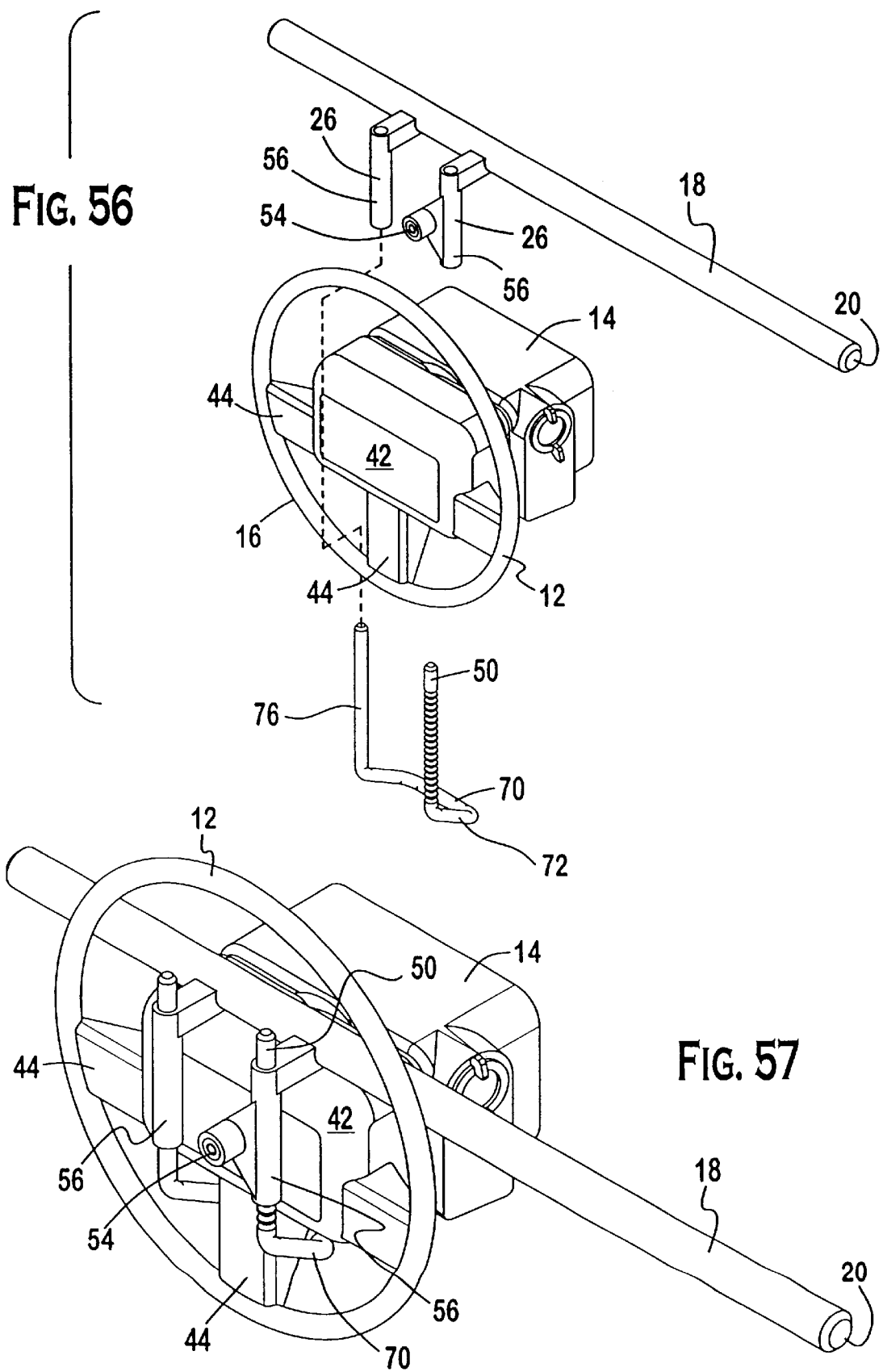

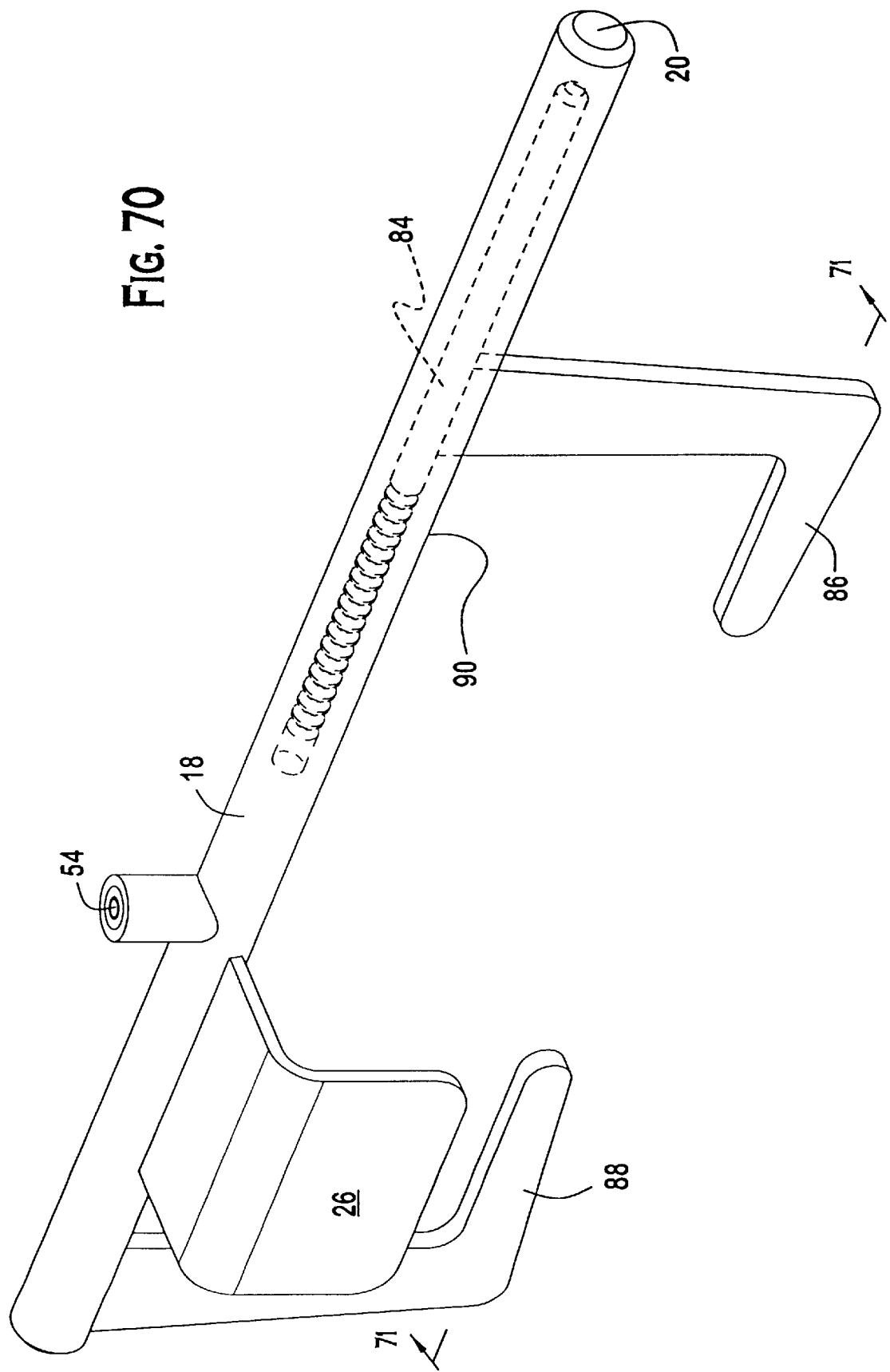

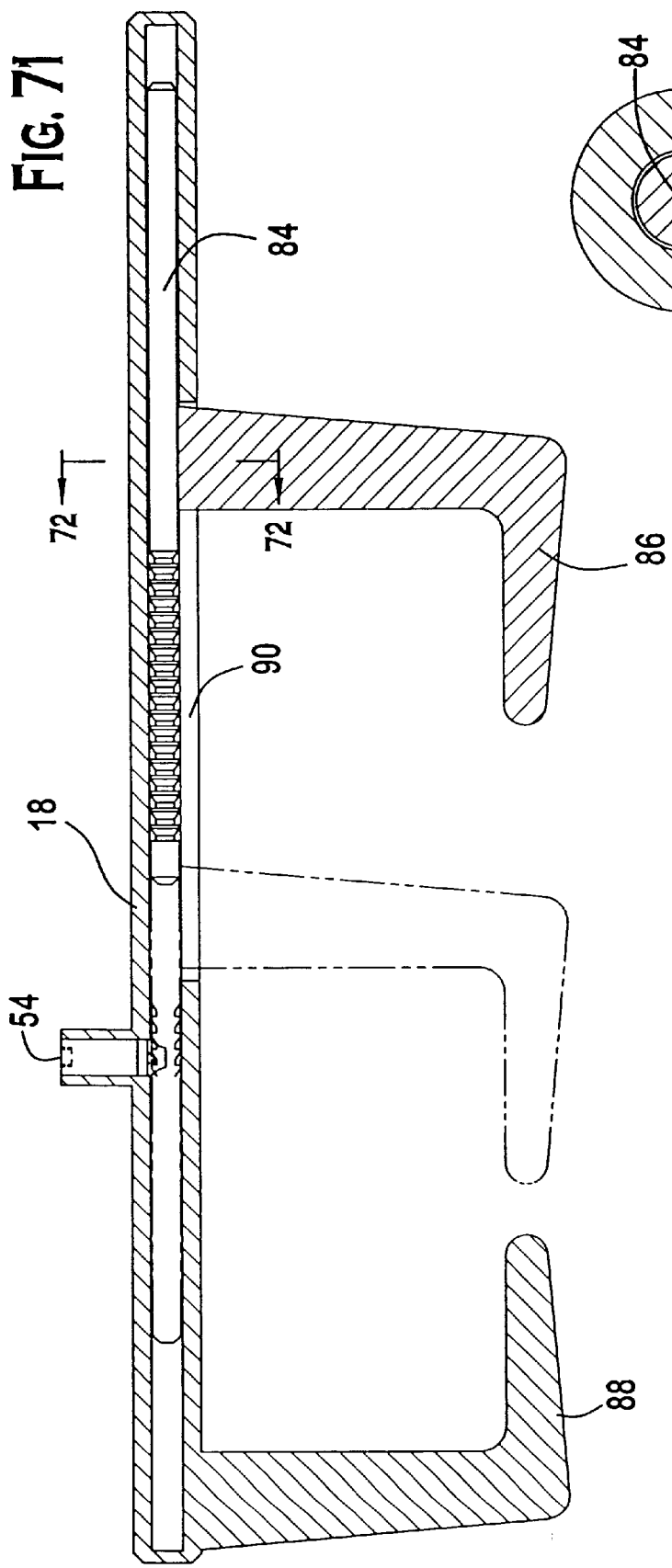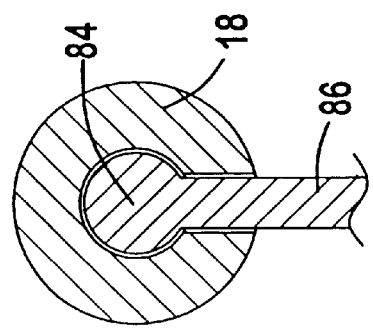

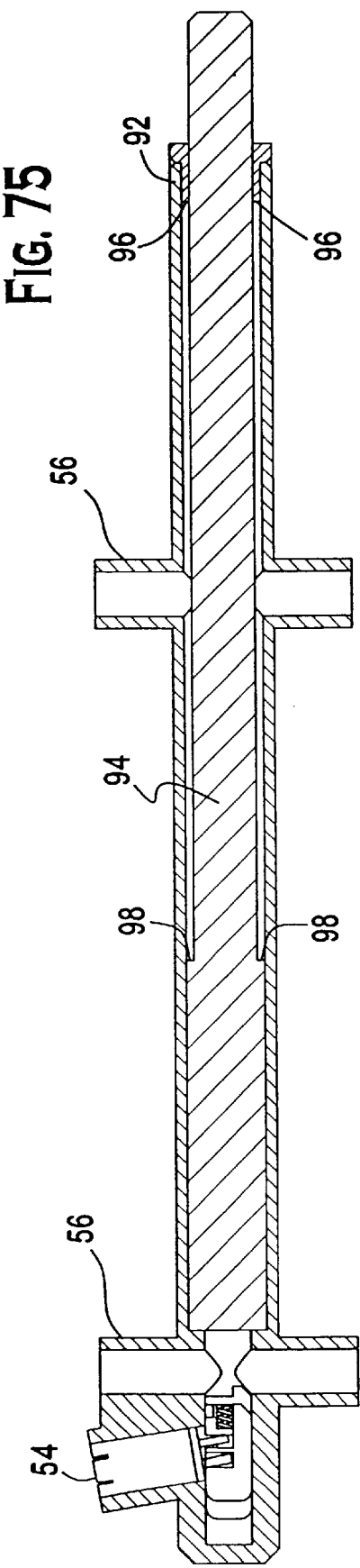
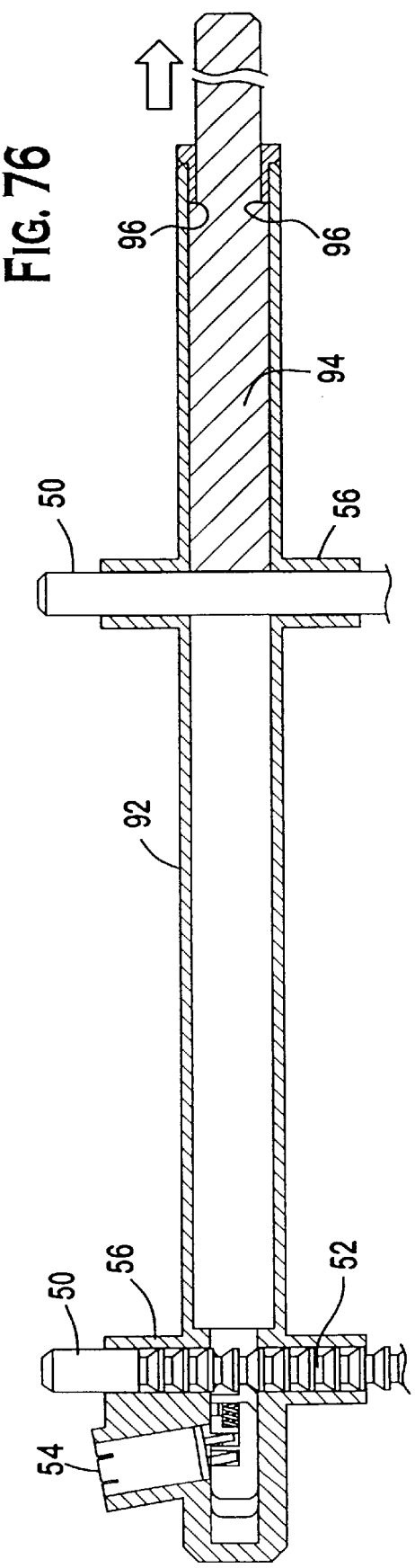

COLUMN LOCK DEVICE

CROSS REFERENCE TO RELATED APPLICATION

This application claims priority from and is a division of U.S. patent application Ser. No. 10/007,090, filed Dec. 7, 2001, entitled "Column Lock Device", now a U.S. Pat. No. 6,460,385 which is hereby incorporated by reference as if fully set forth herein.

BACKGROUND

The use of steering wheel anti-theft devices is known in the prior art. However, many of the prior art steering wheel anti-theft devices are easily defeated, clumsy in operation, or easy to remove by cutting the steering wheel.

Clearly, what is needed is a heavy duty steering wheel securing device that is adjustable for use with different types of vehicles, that is of sturdy manufacture, and that is highly resistant to improper removal by thieves or other unauthorized vehicle users.

SUMMARY

One embodiment of the present invention is directed to an anti-theft device for a vehicle. The anti-theft device is adapted to detachably engage a steering wheel rotatably mounted on a steering column. The steering wheel has a rim defining an outer perimeter of the steering wheel. The anti-theft device includes an elongated member having a first end and a longitudinal surface. The elongated member is adapted to be located proximate to the steering column. The first end extends generally radially outwardly away from the steering column past the outer perimeter of the steering wheel. At least one wheel engaging member is disposed on an elongated member and is adapted to engage the steering wheel and prevent rotation of the steering wheel relative to the elongated member. At least one column engaging member has a generally transverse part and at least one connecting part. The at least one column engaging member is adapted to detachably engage the elongated member to, in combination with the elongated member, substantially surround the steering column in an installed configuration in which the wheel engaging member is engaged with the steering wheel. A locking mechanism is adapted to detachably lock the anti-theft device in the installed configuration with a portion of the longitudinal surface of the elongated member in facing opposition with a portion of the transverse part of the at least one column engaging member.

In another aspect, the present invention is directed to an anti-theft device for a vehicle. The anti-theft device is adapted to detachably engage a steering wheel rotatably mounted on a steering column. The steering wheel has a rim defining an outer perimeter of the steering wheel. The anti-theft device includes an elongated member having first and second ends and a longitudinal surface. The elongated member is adapted to be located proximate to the steering column. The first end extends generally radially outwardly away from the steering column past the outer perimeter of the steering wheel. The second end extends outwardly past the outer perimeter of the steering wheel. At least one wheel engaging member is disposed on the elongated member and is adapted to engage the steering wheel and prevent rotation of the steering wheel relative to the elongated member. At least one column engaging member has a generally transverse part and at least one connecting part. The at least one column engaging member is adapted to detachably engage the elongated member to, in combination with the elongated member, substantially surround the steering column in an installed configuration in which the wheel engaging member is engaged with the steering wheel. A locking mechanism is adapted to detachably lock the anti-theft device in the installed configuration with a portion of the longitudinal surface of the elongated member in facing opposition with a portion of the transverse part of the at least one column engaging member.

In another aspect, the present invention is directed to an anti-theft device for a vehicle. The anti-theft device is adapted to detachably engage a steering wheel rotatably mounted on a steering column. The steering wheel has a rim defining an outer perimeter of the steering wheel. The anti-theft device includes an elongated member having a first end and a longitudinal surface. The elongated member is adapted to be located proximate to the steering column. The first end extends generally radially outwardly away from the steering column past the outer perimeter of the steering wheel. At least one wheel engaging member is disposed on the elongated member and is adapted to engage the steering wheel and prevent rotation of the steering wheel relative to the elongated member. At least one rim engaging member is detachably engageable with the at least one wheel engaging member and the rim of the steering wheel in an installed configuration in which the wheel engaging member is engaged with the steering wheel. A locking mechanism is adapted to detachably lock the anti-theft device in the installed configuration with a portion of the longitudinal surface of the elongated member being in facing opposition with at least a portion of the rim engaged by the at least one rim engaging member.

In another aspect, the present invention is directed to an anti-theft device for a vehicle. The anti-theft device is adapted to detachably engage a steering wheel rotatably mounted on a steering column. The steering wheel has a front side, facing generally away from the steering column, and a rear side, facing generally toward the steering column. The steering wheel has at least one spoke supporting a rim deforming an outer perimeter of the steering wheel. The anti-theft device includes an elongated member having a first end and a longitudinal surface. The elongated member is adapted to be located proximate to the steering column. The first end extends generally radially outwardly away from the steering column past the outer perimeter of the steering wheel. At least one wheel engaging member is disposed on the elongated member and is adapted to engage the steering wheel and prevent rotation of the steering wheel relative to the elongated member. A portion of the at least one wheel engaging member is disposed along the front side of the steering wheel. At least one spoke engaging member is detachably engageable with the at least one wheel engaging member and the at least one spoke in an installed configuration in which the wheel engaging member is engaged with the steering wheel. A locking mechanism is adapted to detachably lock the anti-theft device in the installed configuration wherein the longitudinal surface of the elongated member is in opposed facing engagement with a portion of the rim attached to the at least one spoke that is engaged with the at least one spoke engaging member.

In another aspect, the present invention is directed to an anti-theft device for a vehicle. The anti-theft device is adapted to detachably engage a steering wheel rotatably mounted on a steering column. The steering wheel has a rim defining an outer perimeter of the steering wheel. The anti-theft device includes an elongated member comprising a first part in sliding engagement with a second part and having a first end. The elongated member is adapted to be located proximate to the steering column. The first end extends generally radially outwardly away from the steering column past the outer perimeter of the steering wheel. At least one wheel engaging member is disposed on the elongated member and is adapted to engage the steering wheel and prevent rotation of the steering wheel relative to the elongated member. A first jaw is disposed on the first part of the elongated member and is adapted to abut a portion of the steering column. A second jaw is disposed on the second part of the elongated member and is adapted to abut a portion of the steering column and to, in combination with the first jaw, clamp the steering column therebetween in an installed configuration in which the wheel engaging member is engaged with the steering wheel. A locking mechanism is adapted to detachably lock the anti-theft device in the installed configuration.

In another aspect, the present invention is directed to an anti-theft device for a vehicle. The anti-theft device is adapted to detachably engage a steering wheel rotatably mounted on a steering column. The steering wheel has a rim defining an outer perimeter of the steering wheel. The anti-theft device includes an elongated member having a outer member slidable relative to an inner member. The outer member has a longitudinal surface and the inner member has a first end. The elongated member is adapted to be located proximate to the steering column. The first end is extendable generally radially outwardly away from the steering column past the outer perimeter of the steering wheel. At least one wheel engaging member is disposed on the elongated member and is adapted to engage the steering wheel and prevent rotation of the steering wheel relative to the elongated member. At least one column engaging member has a generally transverse part and at least one connecting part. The at least one column engaging member is adapted to detachably engage the elongated member to, in combination with the elongated member, substantially surround the steering column in an installed configuration in which the wheel engaging member is engaged with the steering wheel. A locking mechanism is adapted to detachably lock the anti-theft device in the installed configuration with a portion of the longitudinal surface of the elongated member in facing opposition with a portion of the transverse part of the at least one column engaging member.

In another aspect, the present invention is directed to a combination anti-theft device and steering wheel rotatably mounted on a steering column. The anti-theft device is detachably engageable with the steering wheel. The steering wheel has a rim defining an outer perimeter of the steering wheel. The anti-theft device includes the steering wheel mounted on the steering column. An elongated member has a first end and a longitudinal surface. The elongated member is located proximate to the steering column. The first end extends generally radially outwardly from the steering column past the outer perimeter of the steering wheel. At least one wheel engaging member is disposed on the elongated member and is engaged with the steering wheel to prevent rotation of the steering wheel relative to the elongated member. At least one column engaging member has a generally transverse part and at least one connecting part. The at least one column engaging member is detachably engaged with the elongated member to, in combination with the elongated member, substantially surround the steering wheel in an installed configuration in which the wheel engaging member is engaged with the steering wheel. A locking mechanism is adapted to detachably lock the anti-theft device in the installed configuration with a portion of the longitudinal surface of the elongated member in generally facing opposition with at least a portion of the rim engaged by the at least one rim engaging member.

In another aspect, the present invention is directed to a combination anti-theft device and steering wheel rotatably mounted on a steering column. The anti-theft device is detachably engageable with the steering wheel. The steering wheel has a rim defining an outer perimeter of the steering wheel. The anti-theft device includes the steering wheel mounted on the steering column. An elongated member has first and second ends and a longitudinal surface. The elongated member is located proximate to the steering column. The first end extends generally radially outwardly away from the steering column past the outer perimeter of the steering wheel. The second end extends outwardly past the outer perimeter of the steering wheel. At least one wheel engaging member is disposed on the elongated member and is engageable with the steering wheel to prevent rotation of the steering wheel relative to the elongated member. At least one column engaging member has a generally transverse part and at least one connecting part. The at least one column engaging member, in combination with the elongated member, is adapted to substantially surround the steering column in an installed configuration in which the wheel engaging member is engaged with the steering wheel. A locking mechanism is adapted to detachably lock the anti-theft device in the installed configuration with a portion of the longitudinal surface of the elongated member in generally facing opposition with the steering column.

In another aspect, the present invention is directed to a combination anti-theft device and steering wheel rotatably mounted on a steering column. The anti-theft device is adapted to detachably engage the steering wheel. The steering wheel has a rim defining an outer perimeter of the steering wheel. The anti-theft device includes the steering wheel mounted on the steering column. An elongated member has a first end and a longitudinal surface. The elongated member is located proximate to the steering column. The first end extends generally radially outwardly away from the steering column past the outer perimeter of the steering wheel. At least one wheel engaging member is disposed on the elongated member and is engageable with the steering wheel to prevent rotation of the steering wheel relative to the elongated member. At least one rim engaging member is detachably engaged with the at least one wheel engaging member and the rim of the steering wheel in an installed configuration in which the wheel engaging member is engaged with the steering wheel. A locking mechanism is adapted to detachably lock the anti-theft device in the installed configuration with a portion of the longitudinal surface of the elongated member being in generally facing opposition with the steering column.

In another aspect, the present invention is directed to a combination anti-theft device and steering wheel mounted on a steering column. The anti-theft device is detachably engageable with the steering wheel. The steering wheel has a front side, facing generally away from the steering column, and a rear side, facing generally toward the steering column. The steering wheel has at least one spoke supporting a rim defining an outer perimeter of the steering wheel. The anti-theft device includes an elongated member having a first end and a longitudinal surface. The elongated member is located proximate to the steering column. The first end extends generally radially outwardly away from the steering column past the outer perimeter of the steering wheel. At least one wheel engaging member is disposed on the elongated member and is adapted to engage the steering wheel and prevent rotation of the steering wheel relative to the elongated member. A portion of the wheel engaging member is disposed along the front side of the steering wheel. At least one spoke engaging member is detachably engaged with the at least one wheel engaging member and the at least one spoke in an installed configuration in which the wheel engaging member is engaged with the steering wheel. A locking mechanism is adapted to detachably lock the anti-theft device in the installed configuration wherein the longitudinal surface of the elongated member is in general facing opposition with a portion of the rim attached to the at least one spoke that is engaged with the at least one spoke engaging member.

In another aspect, the present invention is directed to a combination anti-theft device and steering wheel mounted on a steering column. The anti-theft device is detachably engageable with the steering wheel. The steering wheel has a rim defining an outer perimeter of the steering wheel. The anti-theft device includes an elongated member including a first part in sliding engagement with a second part and having a first end. The elongated member is located proximate to the steering column. The first end extends generally radially outwardly away from the steering column past the outer perimeter of the steering wheel. At least one wheel engaging member is disposed on the elongated member and is engageable with the steering wheel to prevent rotation of the steering wheel relative to the elongated member. A first jaw is disposed on the first part of the elongated member and is adapted to abut a portion of the steering column. A second jaw is disposed on the second part of the elongated member and is adapted to abut a portion of the steering column and to, in combination with the first jaw, clamp the steering column therebetween in an installed configuration in which the wheel engaging member is engaged with the steering wheel. A locking mechanism is adapted to detachably lock the anti-theft device in the installed configuration.

In another aspect, the present invention is directed to a combination anti-theft device and steering wheel rotatably mounted on a steering column. The anti-theft device is adapted to detachably engage the steering wheel. The steering wheel has a rim defining an outer perimeter of the steering wheel. The anti-theft device includes an elongated member having an outer member slidable relative to an inner member. The outer member has a longitudinal surface and the inner member has a first end. The elongated member is located proximate to the steering column. The first end is extendable generally radially outwardly away from the steering column past the outer perimeter of the steering wheel. At least one wheel engaging member is disposed on the.elongated member and is engageable with the steering wheel to prevent rotation of the steering wheel relative to the elongated member.

At least one column engaging member has a generally transverse part and at least one connecting part. The at least one column engaging member is detachably engageable with the elongated member to, in combination with the elongated member, substantially surround the steering column in an installed configuration in which the wheel engaging member is engaged with the steering wheel. A locking mechanism is adapted to detachably lock the anti-theft device in the installed configuration with a portion of the longitudinal surface of the elongated member in general facing opposition with the steering column.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 2 is a partial front elevational view of the anti-theft device of FIG. 1;

FIG. 3 is an elevational cross-sectional view of the anti-theft device of FIG. 1 illustrating an elongated bar, in combination with a column engaging member, surrounding the end of a steering column;

FIG. 4 is a left elevational view (with a portion of the steering wheel broken away) of the anti-theft device of FIG. 1 illustrating the elongated member, in combination with the column engaging member, substantially surrounding the steering column;

FIG. 5 is a cross-sectional view of the anti-theft device of FIG. 2 as taken along the line 5—5 of FIG. 2 illustrating a tube with a connecting part of the column engaging member disposed therein;

FIG. 6 is a cross-sectional view of the anti-theft device of FIG. 4 as taken along line 6—6 of FIG. 4 illustrating a locking mechanism securing a connecting part of the column engaging member to the elongated member;

FIG. 13 is a front elevational view of a fifth front elevational view of a preferred embodiment of an anti-theft device according to the present invention illustrating the elongated member being placed underneath the steering column;

FIG. 14 is a front elevational view of the anti-theft device of FIG. 13 illustrating the elongated member being positioned on the left side of the steering column;

FIG. 15 is a front elevational view of the anti-theft device of FIG. 13 illustrating the anti-theft device positioned along the right side of the steering column;

FIG. 16 is an exploded perspective view of a sixth embodiment of an anti-theft device according to the present invention;

FIG. 17 is a perspective view of the anti-theft device of FIG. 16 in an installed configuration with the L-shaped beams positioned to engage the spokes of the steering wheel rather than a hub;

FIG. 45 is a left side elevational view (with a portion of the steering wheel broken away) of the anti-theft device of FIG. 44;

FIGS. 46 and 47 are perspective views of a preferred fifteenth embodiment of an anti-theft device according to the present invention;

FIG. 56 is an exploded perspective view of an eighteenth preferred embodiment of an anti-theft device according to the present invention;

FIG. 57 is a perspective view of the anti-theft device of FIG. 56 in the installed configuration;

FIG. 70 is perspective view of a twenty third preferred embodiment of the present invention;

FIG. 71 is a cross-sectional view of the anti-theft device of FIG. 70 as taken along the line 71—71 in FIG. 70;

FIG. 72 is a cross-sectional view of the anti-theft device of FIG. 71 as taken along the line 72—72 of FIG. 71;

FIG. 75 is a cross-sectional view of the anti-theft device of FIG. 73 as taken along the line 75—75 in FIG. 73;

FIG. 76 is a cross-sectional partial view of the anti-theft device of FIG. 74 as taken along the line 76—76 in FIG. 74;

DETAILED DESCRIPTION OF THE PREFERRED EMBODIMENTS

Figure 1:
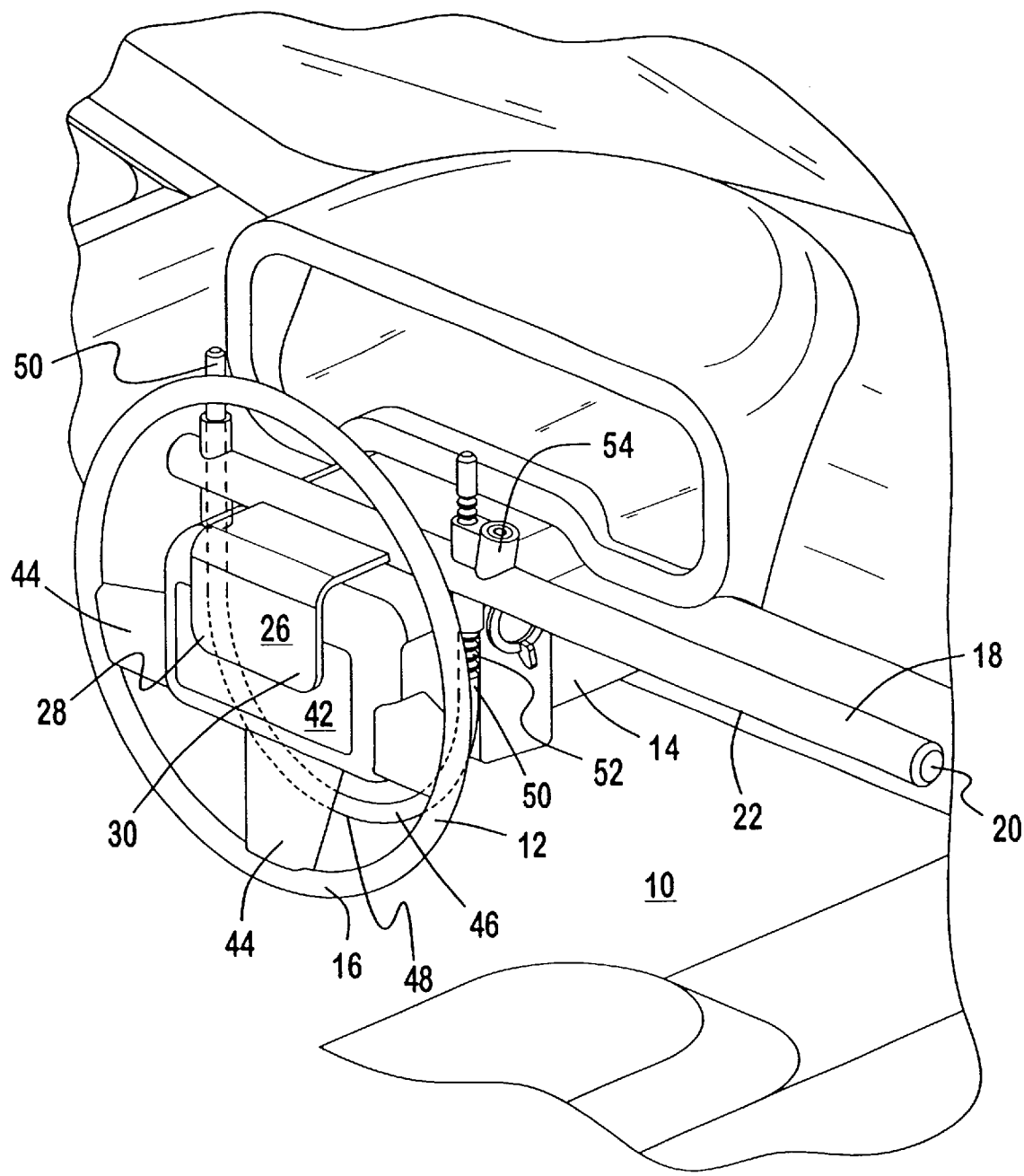
FIG. 1 is a perspective view of a first preferred embodiment of an anti-theft device according to the present invention installed in a vehicle.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the anti-theft device and designated parts thereof. The terminology includes the words above specifically mentioned, derivatives thereof, and words of similar import. Additionally, the words "a" and "one" are defined as including one or more of the referenced item unless specifically stated otherwise. Furthermore, the words "generally radially outwardly from the steering column," as used in the claims and in corresponding portions of the specification, are defined as including elongated members that are tangent to the steering column or generally tangent to the steering column except for a small space between the steering column and elongated member.

Figure 81:
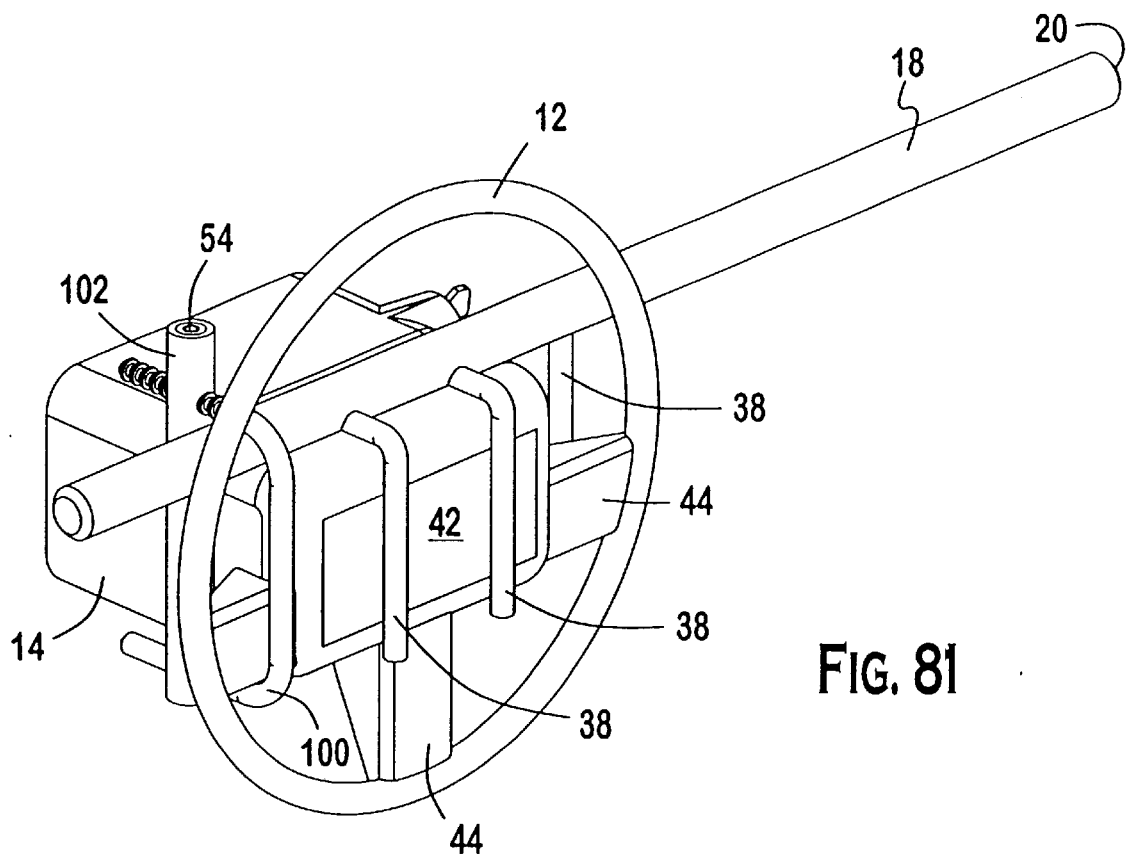
FIG. 81 is a perspective view of a the anti-theft device of FIG. 80 in the installed configuration.

Referring to FIGS. 1–81, wherein like numerals indicate like elements throughout, there are shown preferred embodiments of an anti-theft device according to the present invention. Briefly stated, the anti-theft device is attached to a vehicle 10 to limit the motion of a steering wheel 12 to deter theft of the vehicle 10.

It is preferred that the anti-theft device, and its individual components, be formed of a high strength, durable, impact resistant material, such as stainless steel. Those or ordinary skill in the art would appreciate that any other suitable steels, alloys or the like that are suitable for use with anti-theft devices can be used without departing from of the present invention. Preferably, an outer surface of the anti-theft device is coated with a brightly colored paint or coating, such as a fluorescent orange colored paint or vinyl coating, so that the anti-theft device is prominently visible and noticeable when installed on the vehicle 10.

Referring to FIGS. 1–7, one embodiment of the anti-theft device for vehicle is adapted to detachably engage the steering wheel 12 which is rotatable mounted on a steering column 14. The steering wheel 12 has a rim 16 defining an outer perimeter of the steering wheel 12. The rim of the steering wheel can be irregularly shaped without departing from the scope of the present invention.

Figure 61:
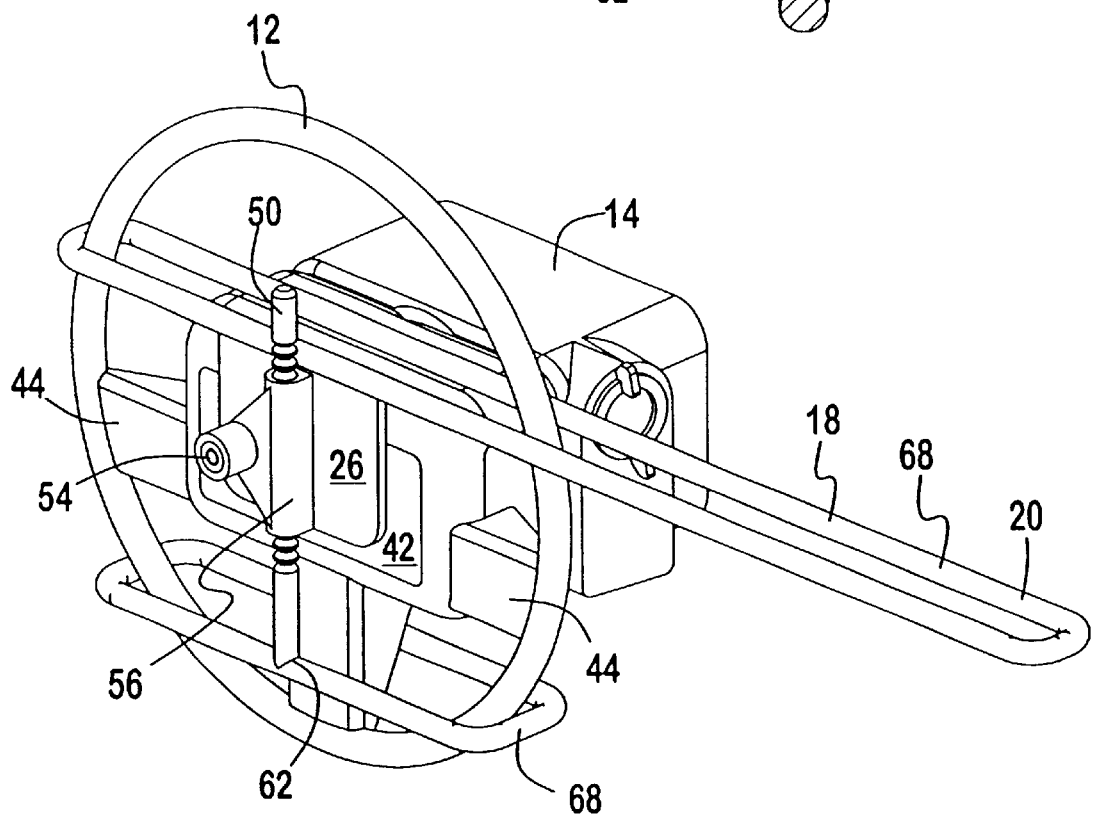
FIG. 61 is a perspective view of a twentieth preferred embodiment of an anti-theft device according to the present invention.
Figure 62:
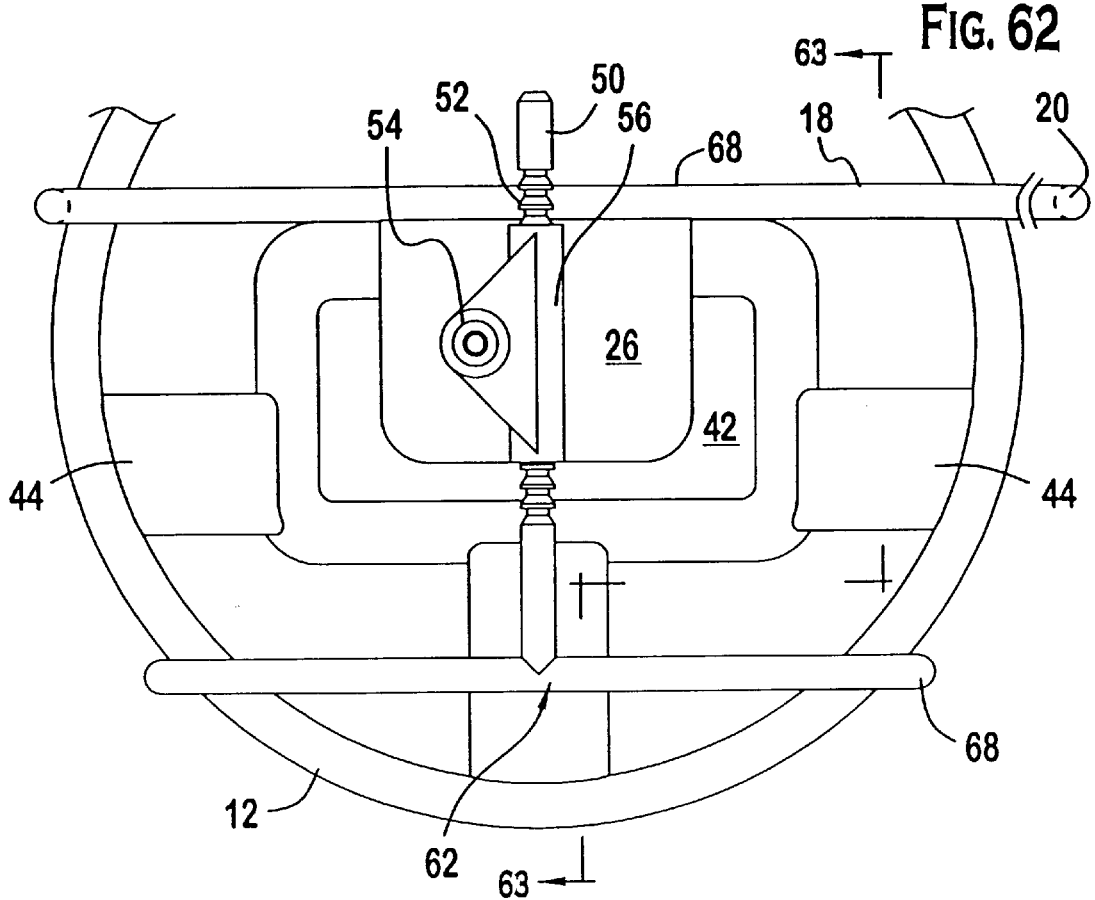
FIG. 62 is a front elevational partial view of the anti-theft device of FIG. 61.
Figure 63:
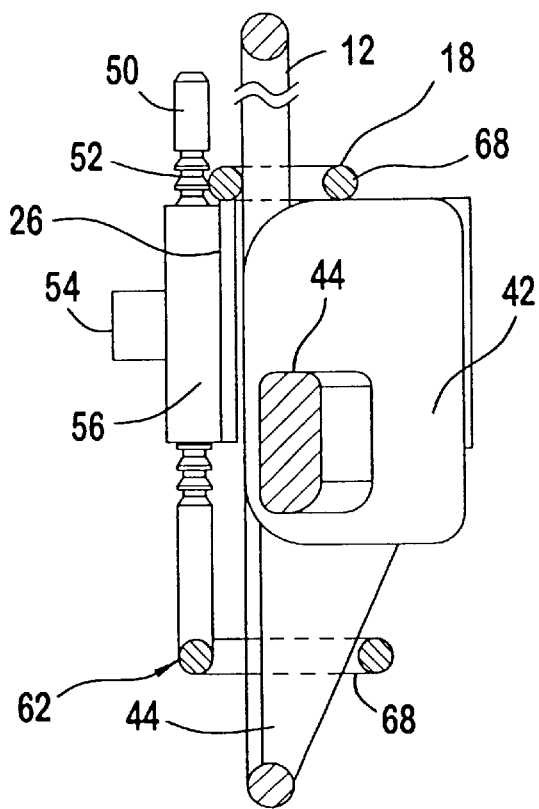
FIG. 63 is a cross-sectional view of the anti-theft device of FIG. 62 as taken along the line 63—63 in FIG. 62.

The vehicle anti-theft device includes an elongated member 18 having a first end 20 and a longitudinal surface 22. The elongated member 18 is adapted to be located proximate to the steering column 14. Referring briefly to FIGS. 31 and 61–63 the elongated member can have a cross sectional shape of any one of a square, a rectangle, a circle, an ellipse, a polygon or the like without departing from the present invention. Additionally, the elongated member 18 can be an elongated ring (as shown in FIGS. 61–63) without departing from the scope of the present invention. Referring still to FIGS. 1–7, the first end 20 of the elongated member 18 preferably extends generally radially outwardly away from the steering column 14 past the outer perimeter of the steering wheel 12. It is preferable that the elongated member be adapted to be located on a portion of the steering column with the elongated member being generally, but not necessarily, perpendicular to a central axis oft his steering column 14. When installed the elongated member 18 can be positioned at the joint between the steering wheel 12 and the steering column 14 (as shown in FIG. 3) to substantially surround the end of the steering column 14. Alternatively, the elongated member 18 can be positioned over a central portion of the steering column (as shown in FIG. 4) without departing from the present invention.

Figure 77:
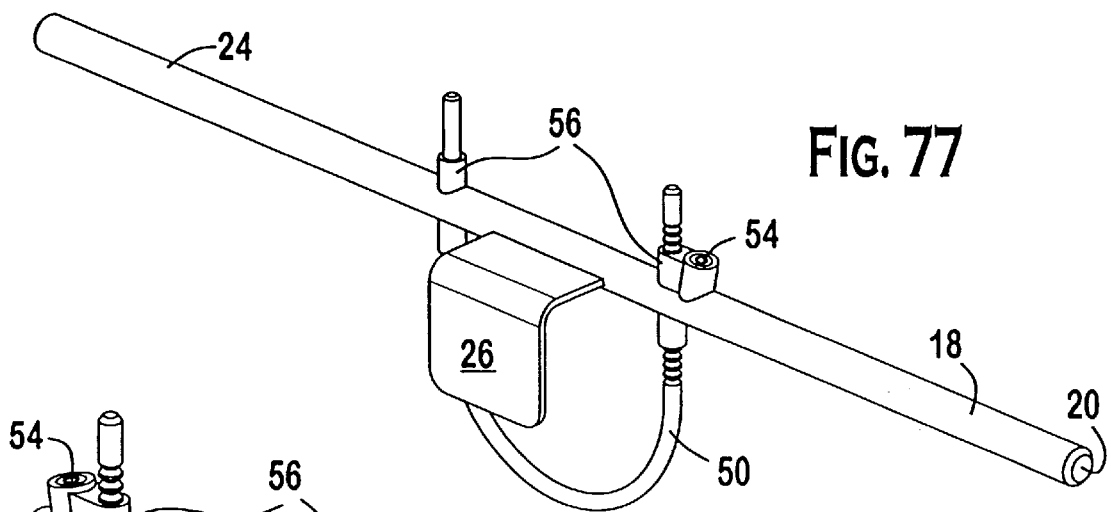
FIG. 77 is a perspective view of a twenty fifth preferred embodiment of an anti-theft device according to the present invention.

Referring to FIG. 77, the elongated member 18 may have a second end 24 extending past the outer perimeter of the steering wheel 12 without departing from the scope of the present invention. When such an anti-theft device is in the installed configuration,. rotating the steering wheel in either direction (if possible depending on the engagement between the column engaging member 46 and the steering column 14) causes the elongated member to likely contact the right portion of the front windshield or the.left door of the vehicle.

At least one wheel engaging member 26 is preferably disposed.on the elongated member 18 and is adapted to engage the steering wheel 12 to prevent rotation of the steering wheel relative to the elongated member 18. The wheel engaging member 26 preferably includes a generally L-shaped plate 28 having one leg 30 that is adapted to overlay a front side portion of the steering wheel 12. Referring to FIG. 2, it is preferable, but not necessary, that the one leg 30 be adapted to overlay an air bag disposed in the steering wheel 12. As is known to those of ordinary skills in the art, the air bag 32 can be powered by a gas canister 34.

Figures 7, 8:
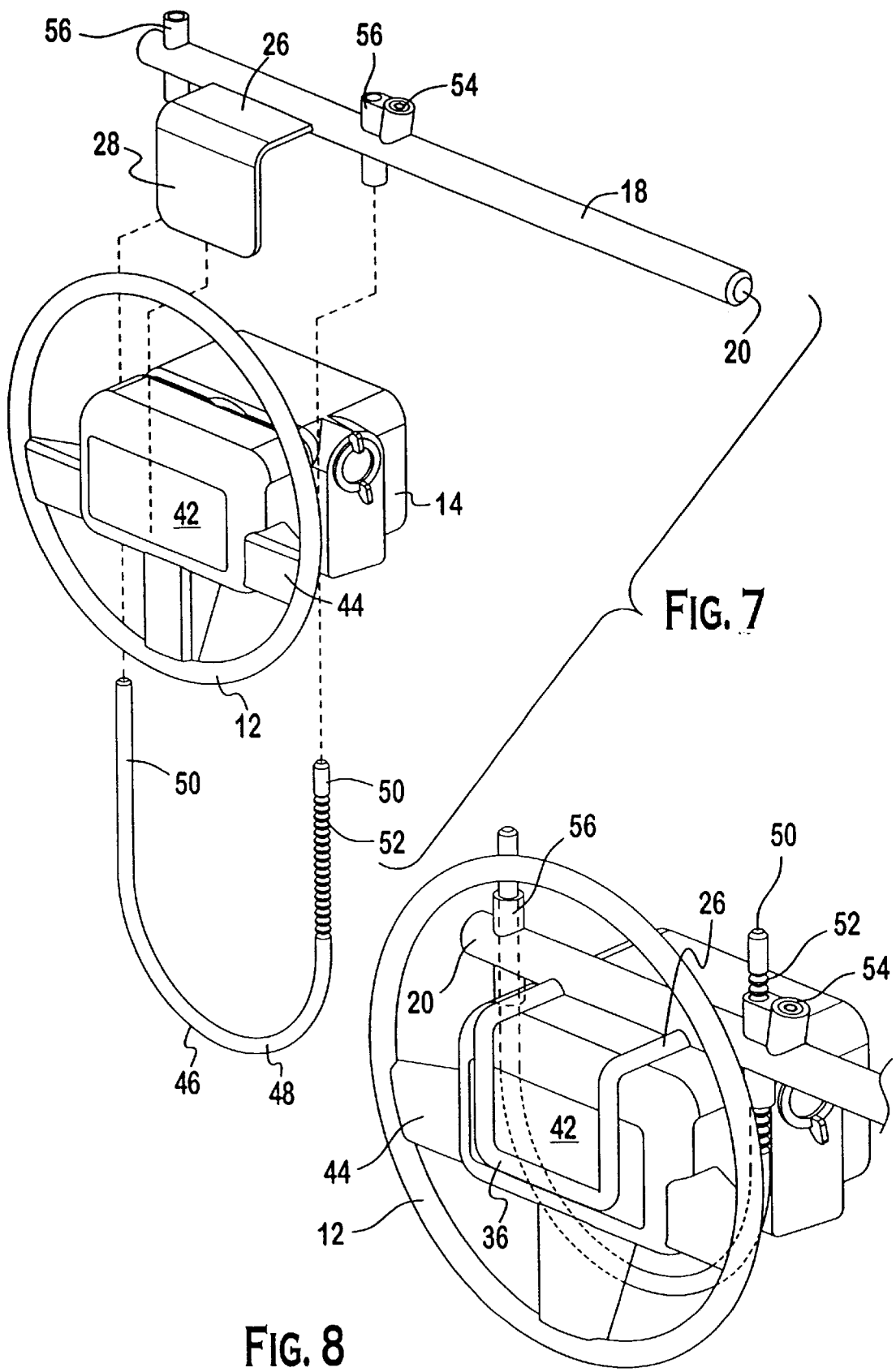
FIG. 7 is an exploded perspective view of the anti-theft device of FIG. 1 with dashed lines to indicate the proper assembly of the anti-theft device into the installed configuration (shown in FIG. 1)
FIG. 8 is a perspective partial view of a second embodiment of an anti-theft device according to the present invention illustrating a wheel engaging member formed of tube framing.
Figure 9:
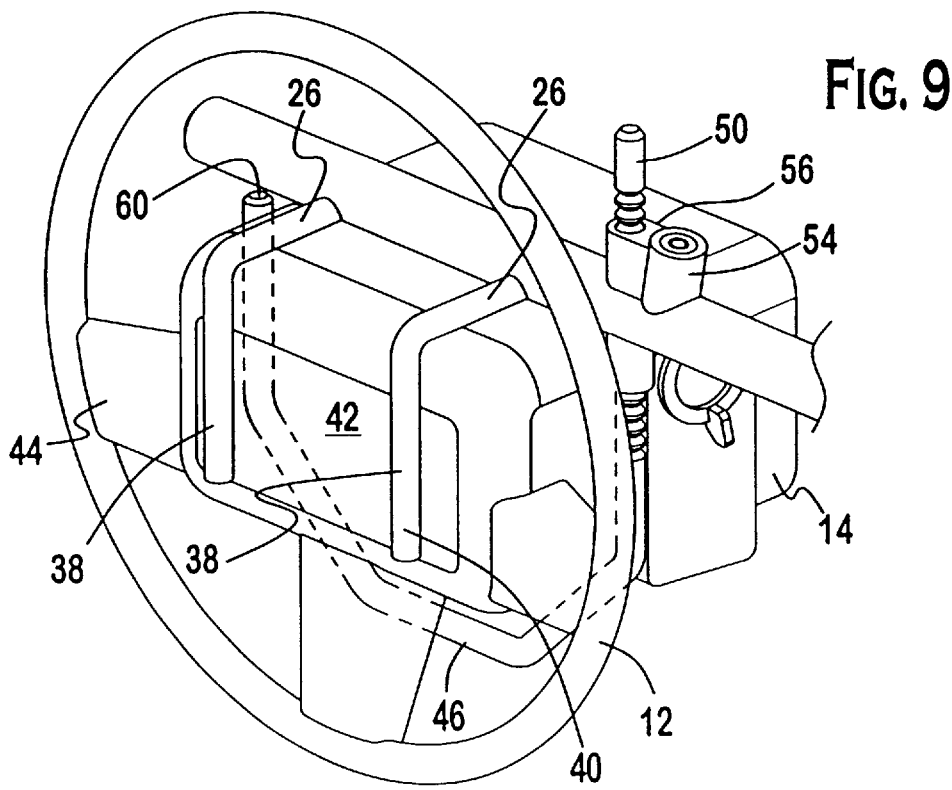
FIG. 9 is a third preferred embodiment of an anti-theft device according to the present invention illustrating two generally L-shaped beams serving as the wheel engaging member and illustrating a column engaging member that is only attached to the elongated member at one location.
Figure 10:
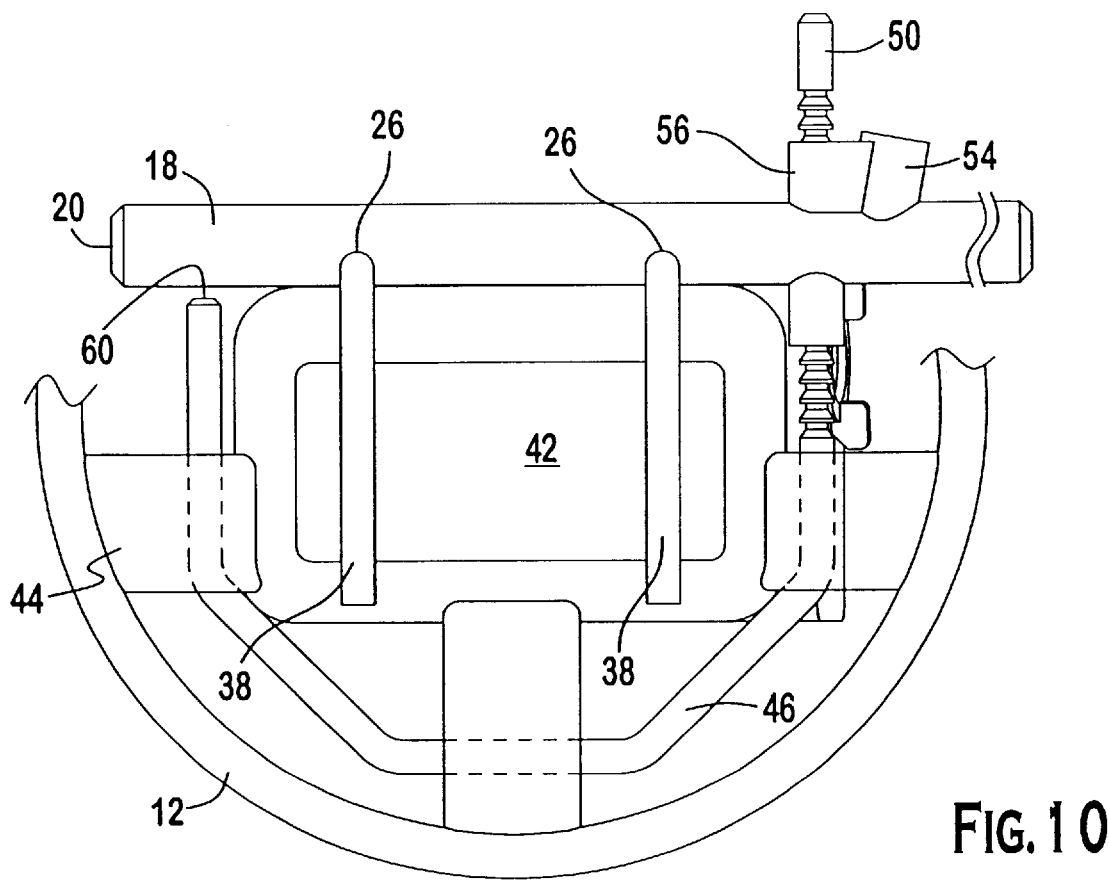
FIG. 10 is a front elevational partial view of the anti-theft device of FIG. 9.
Figure 11:
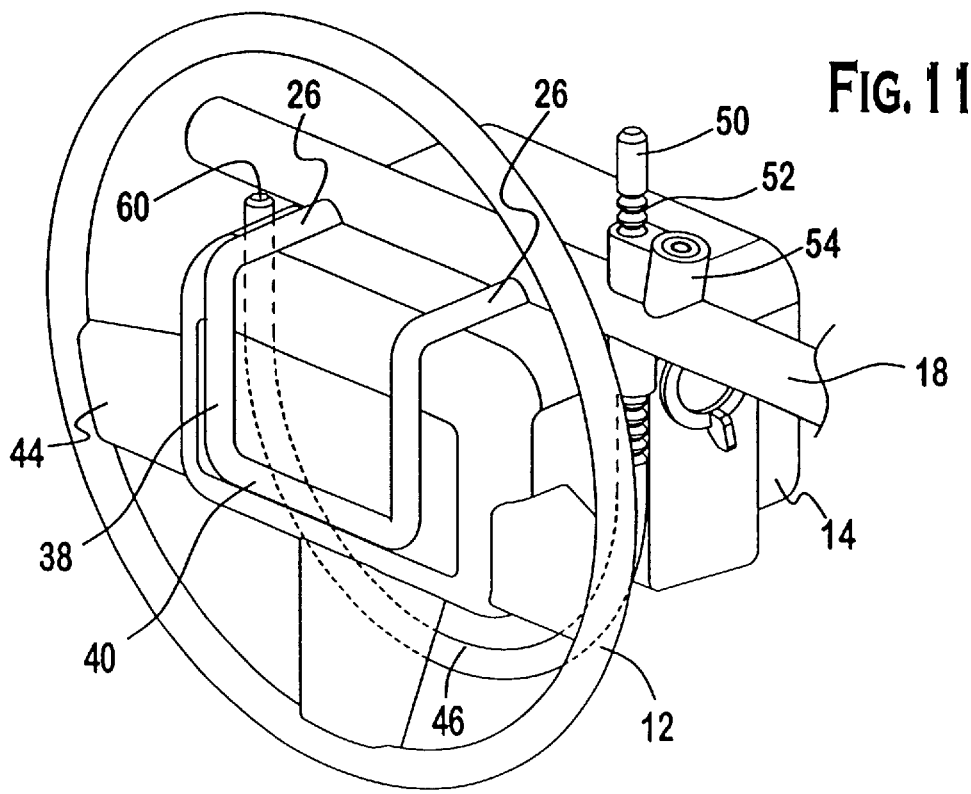
FIG. 11 is a fourth preferred embodiment of an anti-theft device according to the present invention.
Figure 12:
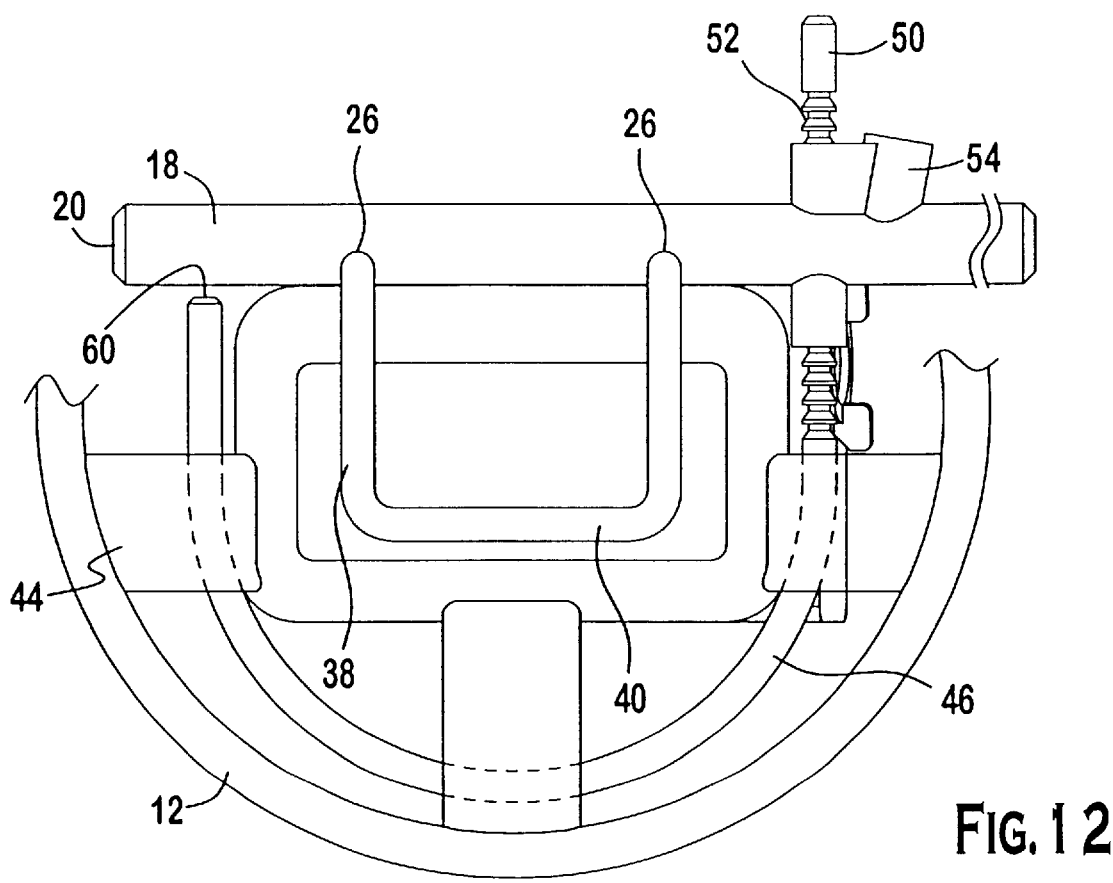
FIG. 12 is a front elevational partial view of the anti-theft device of FIG. 11.
Figure 18:
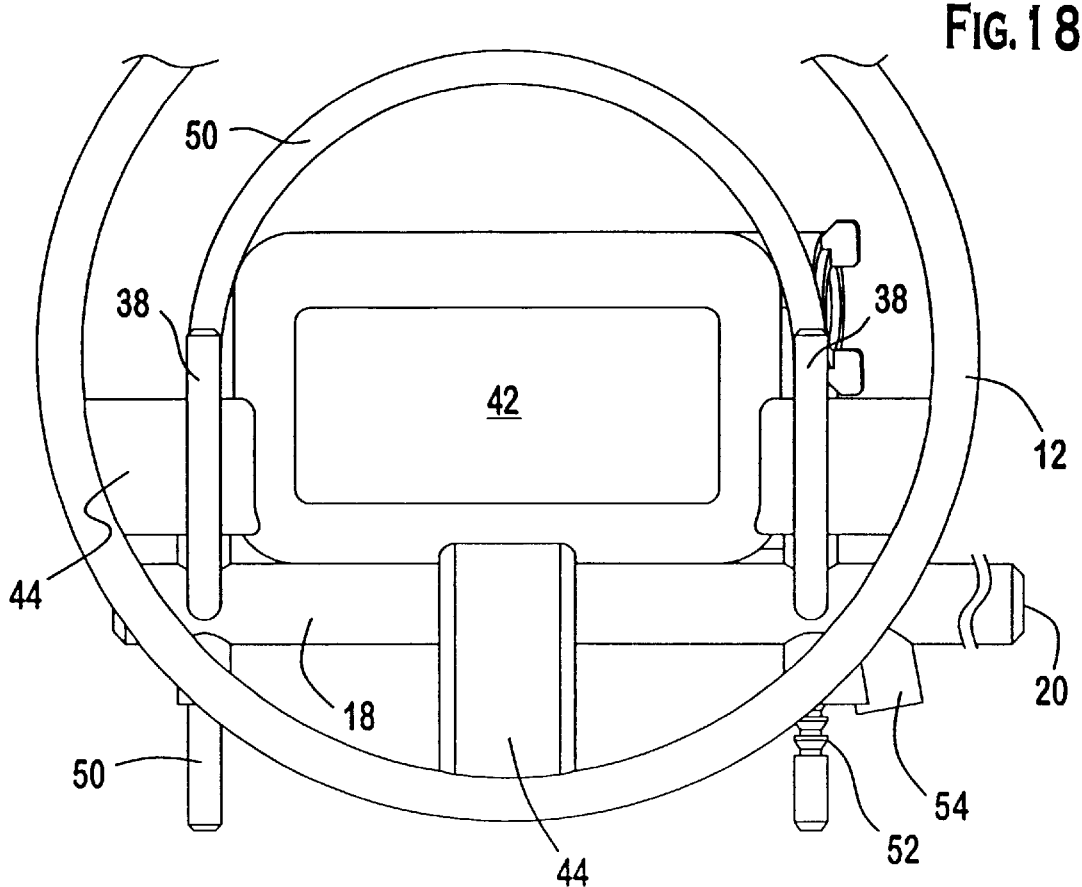
FIG. 18 is a front elevational partial view of the anti-theft device of FIG. 16.
Figure 19:
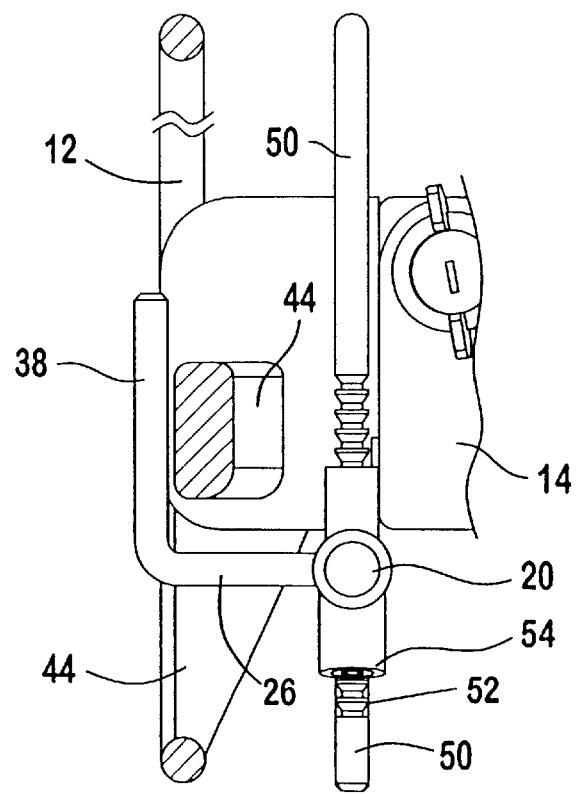
FIG. 19 is a left side elevational view (with a portion of the steering wheel broken away) of the anti-theft device of FIG. 16.
Figure 20:
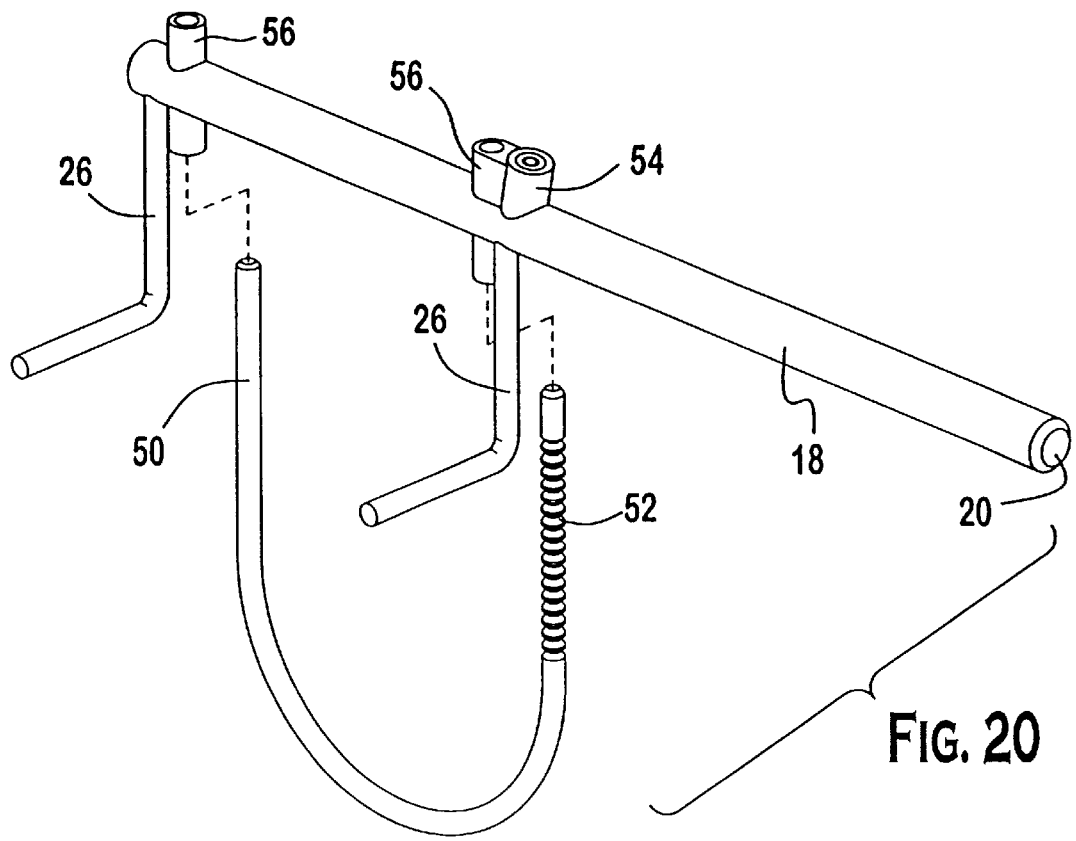
FIG. 20 is an exploded perspective view of a seventh embodiment of an anti-theft device according to the present invention illustrating L-shaped beams which form the wheel engaging member and which extend generally downwardly from the elongated member.
Figure 21:
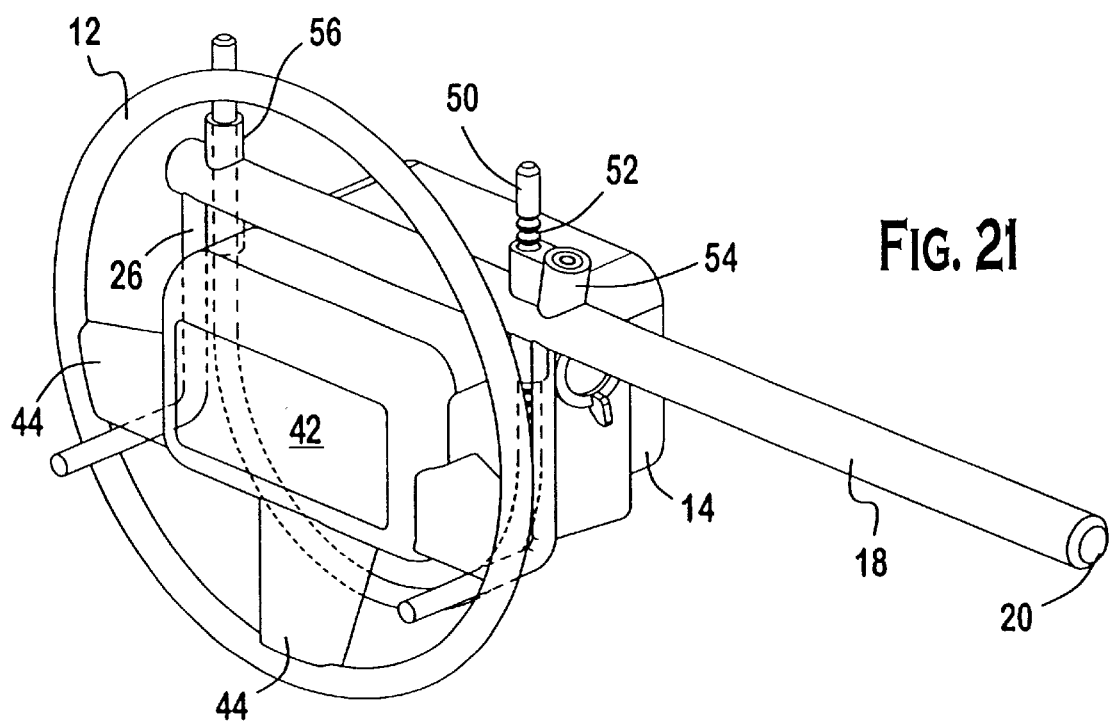
FIG. 21 is a perspective view of the anti-theft device of FIG. 20 in the installed configuration.
Figure 22:
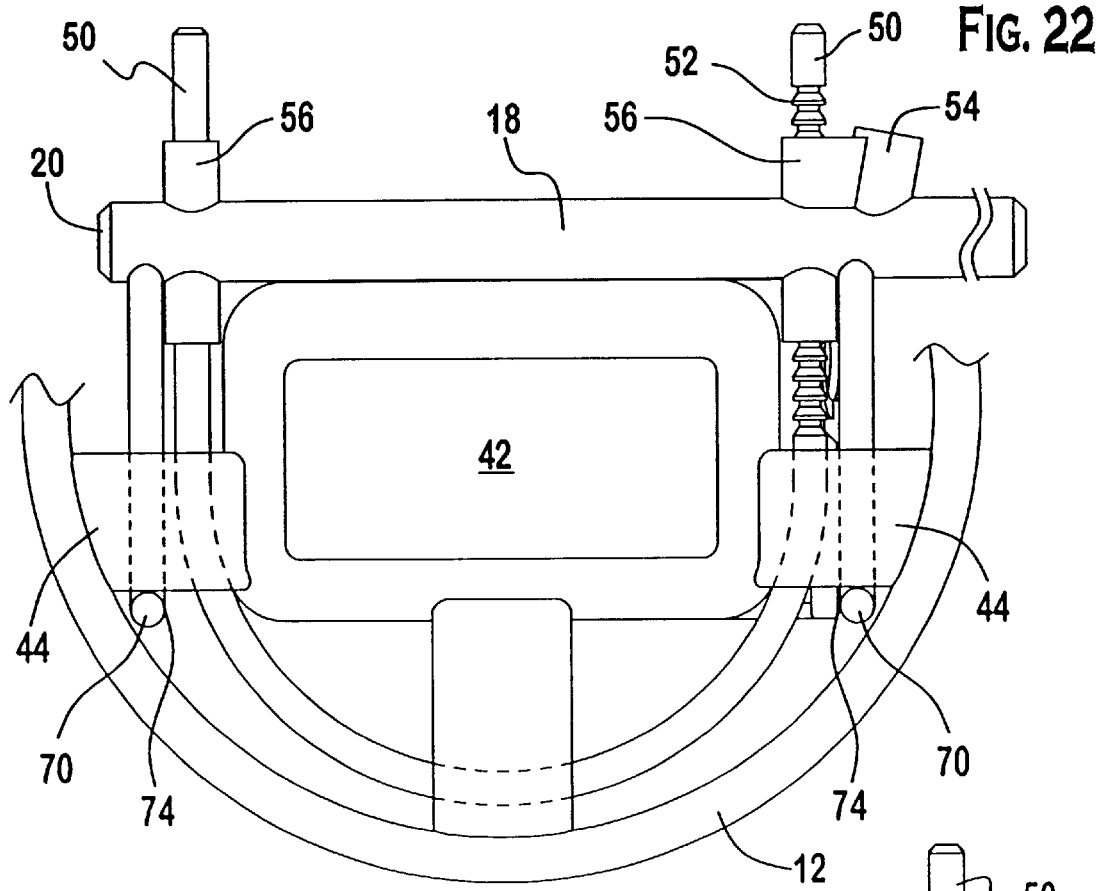
FIG. 22 is a front elevational partial view of the anti-theft device of FIG. 20.
Figure 23:
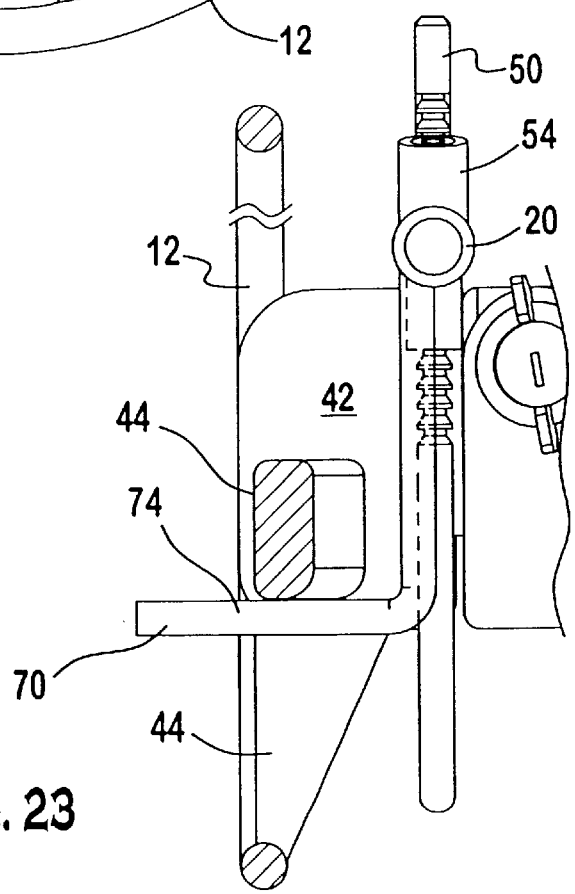
FIG. 23 is a left side elevational view (with a portion of the steering wheel broken away) of the anti-theft device of FIG. 20.
Figure 24:
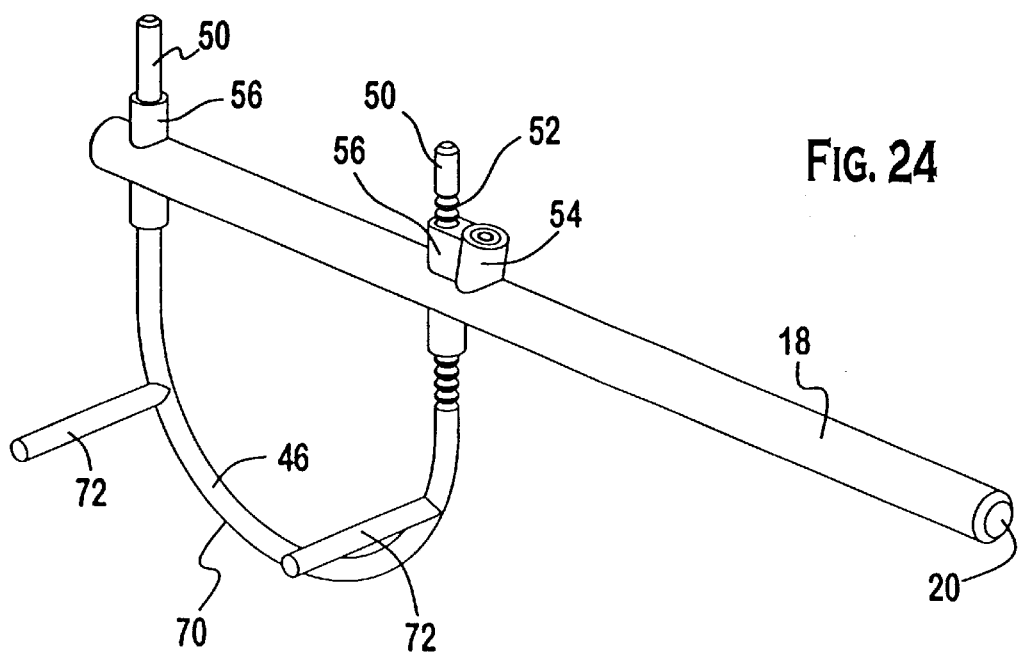
FIG. 24 is a perspective view of an eighth preferred embodiment of an anti-theft device according to the present invention.
Figure 25:
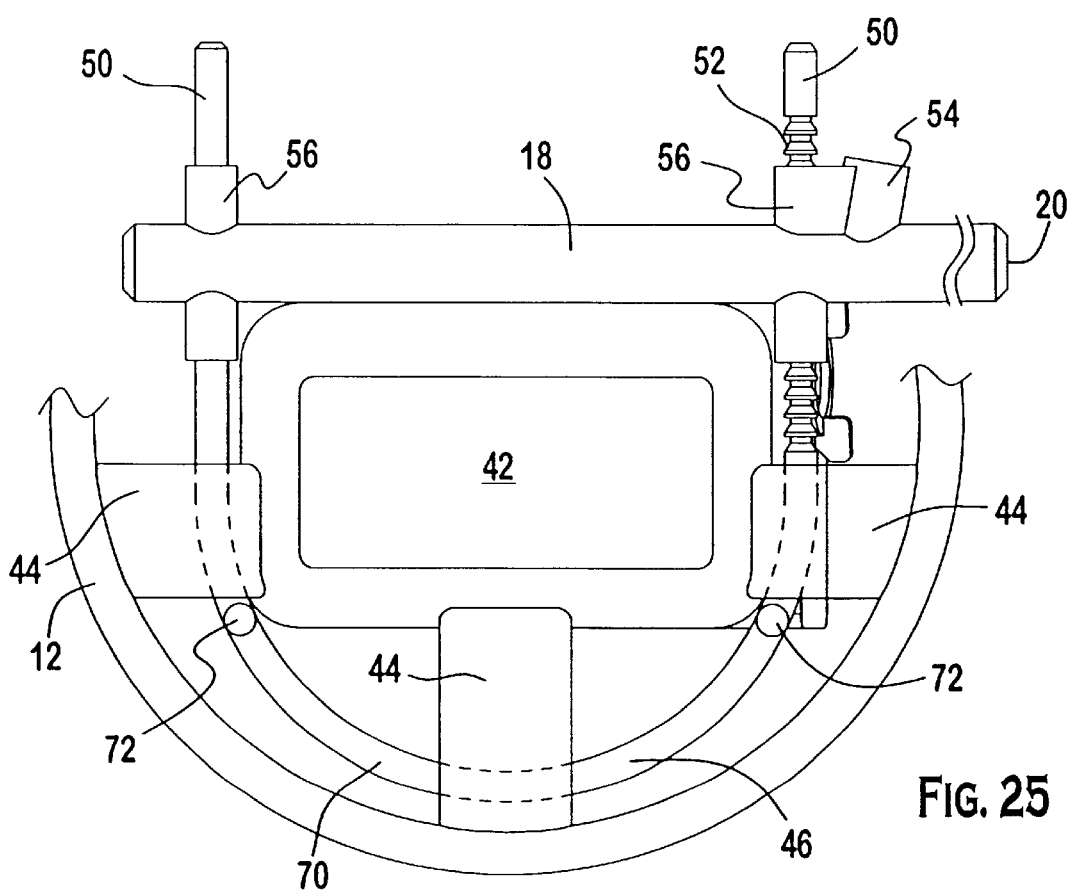
FIG. 25 is a front elevational partial view of the anti-theft device of FIG. 24 illustrating the anti-theft device engaging the spokes of the steering wheel.
Figure 26:
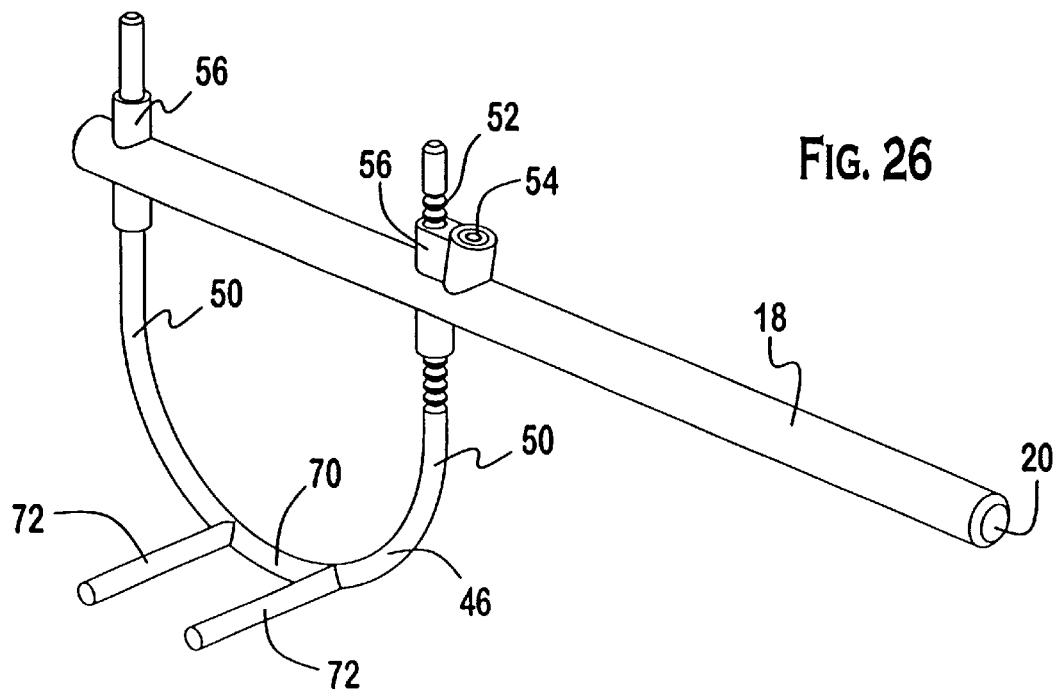
FIG. 26 is a perspective view of a ninth preferred embodiment of an anti-theft device according to the present invention.
Figure 27:
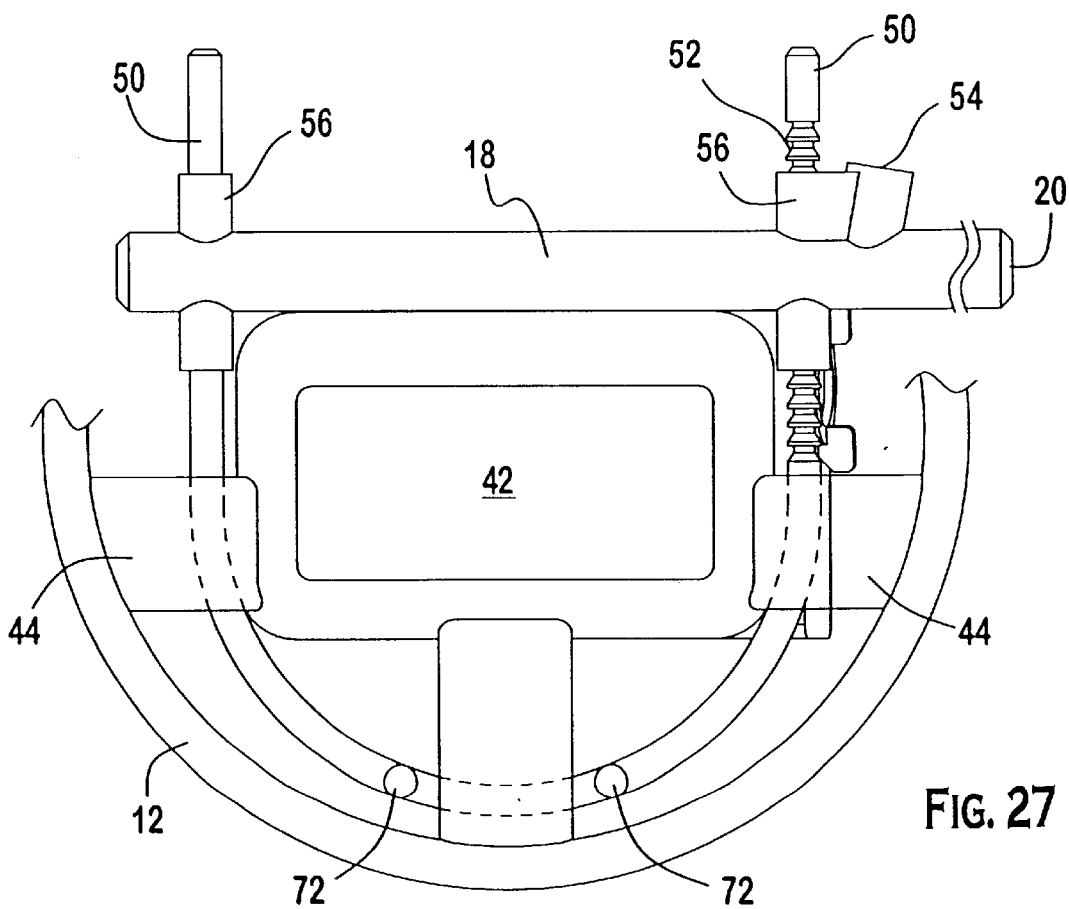
FIG. 27 is a front elevational partial view of the anti-theft device of FIG. 26 illustrating that the anti-theft device can engage the steering wheel by positioning a projection on each side of a single spoke.

Referring to FIG. 8, the wheel engaging member 26 can be formed by a tubular frame 36 without departing from the scope of the present invention. Referring to FIGS. 9 and 10, the wheel engaging member 26 can be formed by at least one generally L-shaped beam 38 having one leg 40 that is adapted to overlay a front side portion of the steering wheel 12. One advantage of using L-shaped beams 38 as the wheel engaging member 26 is that it allows the anti-theft device to be installed in any configuration on the steering wheel 12 and the steering column 14. Referring to FIGS. 13–15, the anti-theft device can be installed in any orientation. Referring to FIG. 13, the elongated bar 18 can be positioned underneath the steering column 14 to extend leftwardly therefrom. Referring to FIG. 14, the anti-theft device can be installed on the left side of the steering column 14 with the elongated member 18 extending generally upwardly past the top of the steering column 14. Referring to FIG. 15, the anti-theft device can be positioned on the right side of the steering column 14 with the elongated member 18 extending generally downwardly past the bottom of the steering column. Additionally, the anti-theft device shown in FIGS. 13–15 can be positioned on top of the steering column in a position similar to that as shown in FIG. 1. This tremendous versatility of installation allows the anti-theft device to be optimally positioned depending on the characteristics of the vehicle 10 in which it is installed.

It should also be noted that the L-shaped beams 38 shown in FIGS. 13–15 are positioned close enough to overlay a portion of the hub 42 of the steering wheel 12 and any air bag contained therein. Referring to FIGS. 16–19, the L-shaped beams 38 can be spaced so as to engage multiple spokes 44 of the steering wheel 12. As such, the front side portion of the steering wheel 12 being engaged by the L-shaped beams 38 can be any spoke(s) 44 of the steering wheel 12 without departing from the scope of the present invention. Referring again to FIGS. 13–15, the front side portion of the steering wheel that is overlaid by the L-shaped beams 38 can also be the hub 42 of the steering wheel.

Referring again to FIGS. 1–7 at least one column engaging member 46 has a generally transverse part 48 and at least one connecting part 50. It is preferable, but not necessary, that the connecting part 50 have ratchets thereon to allow a locking mechanism 54 to detachably secure the column engaging member 46 to the elongated member 18.

As best shown in FIG. 5, the connecting part 50 that is secured by the locking mechanism 54 preferably has ratchets 52 located thereon. The ratchets include downwardly beveled surfaces 52' and flat bottom surfaces 54' while the locking mechanism 54 preferably includes a sliding lock mechanism 56' that engages the ratchets 52 to prevent the column engaging member 46 from being pulled downwardly out of the tube 56. The sliding lock mechanism 56' is biased by a biasing member 58', such as a spring, into the locked position, (shown in solid lines for component 56' in FIG. 6). When a key or other activation mechanism is used to activate the locking mechanism 54, the sliding block mechanism 56' is moved rightwardly into an unlocked position (shown by phantom lines for component 56' in FIG. 6) which disengages a lip 60 of the sliding lock mechanism 56' from the ratchets 52 to allow the column engaging member 46 to be downwardly removed from the tube 56. While one preferred embodiment of a locking mechanism have been shown in the drawings, those of ordinary skill in the art will appreciate from this disclosure that any known locking mechanism can be used to secure the column engaging member 46 to the elongated member 18 without departing from the scope of the present invention.

Figure 64:
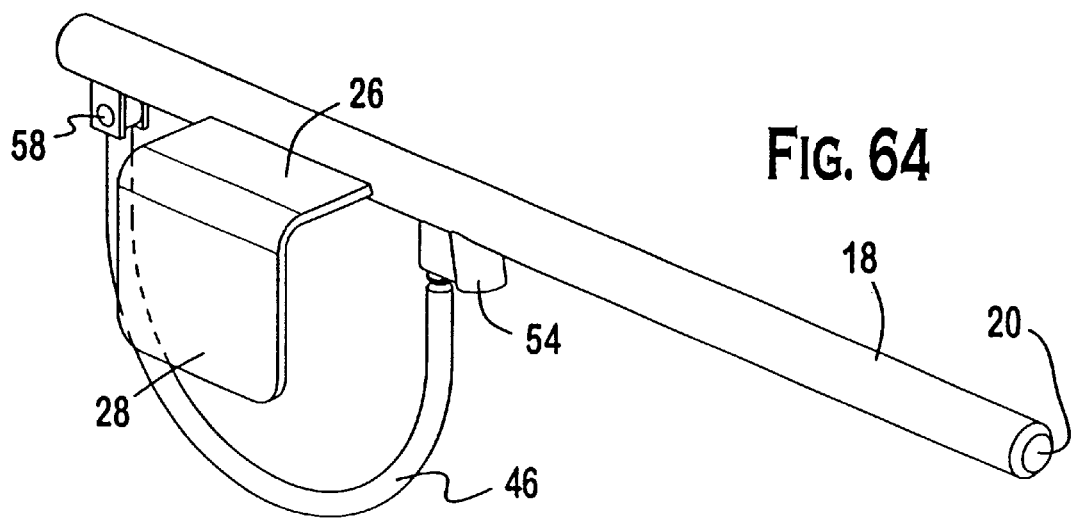
FIG. 64 is a perspective view of a twenty-first preferred embodiment of an anti-theft device according to the present invention illustrating a column engaging member that is pivotally attached to the elongated member via a hinge.
Figure 65:
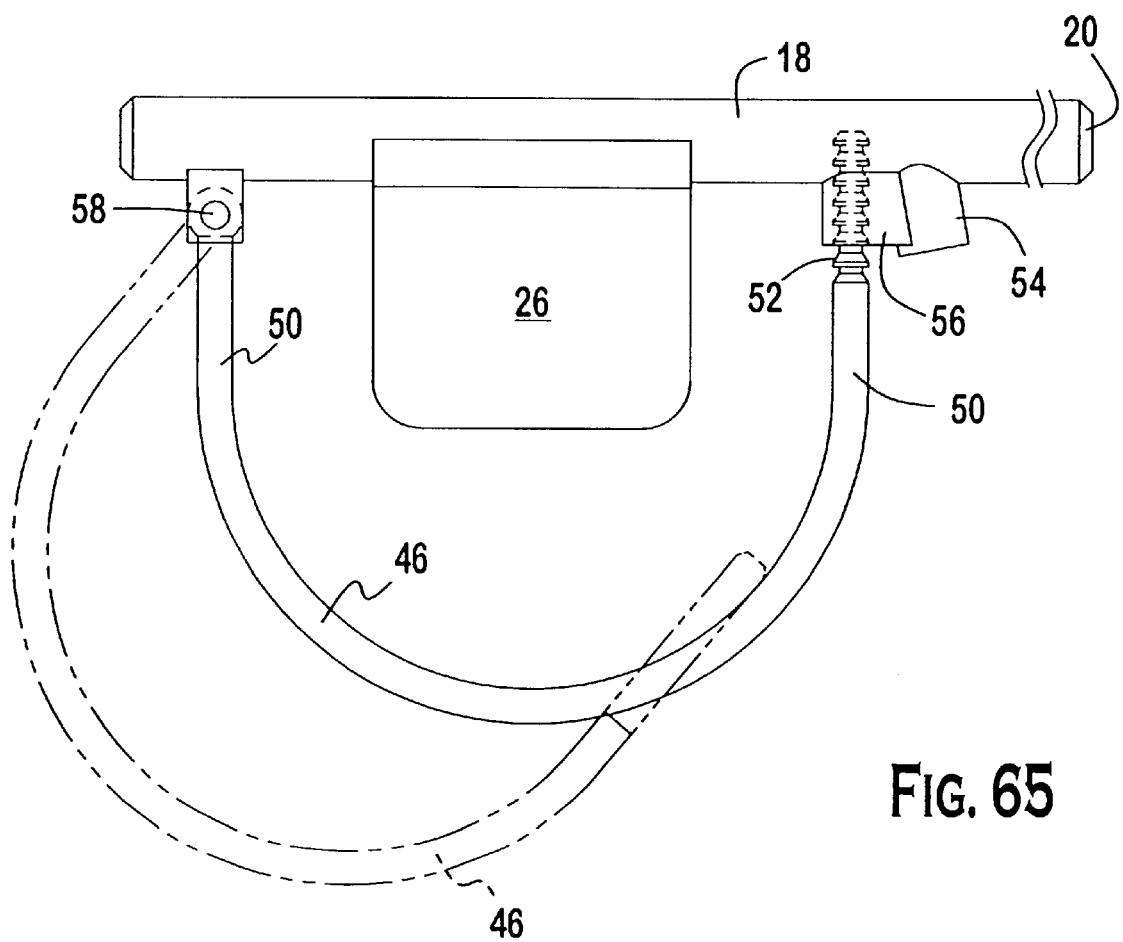
FIG. 65 is a front elevational view of the anti-theft device of FIG. 64.
Figure 66:
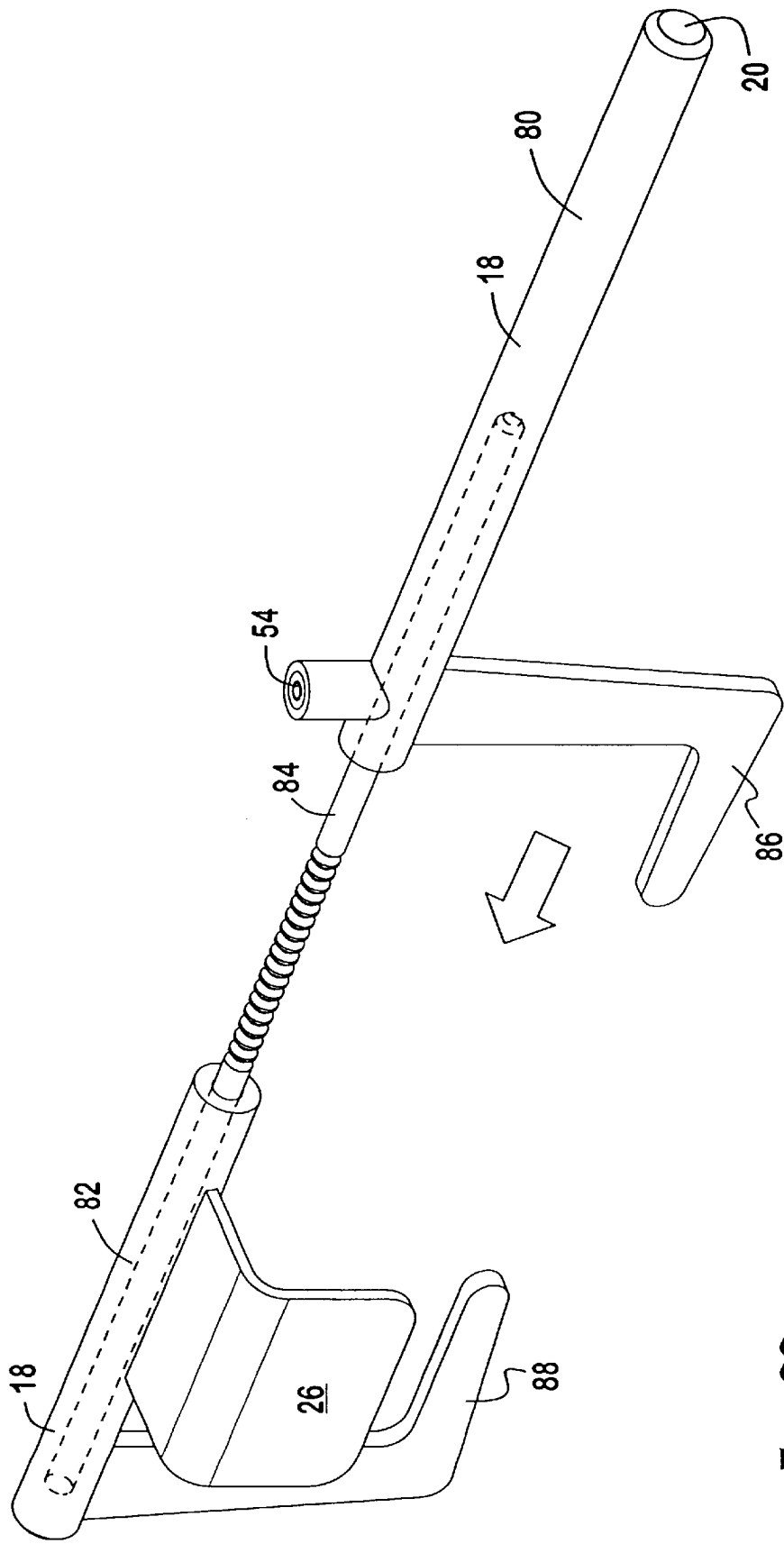
FIG. 66 is a perspective view of a twenty second preferred embodiment of an anti-theft device according to the present invention.

As best shown in FIG. 2, it is preferable that tubes 56 are positioned through the elongated member to receive the connecting part(s) 50 of the column engaging member 46 therethrough. Referring to FIGS. 64 and 65, the column engaging member 46 can be hinged to the elongated member 18 without departing from the scope of the present invention. Thus, the column engaging member 46 may include two connecting members 50, one of which is pivotally secured to the elongated member 18 via a hinge 58. FIG. 65 shows the column engaging member 46 in the installed position in solid lines and shows the column engaging member 46 pivoted open (shown in phantom lines) to facilitate the installation of the anti-theft device. It is preferred, but not necessary, that when the column engaging member 46 is hinged to the elongated member 18 that the tube 56 and the locking mechanism 54 that receive the ratcheted end 52 of the column engaging member 46 are generally downwardly oriented as viewed in FIG. 65. Of course, the anti-theft device shown in FIGS. 64 and 65 can be installed in multiple positions similar to that described in connection with FIGS. 13–15.

Referring again to FIGS. 1–7, the at least one column engaging member 46 is adapted to detachably engage the elongated member 18 to, in combination with the elongated member 18, substantially surround the steering column 14 in an installed configuration in which the wheel engaging member 26 is engaged with the steering wheel 12. The use of the term "surround" is defined to mean to form a linkage that extends along a path substantially around the steering column 14 as opposed to meaning that the column engaging member 46 and the elongated member 18 encase the entire steering column 14. Referring to FIG. 2, it is preferred, but not necessary, that the column engaging member 46 and the elongated member 18 completely surround the steering column 14.

Referring to FIGS. 9–12, the at least one column engaging member 46, in combination with the elongated member, can be adapted to surround the steering column 14 except for one gap 60 without departing from the scope of the present invention. Referring to FIGS. 7 and 9, the column engaging member 46 can be U-shaped, polygonal, diamond shaped, irregularly shaped, or customized for a particular steering column 14 without departing from the scope of the present invention.

Figure 78:
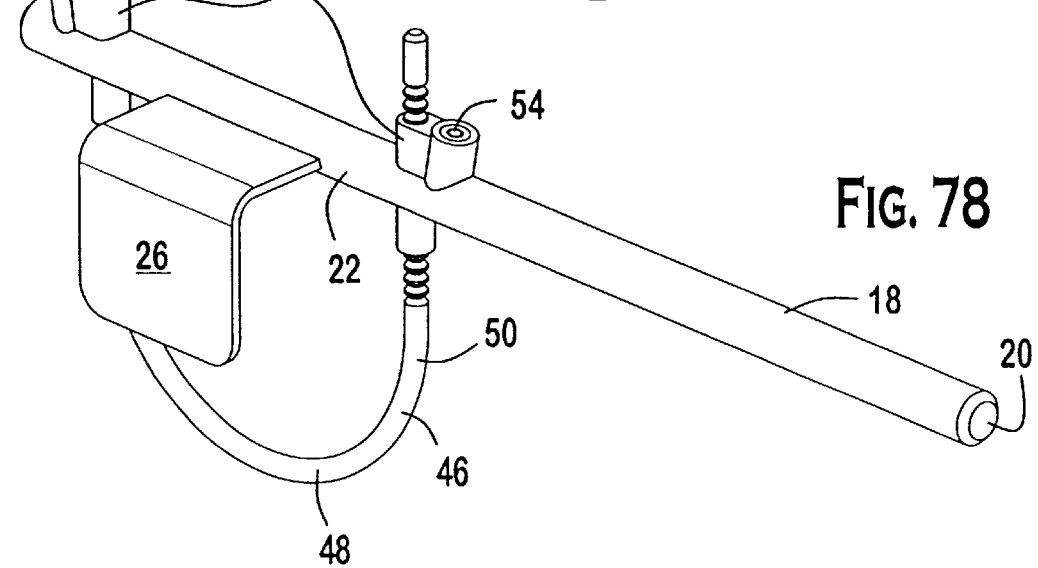
FIG. 78 is a perspective view of a twenty sixth preferred embodiment of an anti-theft device according to the present invention illustrating a column engaging member that is locked on both ends to the elongated member.
Figure 79:
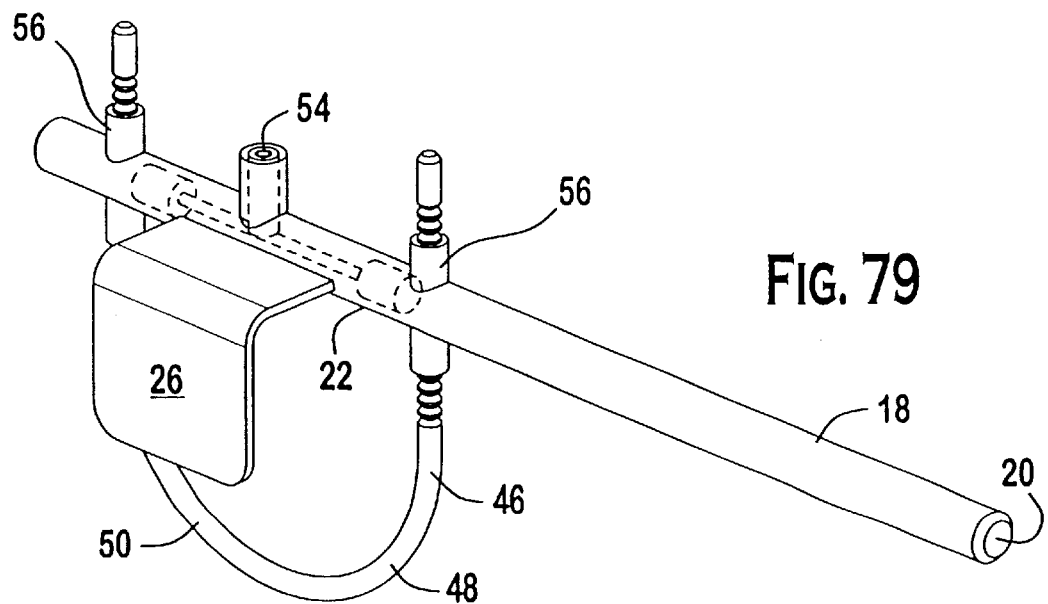
FIG. 79 is a perspective view of a twenty seventh preferred embodiment of an anti-theft device according to the present invention illustrating a central locking mechanism for securing each end of a column engaging member within the elongated member.

The anti-theft device includes a locking mechanism 54 adapted to detachably lock the anti-theft in the installed configuration. Referring to FIG. 78, the column engaging member 46 can include two connecting parts 50 that are each lockable to the elongated member 18 using separate locking mechanisms 54. Alternatively, referring to FIG. 79, a single locking mechanism 54 can be used to simultaneously lock two connecting parts 50 to the elongated member 18 simultaneously. It is preferable that a portion of the longitudinal surface 22 of the elongated member 18 is in facing opposition with a portion of the transverse part 48 of the column engaging member 46. Referring to FIGS. 35–38, the anti-theft device of the present invention can use a rim engaging member 62 instead of a column engaging member 46 to install the anti-theft device. The rim engaging member 62 is preferably detachably engageable with the wheel engaging member 26 and the rim 16 of the steering wheel 12 in an installed configuration in which the wheel engaging member 26 is engaged with the steering wheel 12. It is preferred that the rim engaging member 62 include at least one connecting part 50 that is detachably securable to the wheel engaging member 26 via a tube 56 and locking mechanism 54. The rim engaging member 62 preferably includes a sheath 64 that receives a portion of the rim 12 therein and that is shaped to complement the shape of the rim 16.

Referring to FIGS. 39–42, 46–48, 49–51 it is preferable, not necessary, that the rim engaging member 62 include a pair of projections 66 that are disposed on the sheath 64 and that are adapted to secure a wheel spoke 44 therebetween.

Referring to FIGS. 58–63, the rim engaging member 62 may include a generally elliptical ring 68 that is attached to at least one connecting member 50 and that is adapted to be positioned over a portion of the rim 16 of the steering wheel 12. The at least one connecting part 50 is preferably detachably engageable with the at least one wheel engaging member 26. Those of ordinary skill in the art will appreciate from this disclosure that the ring 68 can be generally rectangularly shaped or irregularly shaped without departing from the scope of the present invention. Referring to FIGS. 61–63, as mentioned above, the elongated member 18 can be a ring that is adapted to be positioned over another portion of the steering wheel 12.

Referring to FIGS. 24–29, 43–45, 52–56, the anti-theft device can use at least one spoke engaging member 70 (referring to FIGS. 24–27, the spoke engaging member 70 can be combined with a column engaging member 46 without departing from the scope of the present invention) instead of using a column engaging member 46.

Figure 28:
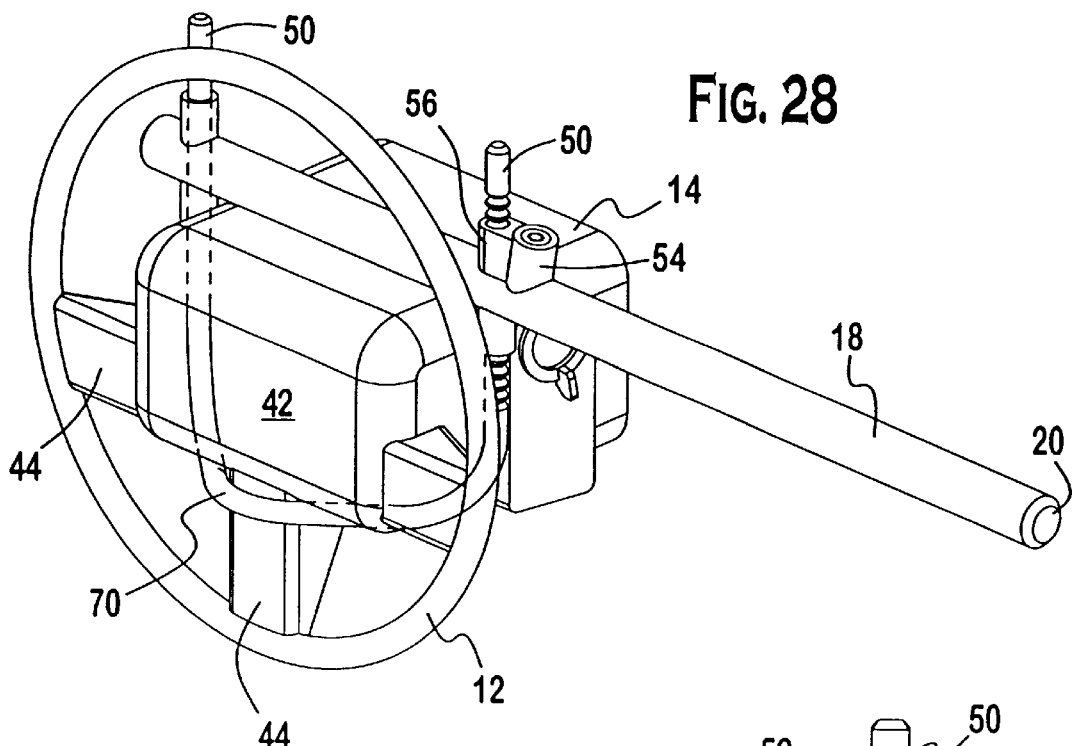
FIG. 28 is a perspective view of a tenth preferred embodiment of an anti-theft device according to the present invention illustrating a spoke engaging member that is used to fix the position of the steering wheel relative to the elongated member.
Figure 29:
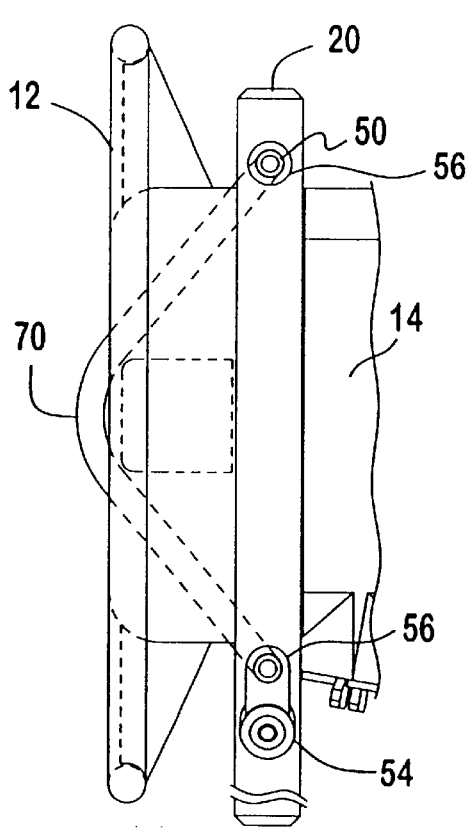
FIG. 29 is a top plan partial view of the anti-theft device of FIG. 28.
Figure 30:
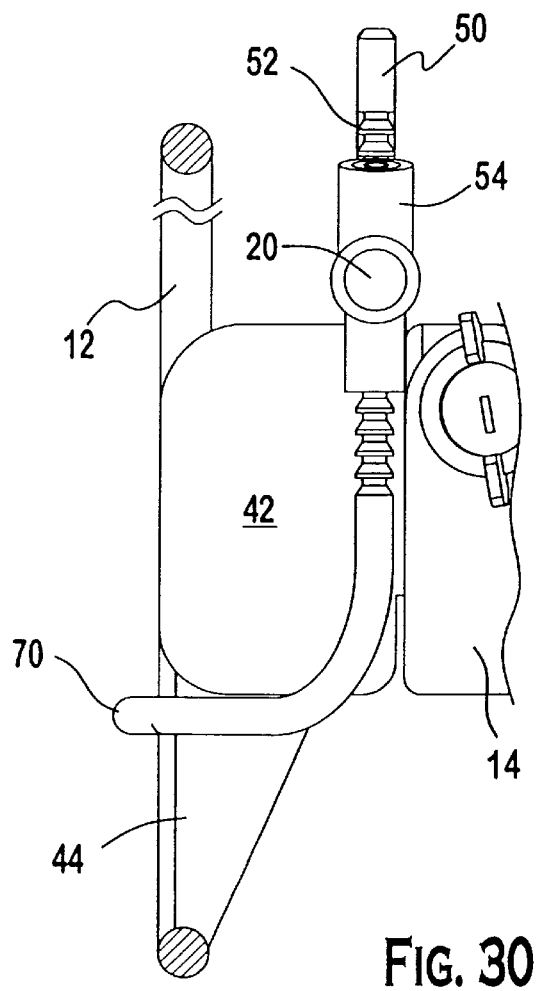
FIG. 30 is a left side elevational view (with a portion of the steering wheel broken away) of the anti-theft device of FIG. 28.

The spoke engaging member 70 is preferably detachably engageable with the at least one wheel engaging member 26 and the at least one spoke 44 in an installed position in which the wheel engaging member 26 is engaged with the steering wheel 12. Referring to FIGS. 28 and 29, alternatively, the spoke engaging member 70 can be detachably engaged directly to the elongated member 18 without departing from the scope of the present invention.

Figure 43:
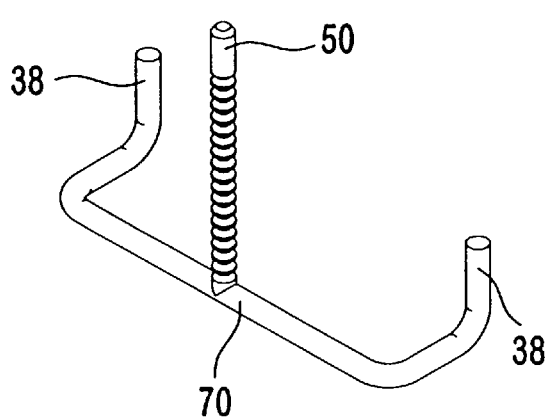
FIGS. 43 and 44 are a preferred fourteenth embodiment of an anti-theft device according to the present invention.
Figure 44:
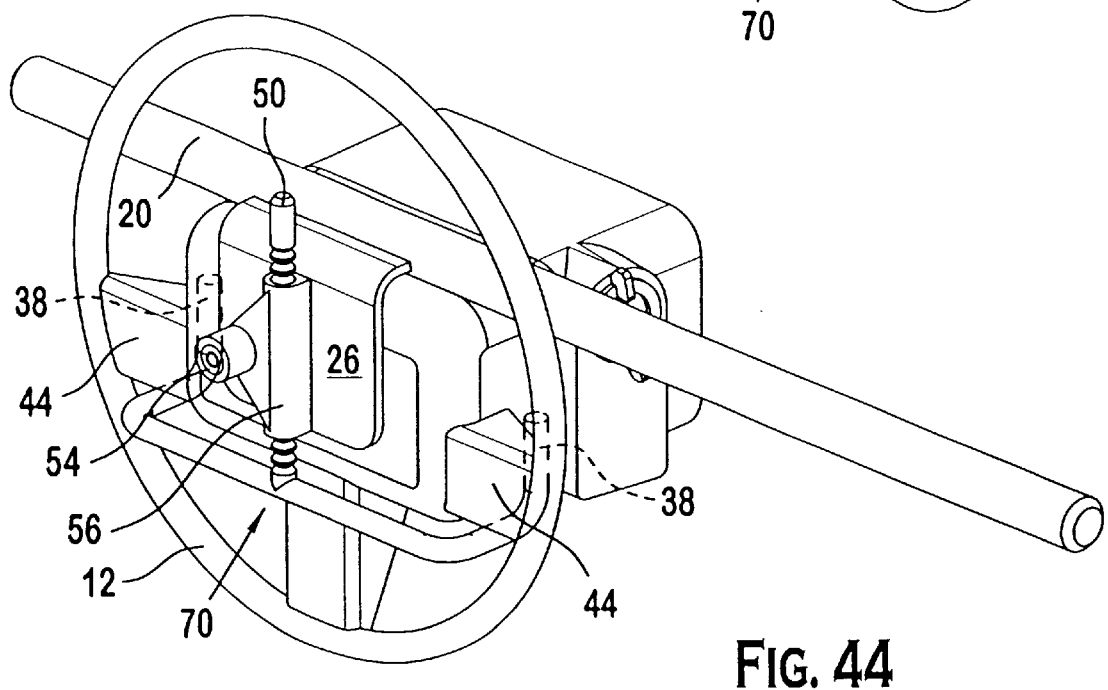
Figure 48:
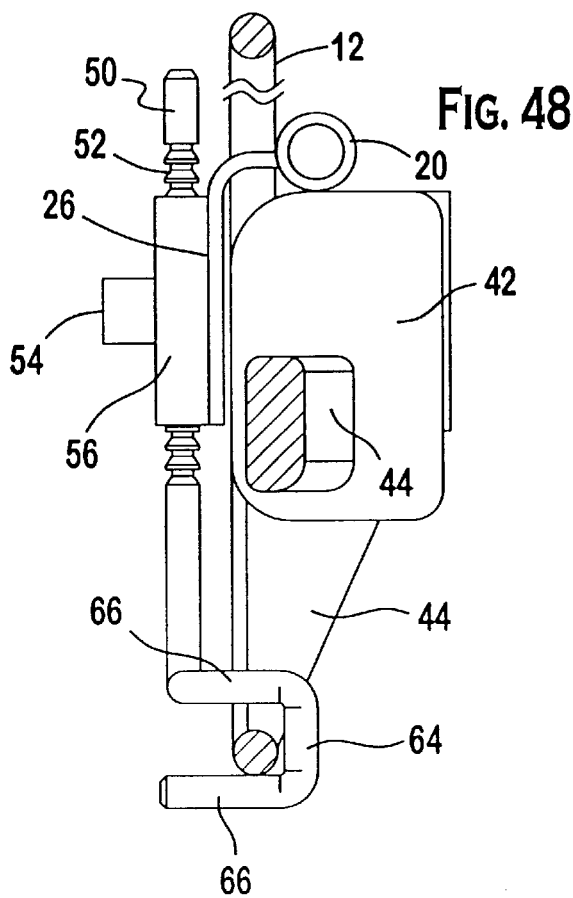
FIG. 48 is a left side elevational view (with a portion of the steering wheel broken away) of the anti-theft device of FIG. 47.
Figure 49:
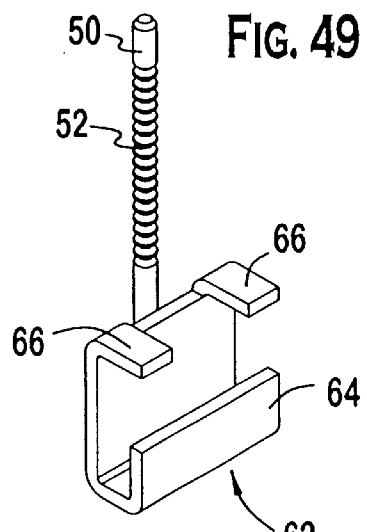
FIGS. 49 and 50 are perspective views of a preferred sixteenth embodiment of an anti-theft device according to the present invention.
Figure 50:
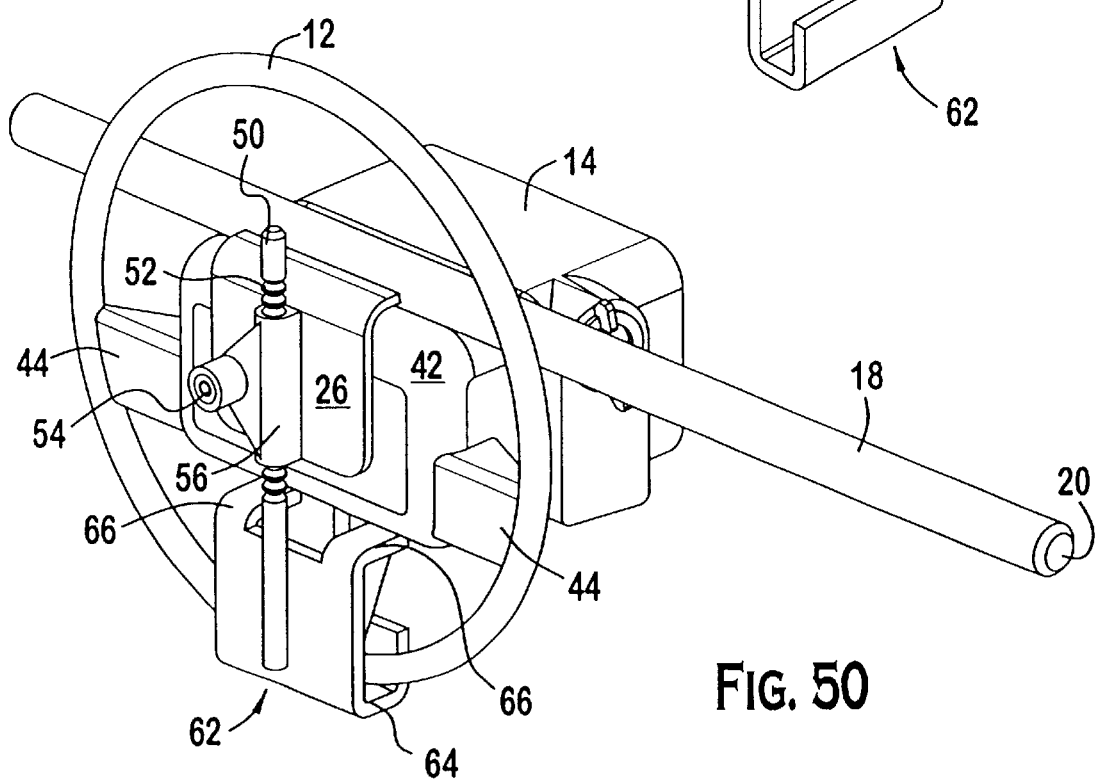
Figure 51:
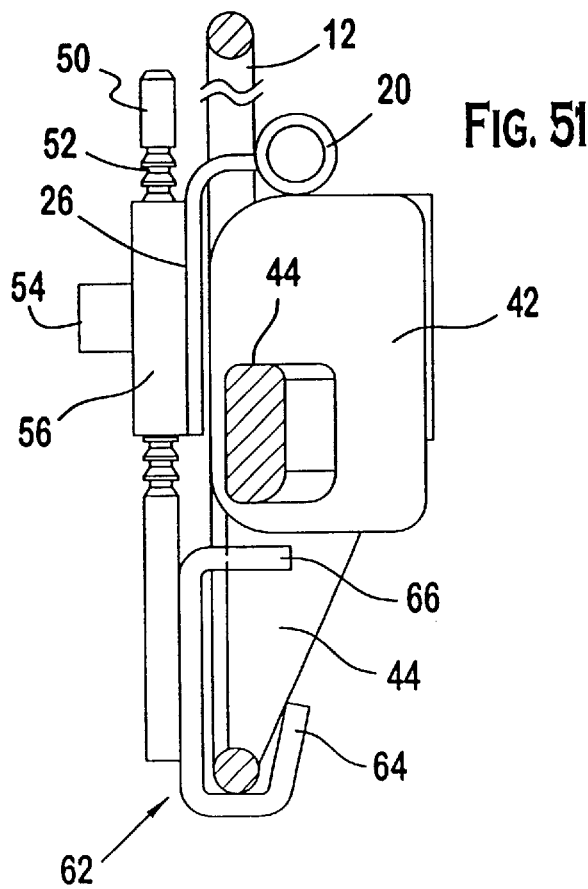
FIG. 51 is a left side elevational view (with a portion of the steering wheel broken away) of the anti-theft device of FIG. 50.
Figure 53:
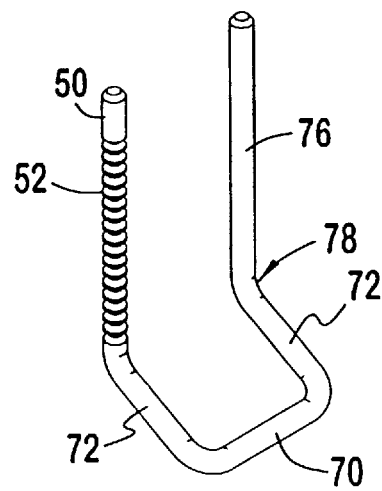
FIGS. 52 and 53 are perspective views of a seventeenth preferred embodiment of an anti-theft device according to the present invention.
Figure 52:
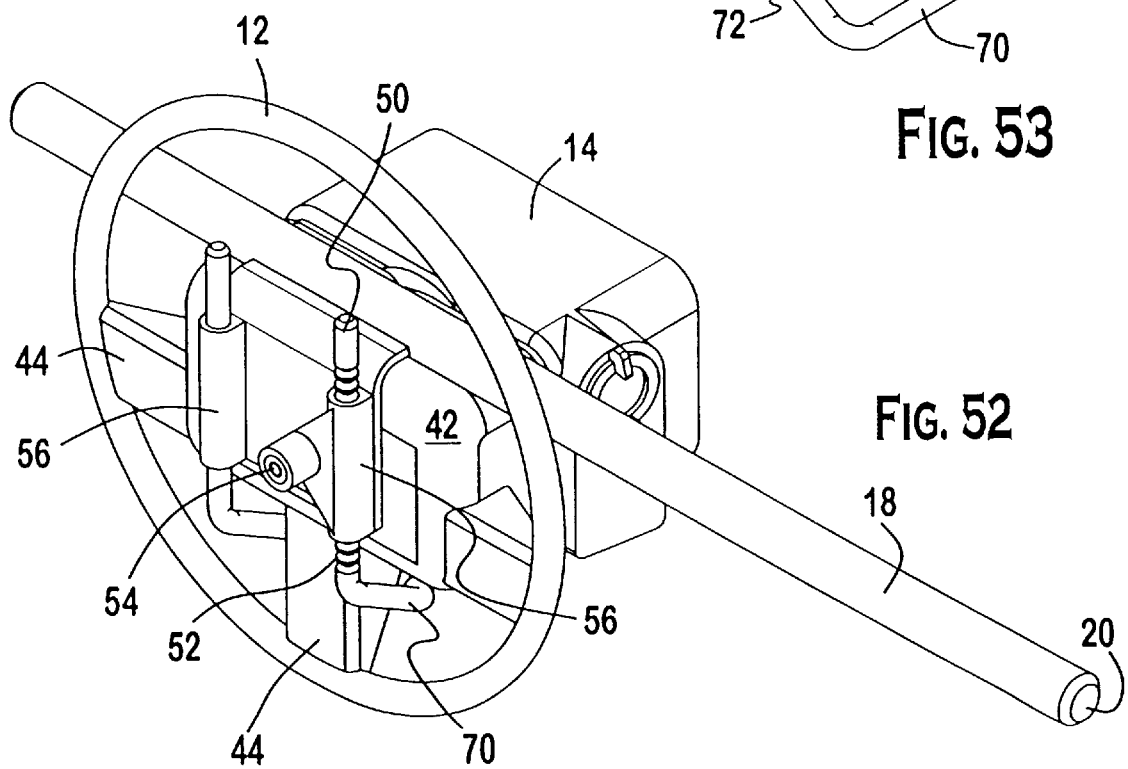
Figure 54:
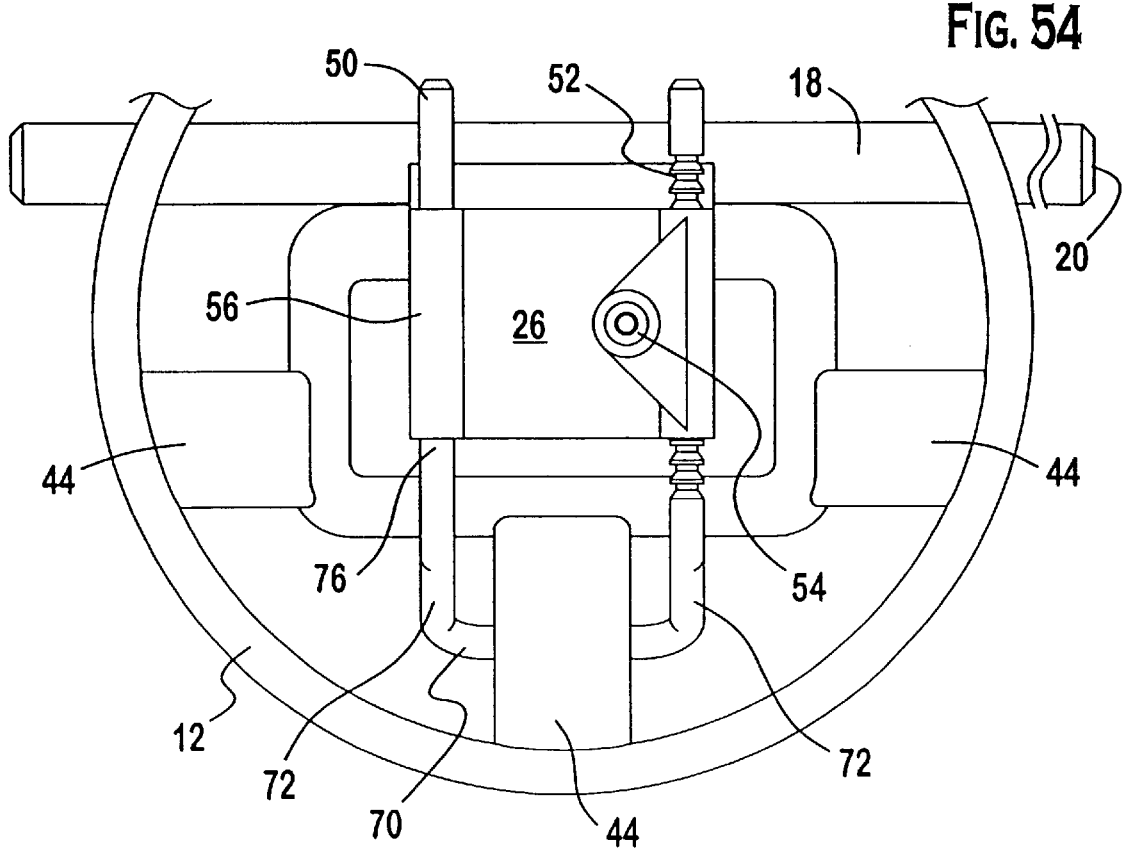
FIG. 54 is a front elevational partial view of the anti-theft of FIG. 53.
Figure 55:
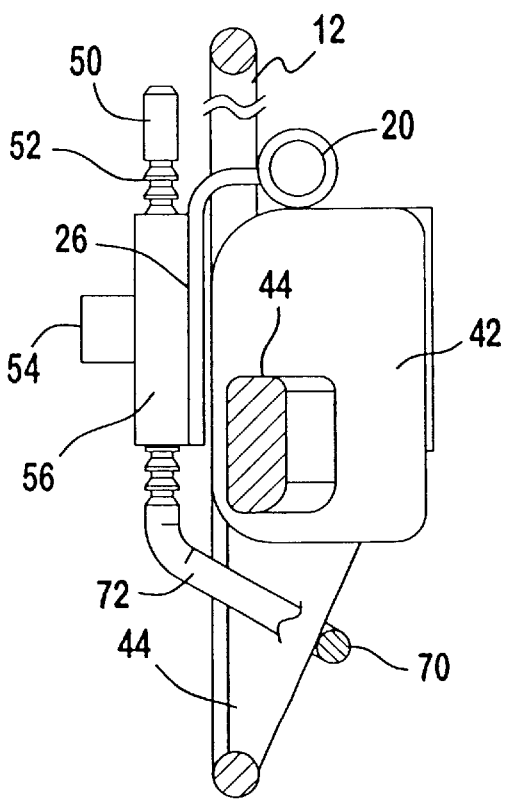
FIG. 55 is a left side elevational view (with a portion of the steering wheel broken away) of the anti-theft device of FIG. 53.
Figure 58:
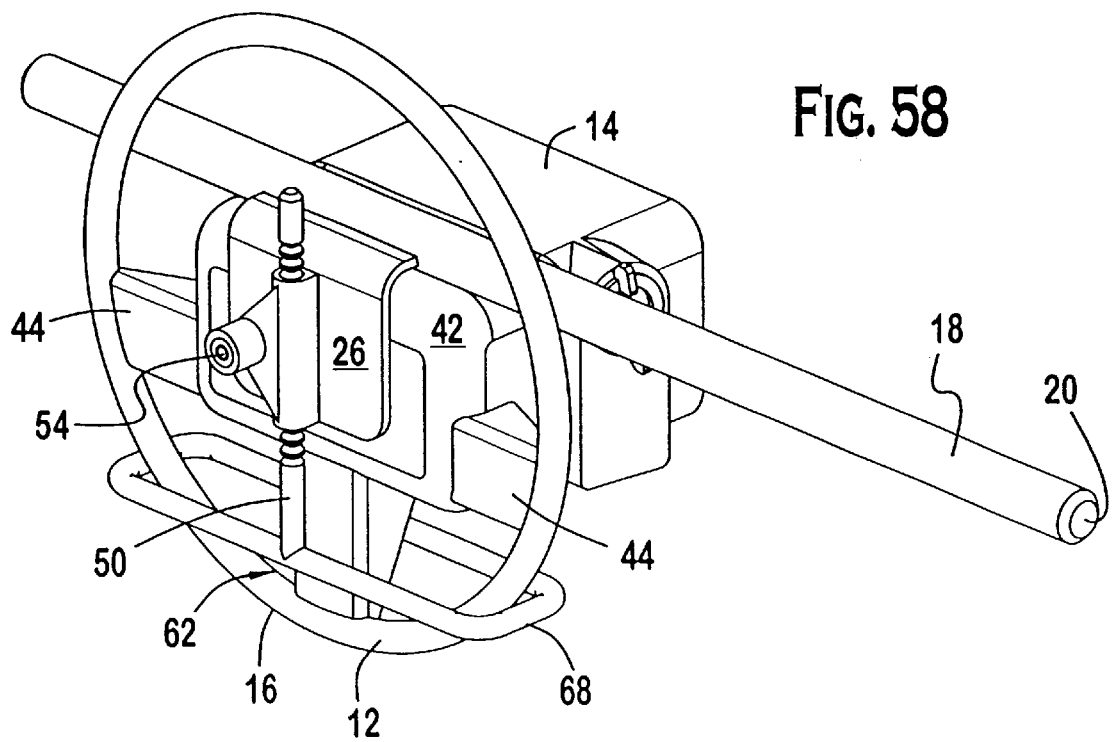
FIG. 58 is a perspective view of a nineteenth preferred embodiment of an anti-theft device according to the present invention.
Figure 59:
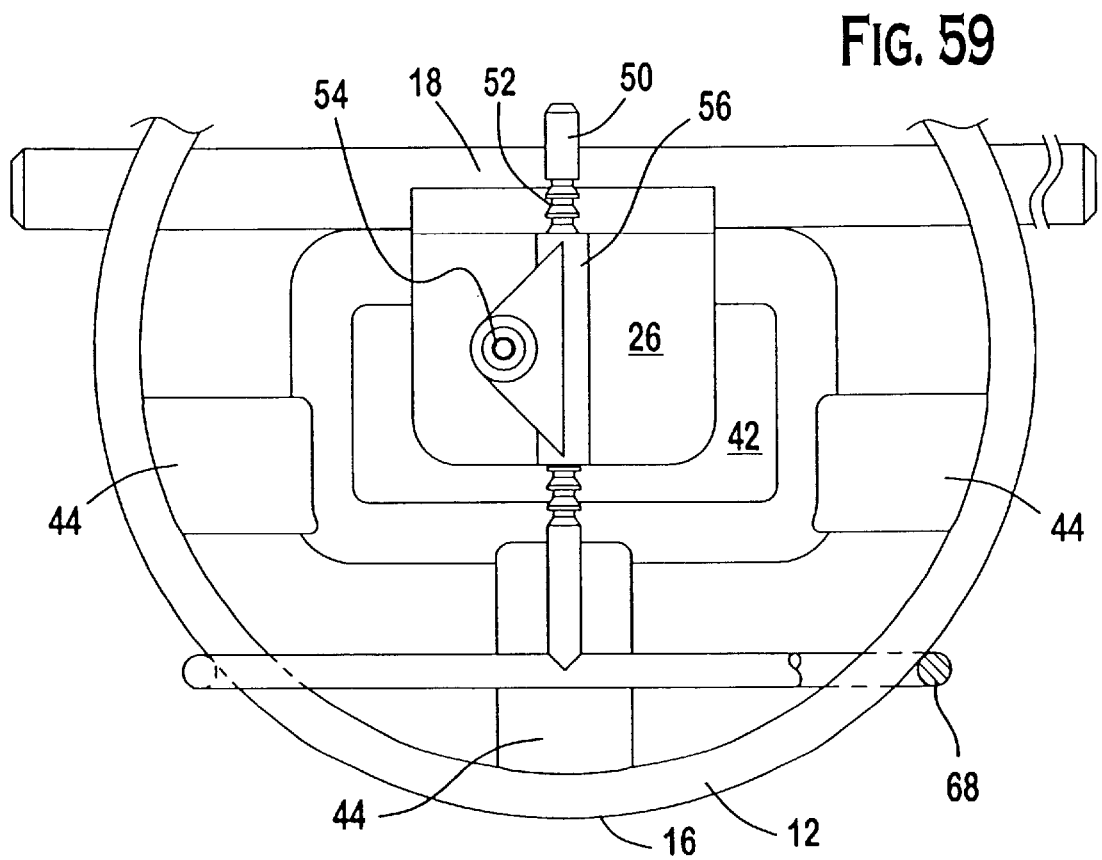
FIG. 59 is a front elevational partial view of the anti-theft device of FIG. 58.
Figure 60:
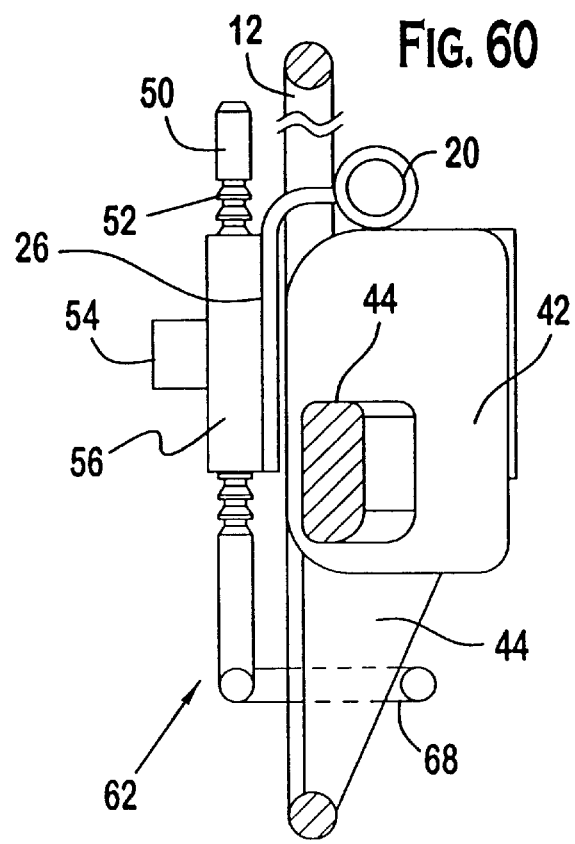
FIG. 60 is a left side elevational view (with a portion of the steering wheel broken away) of the anti-theft device of FIG. 58.

Referring to FIGS. 52–55, it is preferred, but not necessary, that the spoke engaging member 70 include a connecting part 50 adapted to detachably engage the at least one wheel engaging member 26. The spoke engaging member 70 preferably includes two projections 72 disposed on the connecting part 50 that are adapted to extend along opposing lateral sides of the wheel spoke 44. Referring to FIGS. 20–23, the spoke engaging member 70 can be formed by two reverse hooks 74 that each extend beneath a separate spoke 44 to prevent rotation of the steering wheel 12 when the anti-theft device is in the installed position. Referring again to FIGS. 39–42, the spoke engaging member 70 may include a sheath 64 adapted to engage a portion of the rim when the anti-theft device is in the installed configuration. Referring to FIGS. 43–45, the spoke engaging member 70 can include two L-shaped beams 38 that can be positioned under separate spokes 44 to prevent movement of the steering wheel relative to the elongated member 18.

Referring again to FIGS. 52–55, the spoke engaging member 70 may, but does not necessarily, include a generally U-shaped bar 76 having a bent portion 78 to allow the spoke engaging member 70 to be inserted over the at least one spoke 44 and to be secured to the wheel engaging member 26.

Referring to FIGS. 66–69, the anti-theft device may include an elongated member 18 which includes a first part 80 in sliding engagement with a second part 82 and has a first end 20. The first part 80 slides along a central rod 84 that forms a portion of the second part 82. The first part 80 is locked in position on the central rod 84 via a locking mechanism 54.

Figure 67:
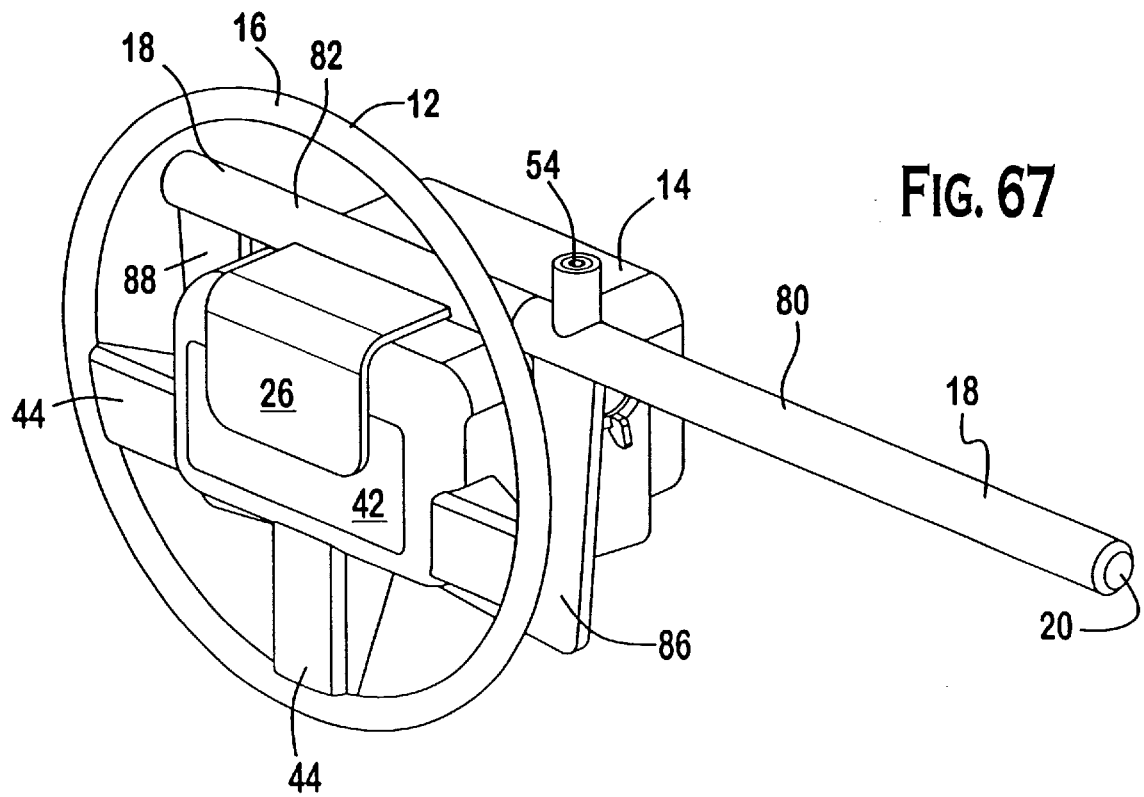
FIG. 67 is a perspective view of the anti-theft device of FIG. 66 in the installed configuration.
Figure 68:
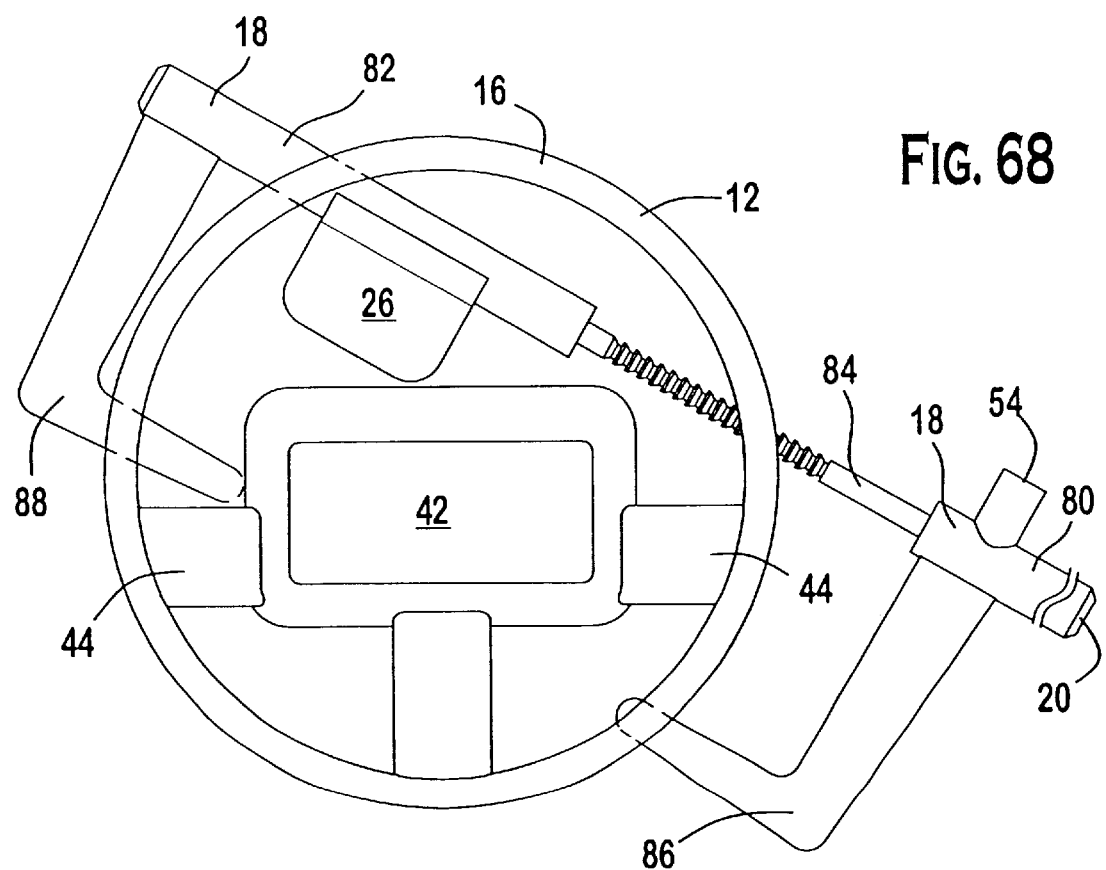
FIG. 68 is a front elevational view of the anti-theft device of FIG. 66 during the installation process.
Figure 69:
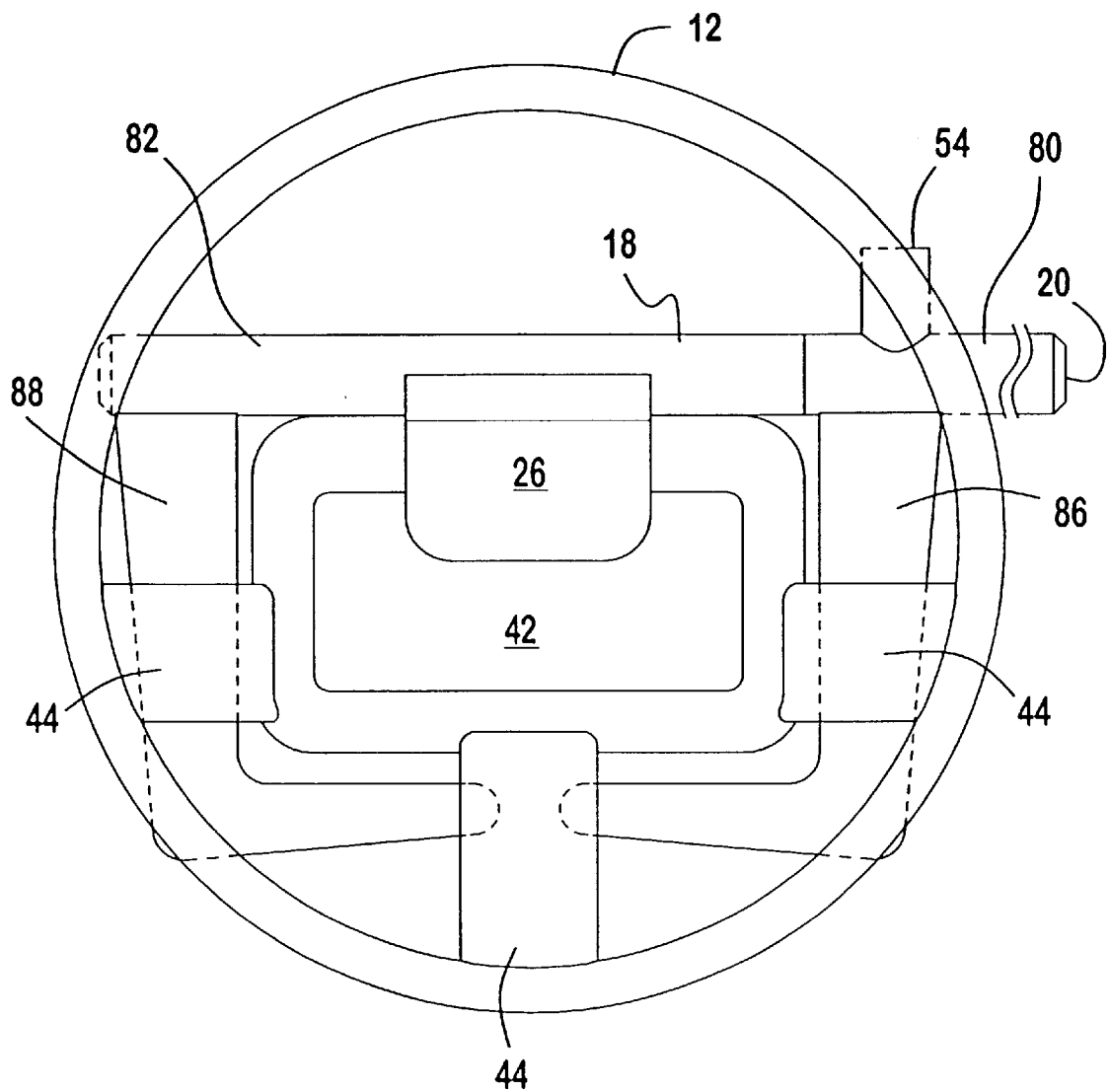
FIG. 69 is a front elevational partial view of the anti-theft device of FIG. 66 in the installed position.

A first jaw 86 is preferably disposed on the first part 80 of the elongated member 18 and is adapted to abut a portion of the steering column 14 when placed thereover. A second jaw 88 is disposed on the second part 82 of the elongated member 18 and is adapted to abut a portion of the steering column 14 and to, in combination with the first jaw 86, clamp the steering column 14-therebetween in an installed configuration in which the wheel engaging member 26 is engaged with the steering wheel 12 (as shown in FIGS. 67 and 69). It is preferable, but not necessary, that the first and second jaws 86, 88 are crescent-shaped and in opposing orientation. However, the contour of the steering column contacting surface of the first and second jaws 86, 88 can be customized depending upon the specifications of the vehicle 10 to be used with the anti-theft device. The use of first and second jaws 86, 88 allows the anti-theft device to be easily adjusted for steering columns 14 of non-typical dimensions.

Referring to FIGS. 70–72 first and second jaws 86, 88 can be used in conjunction with an elongated rod not having first and second parts 80, 82. To do so, the first jaw 86 is attached to a central rod 84 that is slidable within a slot 90. The central rod 84 can be secured in position via a locking mechanism 54 when the first and second jaws 86, 88 are appropriately spaced.

Figure 73:
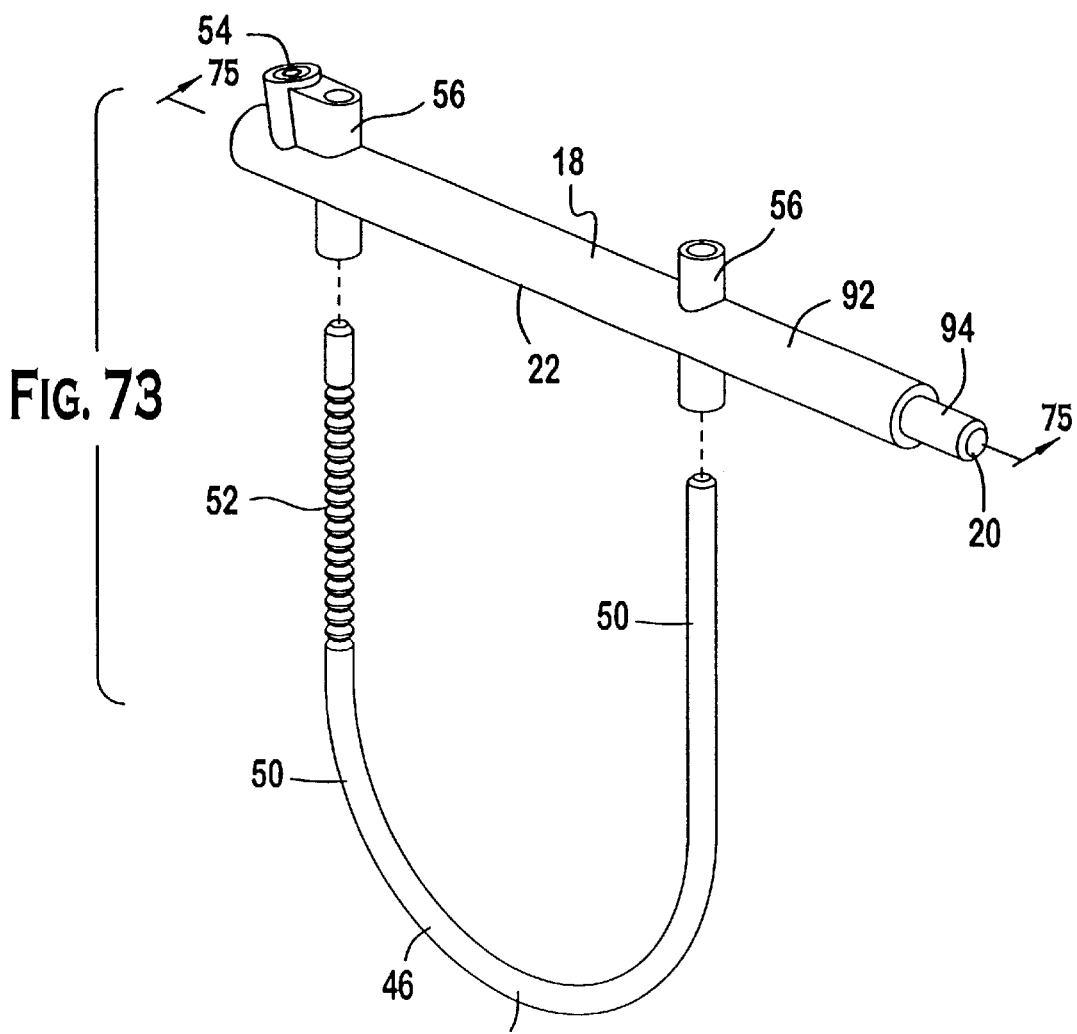
FIG. 73 is an exploded perspective view of a twenty fourth preferred embodiment of an anti-theft device according to the present invention illustrating an elongated member having an inner member that can be telescoped outwardly.

Referring to FIGS. 73–76, the elongated member 18 can be formed having an outer member 92 that is slidable relative to an inner member 94. The outer member 92 preferably has a longitudinal surface 22 and the inner member has a first end 20. The inner member 94 is preferably extendable generally radially outwardly away from the steering column 14 past the outer perimeter of the steering wheel 12. Referring to FIGS. 73 and 75, the right end of the outer member 92 has an inwardly directed flange 96 that engages a shoulder 98 of the inner member 94 when the inner member 94 is filly extended from the outer member 92. This prevents removal of the inner member 94 from the outer member 92.

Figure 74:
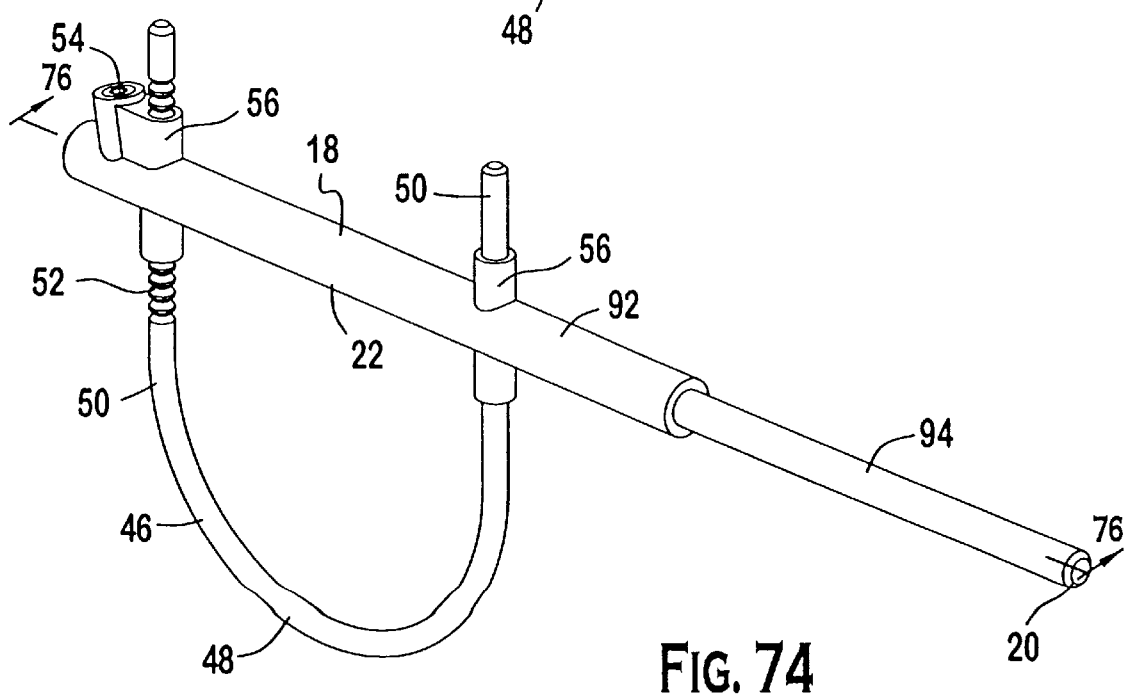
FIG. 74 is a perspective view of the anti-theft device of FIG. 73 with the inner member 74 extended outwardly and secured in position via the column engaging member.

Referring specifically FIGS. 74 and 76, when the inner member 94 is fully extended from the outer member 92, the shoulder 98 of the inner member is engaged with the inwardly directed flange 96 of the outer member 92. To prevent the retraction of the inner member 94 into the outer member 92, a connecting part 50 is inserted through the right tube 56 to fix the inner member 94 in the extended position.

Figure 31:
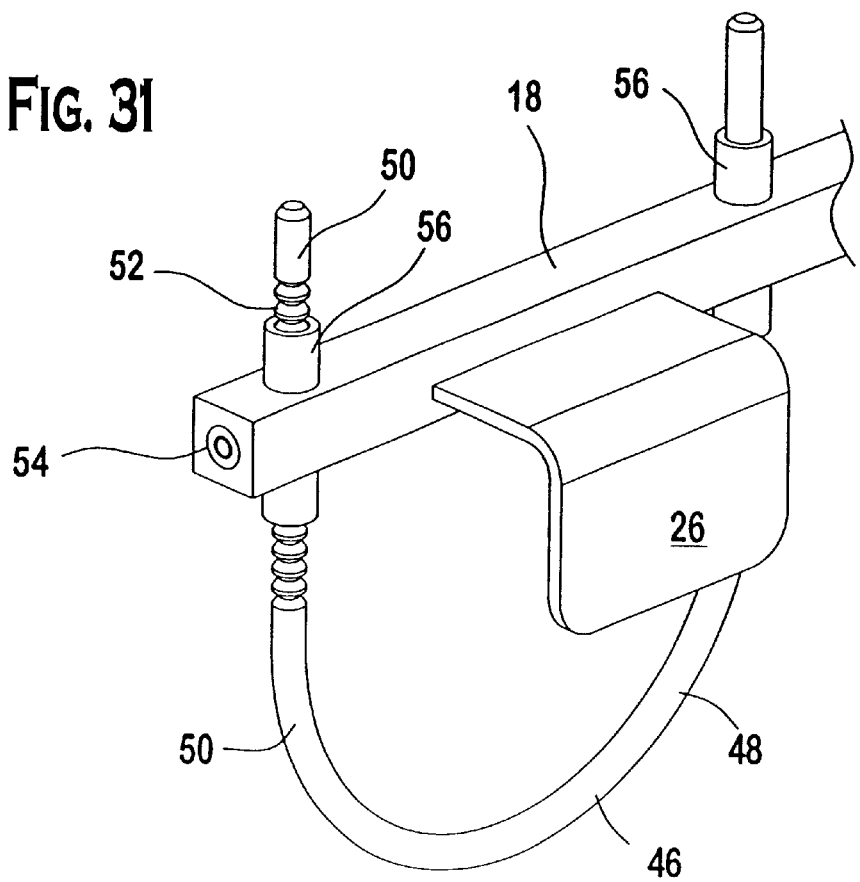
FIG. 31 is a perspective partial view of a preferred variant of the first embodiment of an anti-theft device according to the present invention.
Figure 32:
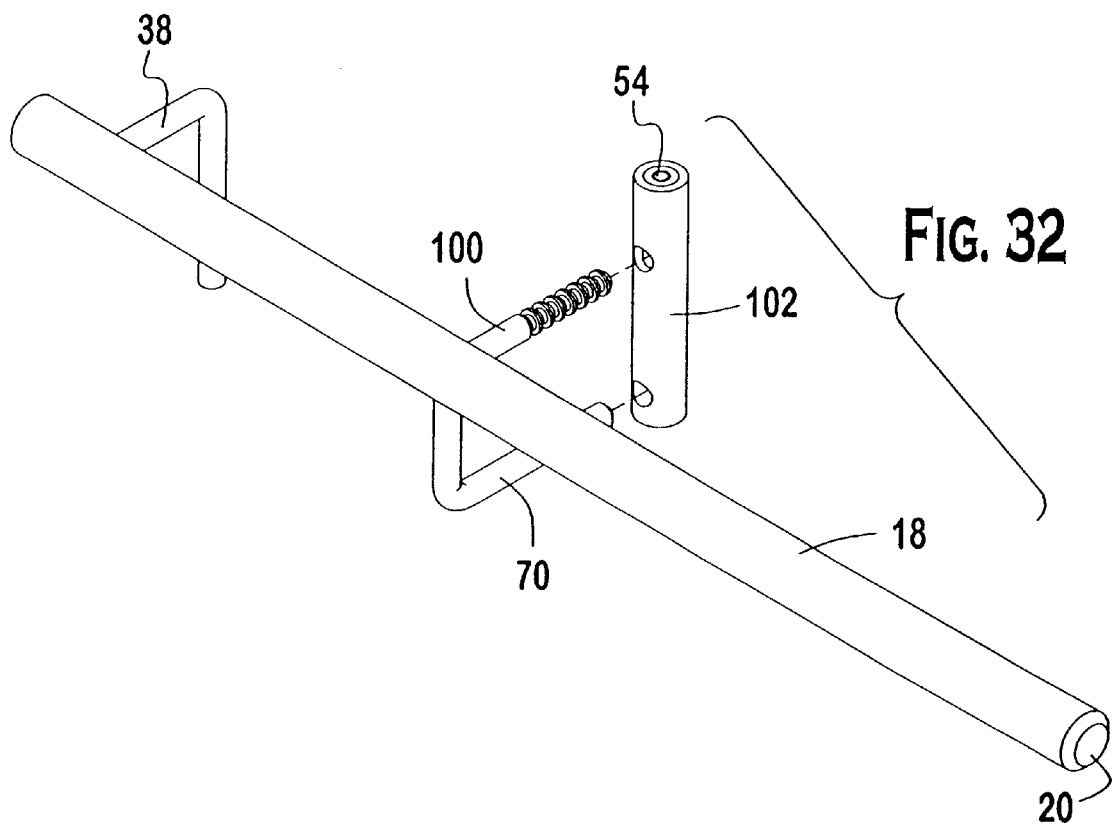
FIG. 32 is a perspective view of an eleventh preferred embodiment of an anti-theft device according to the present invention.
Figure 33:
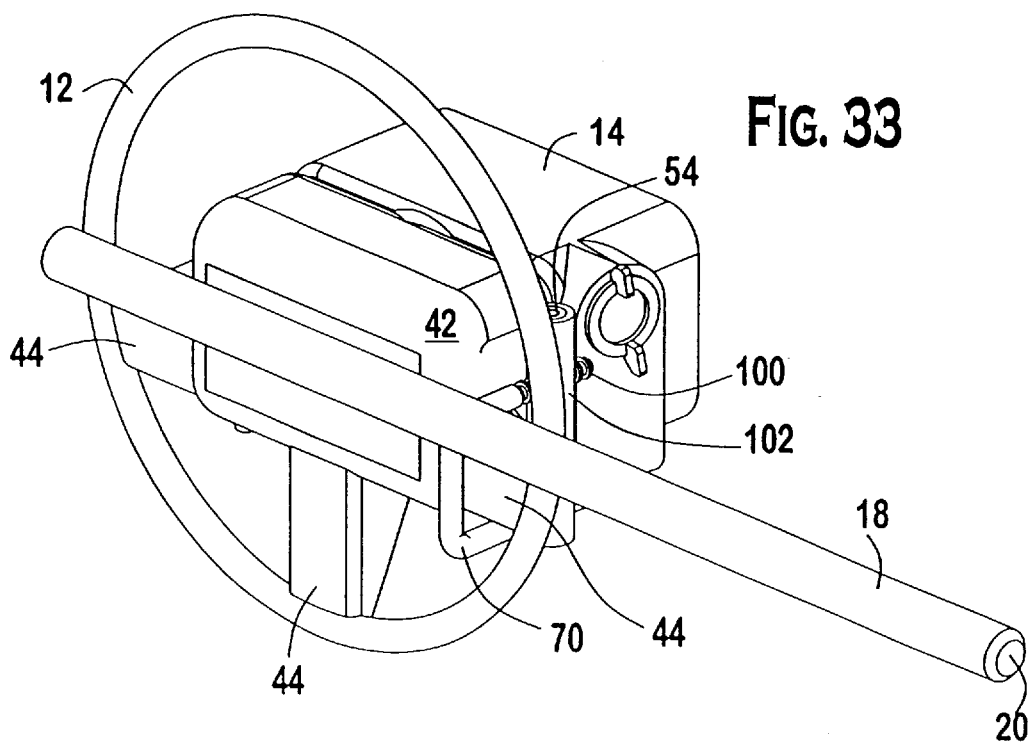
FIG. 33 is a perspective view of the anti-theft device of FIG. 32 in the installed configuration.
Figure 34:
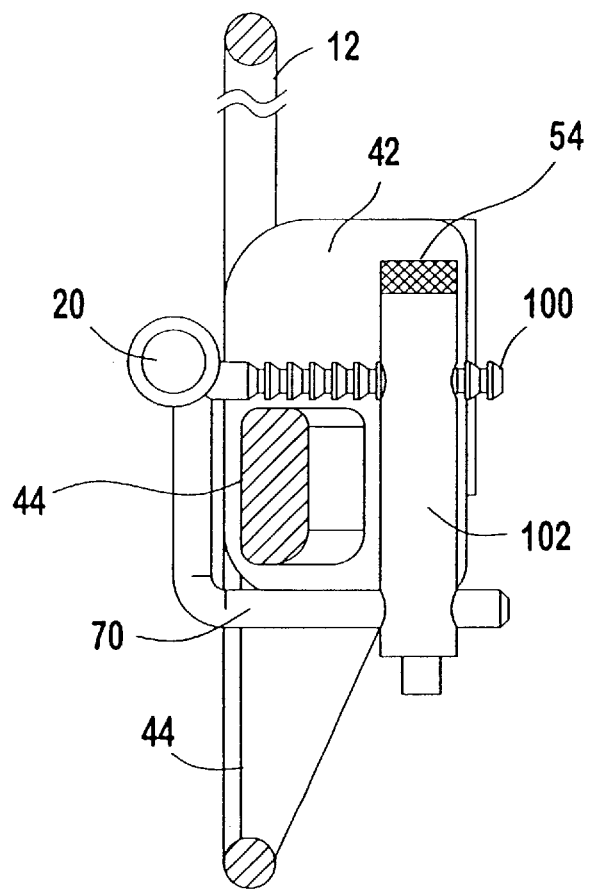
FIG. 34 is a left side elevational view (with a portion of the steering wheel broken away) of the anti-theft device of FIG. 32.
Figure 35:
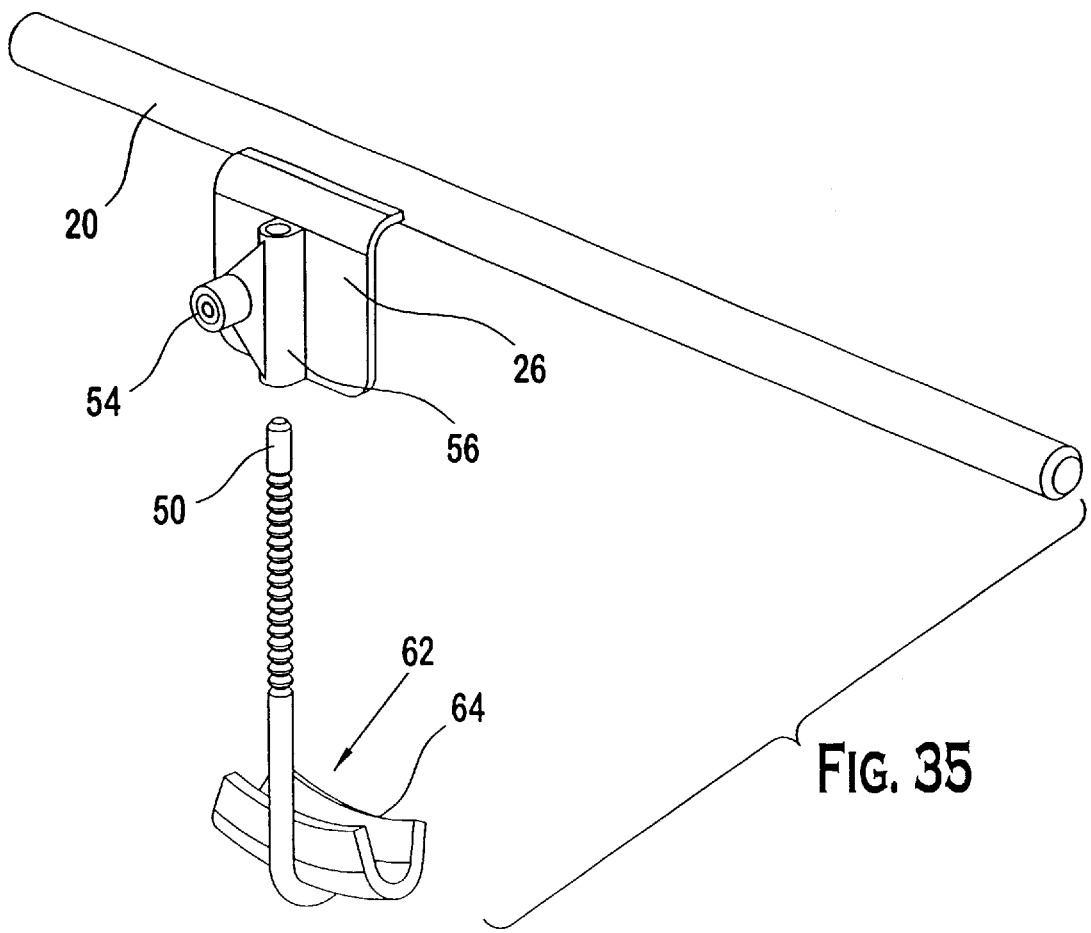
FIG. 35 is an exploded perspective view of a twelfth preferred embodiment of an anti-theft device according to the present invention illustrating a rim engaging member that is attachable to the wheel engaging member via the connecting part.
Figure 36:
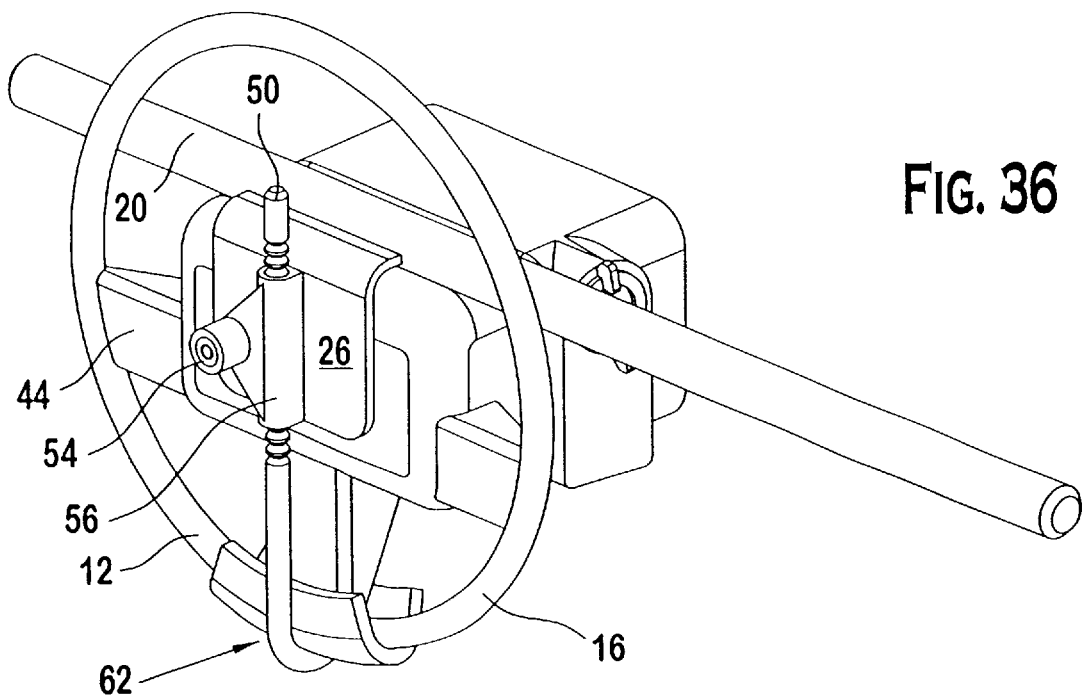
FIG. 36 is a perspective view of the anti-theft device of FIG. 35 in the installed configuration.
Figure 37:
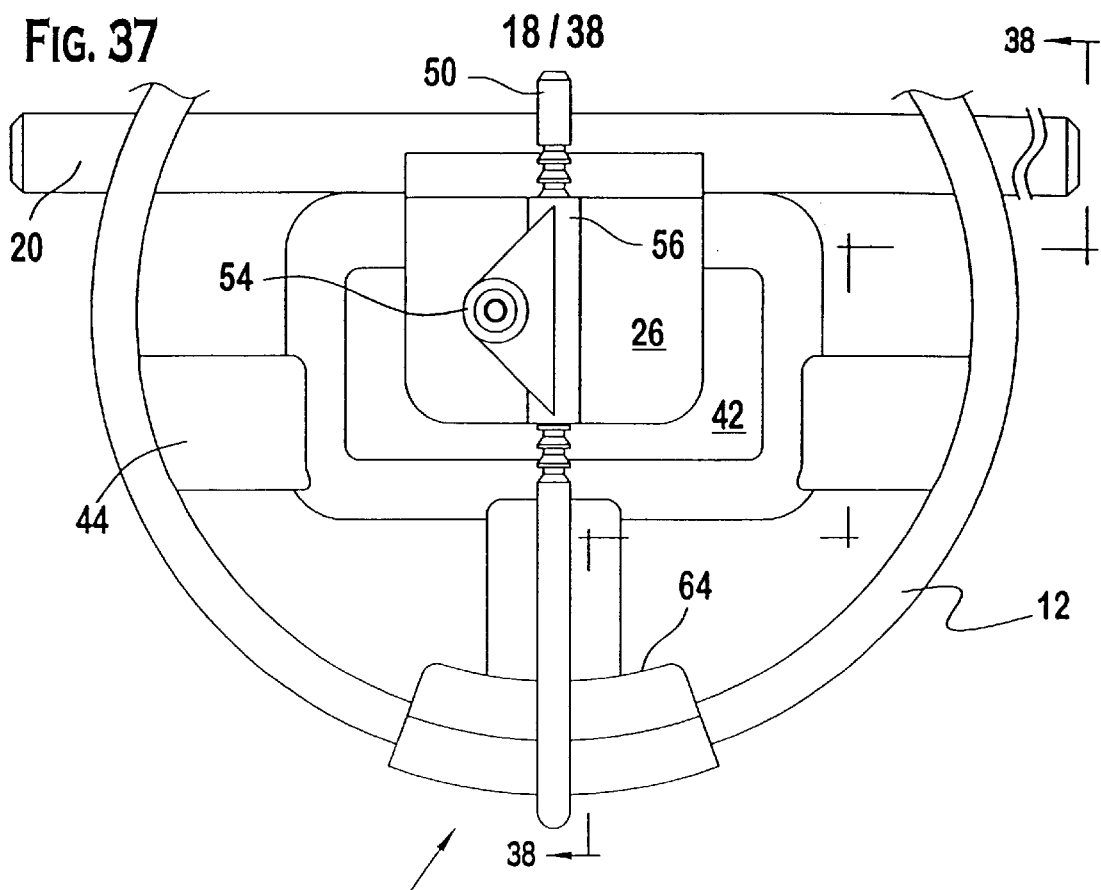
FIG. 37 is a front elevational partial view of the anti-theft device of FIG. 35 in the installed position.
Figure 38:
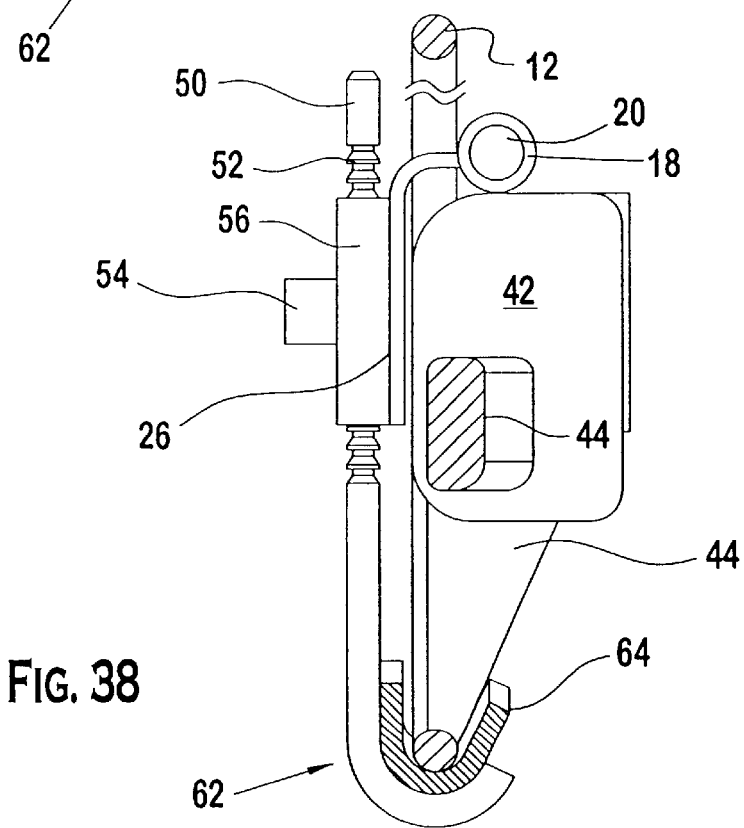
FIG. 38 is a cross-sectional view of the anti-theft device of FIG. 37 as taken along the line 38—38 in FIG. 37.
Figure 39:
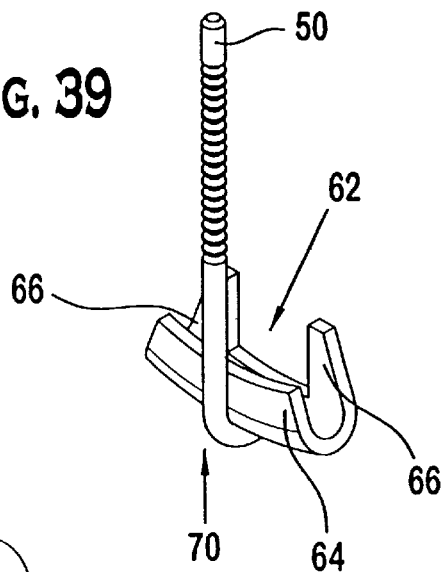
FIGS. 39 and 40 are perspective views of a thirteenth preferred embodiment of an anti-theft device according to the present invention illustrating a rim engaging member that also secures one spoke of the steering wheel in position.
Figure 40:
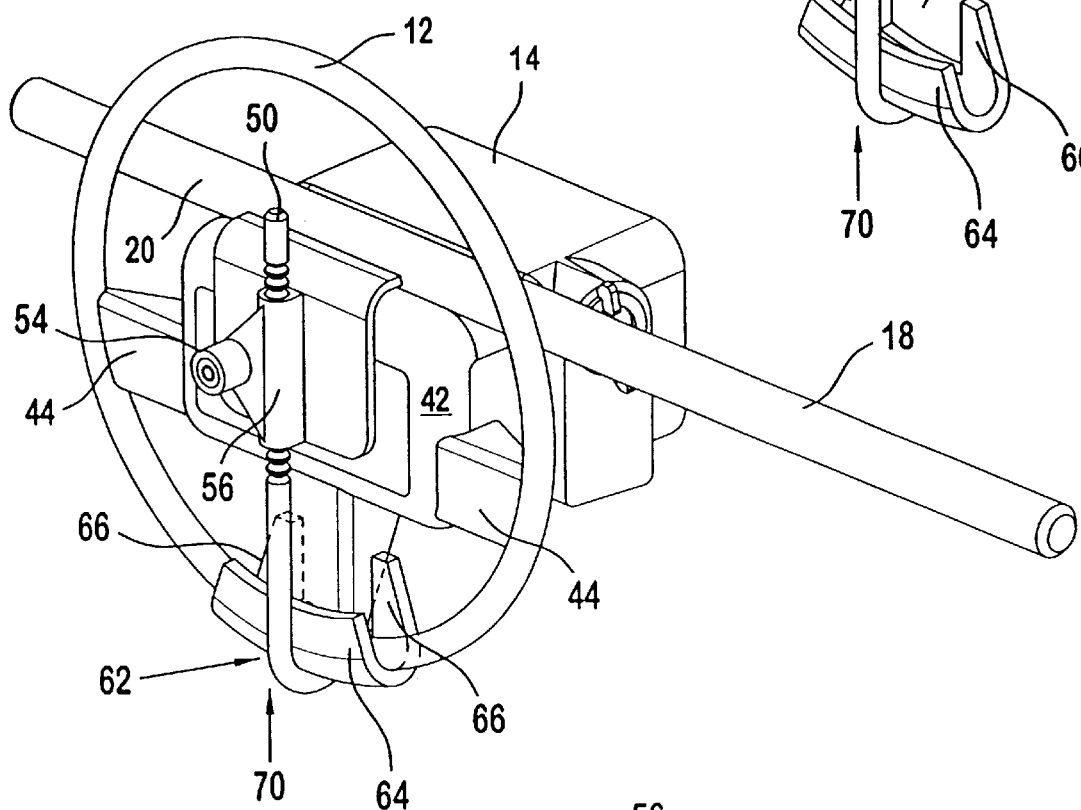
Figure 41:
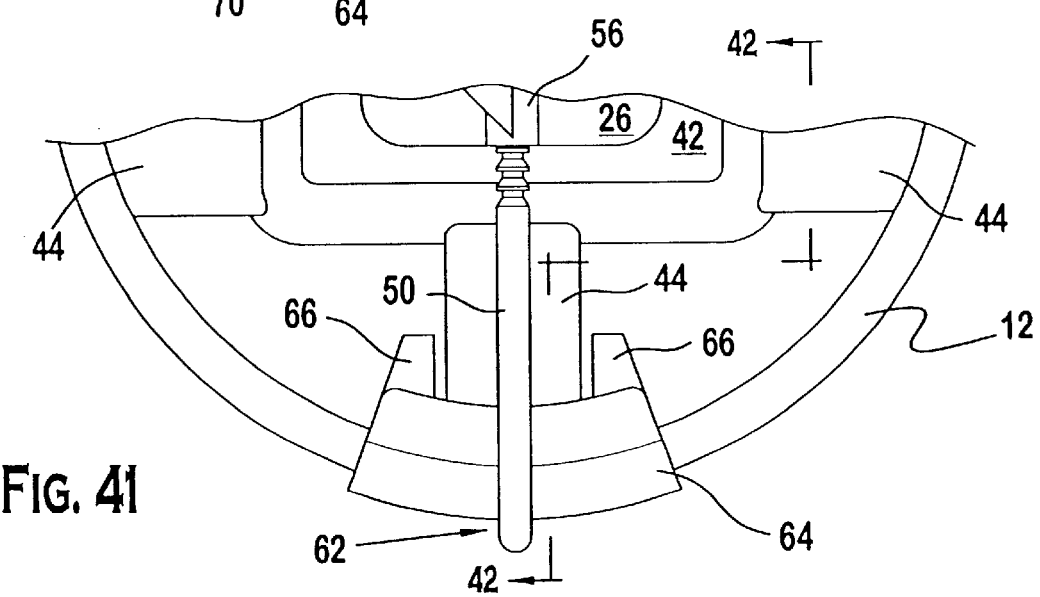
FIG. 41 is an enlarged front elevational partial view of the anti-theft device of FIG. 40.
Figure 42:
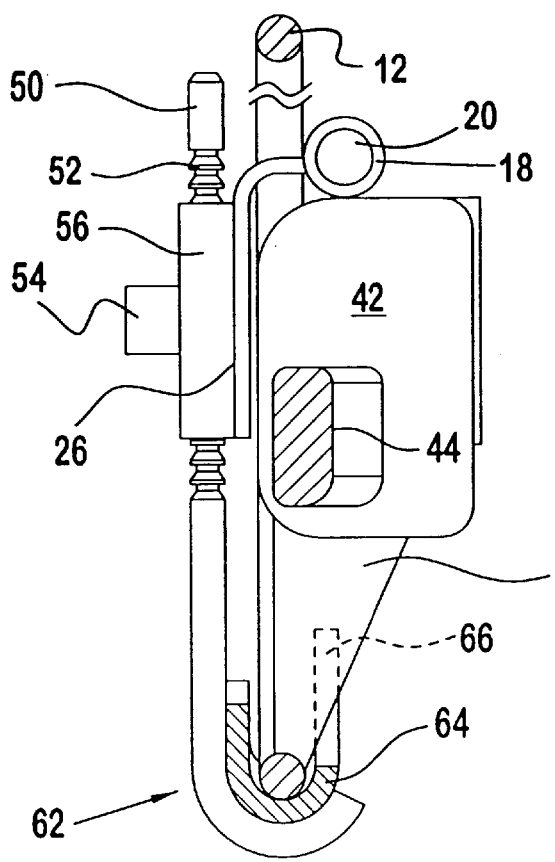
FIG. 42 is a cross-sectional view of the anti-theft device of FIG. 41 as taken along the line 42—42 in FIG. 41.

Referring to FIGS. 31–33, the spoke engaging member 70 can be formed by a double pronged member 100 that is preferably welded to the elongated bar 18. By combining the double pronged member 100 with various I-shaped beams 38, the anti-theft device can be installed over the steering wheel 12. The double pronged member 100 is preferably secured to the steering wheel 12 via a locking bar 102.

Figure 80:
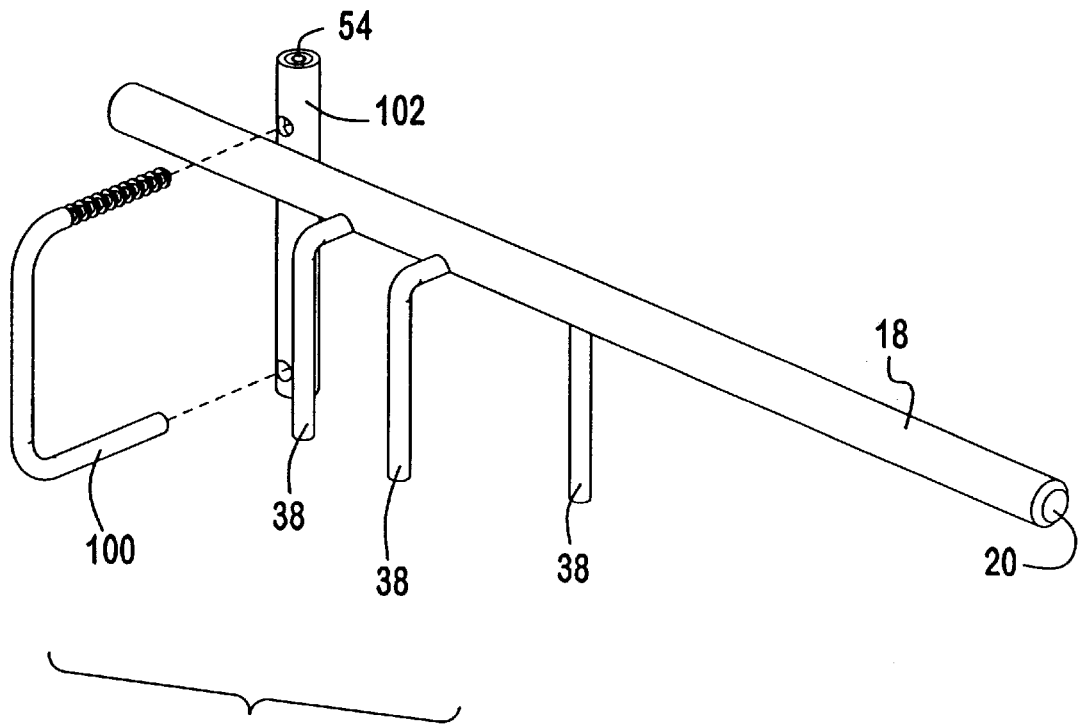
FIG. 80 is a perspective exploded view of a twenty eighth preferred embodiment of an anti-theft device according to the present invention.

Referring to FIGS. 80 and 81, the locking bar 102 can be welded to the elongated bar 18 and is adapted to receive the double pronged member 100 to secure the elongated bar 18 to at lest one spoke 44. L-shaped beams 38 are positioned along the elongated member 18 to secure the anti-theft device in the installed position.

While multiple preferred embodiments of the anti-theft device of the present invention have been discussed above and are shown in the drawings in detail, those of ordinary skill in the art will appreciate that various aspects/or combinations of the different embodiments can be formed without departing from the scope of the present invention. Each of the embodiments of the anti-theft device provides a rugged easy to install steering wheel locking device that is optionally capable of protecting an air bag.

It is recognized by those skilled in the art, that changes may be made to the above described embodiments of the invention without departing from the broad inventive concept thereof. It is understood, therefore, that this invention is not limited to the particular embodiments disclosed, but it intended to cover all modifications which are within the spirit and scope of the invention as defined by the appended claims and/or shown in the attached drawings.

I claim:

1. An anti-theft device for a vehicle, the anti-theft device being adapted to detachably engage a steering wheel rotatably mounted on a steering column, the steering wheel having a rim defining an outer perimeter of the steering wheel, the anti-theft device comprising:

an elongated member having a first end and a longitudinal surface, the elongated member being adapted to be located proximate to the steering column, the first end extending generally radially outwardly away from the steering column past the outer perimeter of the steering wheel;

at least one wheel engaging member disposed on the elongated member and adapted to engage the steering wheel and prevent rotation of the steering wheel relative to the elongated member;

at least one column engaging member having a generally transverse part and at least one connecting part that is pivotally connected to the elongated member for movement between a first position, in which the anti-theft device is not securable to the steering column, and a second position, in which the at least one column engaging member, in combination with the elongated member, is adapted to substantially surround the steering column in an installed configuration in which the wheel engaging member is engaged with the steering wheel; and a locking mechanism adapted to detachably lock the anti-theft device in the installed configuration, wherein a portion of the longitudinal surface of the elongated member is in facing opposition with a portion of the transverse part of the at least one column engaging member.

2. The anti-theft device of claim 1, wherein the elongated member is adapted to be located on a portion of the steering column.

3. The anti-theft device of claim 1, wherein the at least one wheel engaging member comprises a generally L-shaped plate having one leg that is adapted to overlay a front side portion of the steering wheel.

4. The anti-theft device of claim 1, wherein the at least one wheel engaging member comprises at least one generally L-shaped beam having one leg that is adapted to overlay a front side portion of the steering wheel.

5. The anti-theft device of claim 4, wherein the front side portion of the steering wheel is a hub of the steering wheel.

6. The anti-theft device of claim 1, wherein the at least one column engaging member, in combination with the elongated member, completely surrounds the steering column.

7. The anti-theft device of claim 1, wherein the column engaging member comprises two connecting parts, one of the two connecting parts having a proximal end that is pivotally secured to the elongated member.

8. A combination anti-theft device and steering wheel rotatably mounted on a steering column, the anti-theft device being detachably engageable with the steering wheel, the combination comprising:

the steering wheel rotatably mounted on the steering column;

an elongated member having a first end and a longitudinal surface, the elongated member being located proximate to the steering column, the first end extending generally radially outwardly away from the steering column past the outer perimeter of the steering wheel;

at least one wheel engaging member disposed on the elongated member to engage the steering wheel and reduce rotation of the steering wheel relative to the elongated member;

at least one column engaging member having a generally transverse part and at least one connecting part that is pivotally connected to the elongated member for movement between a first position, in which the anti-theft device is not secured to the steering column, and a second position, in which the at least one column engaging member, in combination with the elongated member, substantially surround the steering column in an installed configuration in which the wheel engaging member is engaged with the steering wheel; and a locking mechanism detachably locking the anti-theft device in the installed configuration.

9. The anti-theft device of claim 8, wherein the at least one column engaging member, in combination with the elongated member, completely surrounds the steering column.

10. The anti-theft device of claim 8, wherein the column engaging member comprises two connecting parts, one of the two connecting parts having a proximal end that is pivotally secured to the elongated member.

11. A combination anti-theft device and steering wheel rotatably mounted on a steering column, the anti-theft device being detachably engageable with the steering wheel, the combination comprising:

the steering wheel rotatably mounted on the steering column;

an elongated member having a free end and a longitudinal surface, the elongated member being located to abut the steering column, the free end extending generally radially outwardly away from the steering column past the outer perimeter of the steering wheel;

at least one wheel engaging member disposed on the elongated member to engage the steering wheel and reduce rotation of the steering wheel relative to the elongated member;

at least one column engaging member having a generally transverse part and at least one connecting part that is pivotally connected to the elongated member for movement between a first position, in which the anti-theft device is not secured to the steering column, and a second position, in which the at least one column engaging member, in combination with the elongated member, substantially surround the steering column in an installed configuration in which the wheel engaging member is engaged with the steering wheel; and a locking mechanism detachably locking the anti-theft device in the installed configuration.

12. The anti-theft device of claim 11, wherein the at least one column engaging member, in combination with the elongated member, completely surrounds the steering column.

13. The anti-theft device of claim 12, wherein the column engaging member comprises two connecting parts, one of the two connecting parts having a proximal end that is pivotally secured to the elongated member.

14. The anti-theft device of claim 11, wherein the at least one column engaging member, in combination with the elongated member, completely surrounds the steering column.

* * * * *